(12) United States Patent
Hann et al.

(10) Patent No.: US 12,067,592 B2
(45) Date of Patent: Aug. 20, 2024

(54) CO-PURCHASING SYSTEM AND METHOD

(71) Applicant: SplitCart LLC, Bettendorf, IA (US)

(72) Inventors: Mark A. Hann, Le Claire, IA (US); James Stark, Wheaton, IL (US)

(73) Assignee: SplitCart LLC, Bettendorf, IA (US)

( * ) Notice: Subject to any disclaimer, the term of this patent is extended or adjusted under 35 U.S.C. 154(b) by 0 days.

(21) Appl. No.: 17/939,828

(22) Filed: Sep. 7, 2022

(65) Prior Publication Data

US 2023/0098217 A1 Mar. 30, 2023

Related U.S. Application Data

(63) Continuation-in-part of application No. 16/993,187, filed on Aug. 13, 2020, now Pat. No. 11,915,283.

(Continued)

(51) Int. Cl.
*G06Q 20/02* (2012.01)
*G06Q 20/40* (2012.01)
(Continued)

(52) U.S. Cl.
CPC ....... *G06Q 30/0253* (2013.01); *G06Q 20/027* (2013.01); *G06Q 20/405* (2013.01); *G06Q 30/0272* (2013.01); *G06Q 30/0605* (2013.01)

(58) Field of Classification Search
CPC ............... G06Q 30/02; G06Q 30/0206; G06Q 30/0279; G06Q 30/0283; G06Q 30/04; G06Q 30/06; G06Q 30/0601–0643; G06Q 20/12; G06Q 30/0605; G06Q 20/0855; G06Q 30/0208; G06Q 30/0214; G06Q 30/0617; G06Q 30/0641; G06Q 10/02–025; G06Q 50/12; G06Q 50/14
See application file for complete search history.

(56) References Cited

U.S. PATENT DOCUMENTS

| 5,663,547 A | 9/1997 | Ziarno |
| 5,960,411 A | 9/1999 | Hartman et al. |

(Continued)

FOREIGN PATENT DOCUMENTS

| WO | 2001029787 A2 | 4/2001 |
| WO | 02095635 A1 | 11/2002 |

(Continued)

OTHER PUBLICATIONS

Investopedia Stock Analysis: How Splitwise Works and Makes Money. Webblog post. Newstext Finance & Accounting Blogs. Oct. 21, 2018. (Year: 2018).*

(Continued)

*Primary Examiner* — William J Allen
(74) *Attorney, Agent, or Firm* — The Rapacke Law Group, P.A.; Andrew S. Rapacke

(57) ABSTRACT

An illustrative embodiment of a co-purchasing system & method may be configured to integrate into a retailer's existing e-commerce system such that the co-purchasing system & method may be provided as a checkout option on the retailer's website, which may include other checkout options in addition to the co-purchasing system & method. An Organizer of a co-purchasing campaign may invite others to participate in the co-purchasing campaign using a dynamic link, which link may be configured with a specific expiration time/date.

20 Claims, 60 Drawing Sheets

Related U.S. Application Data

(60) Provisional application No. 63/321,656, filed on Mar. 18, 2022, provisional application No. 63/241,521, filed on Sep. 7, 2021, provisional application No. 63/044,230, filed on Jun. 25, 2020, provisional application No. 62/886,150, filed on Aug. 13, 2019.

(51) Int. Cl.
*G06Q 30/0251* (2023.01)
*G06Q 30/0272* (2023.01)
*G06Q 30/0601* (2023.01)

(56) References Cited

U.S. PATENT DOCUMENTS

| | | |
|---|---|---|
| 7,013,292 B1 | 3/2006 | Hsu et al. |
| 7,444,297 B2 | 10/2008 | Shah |
| 7,792,699 B2 | 9/2010 | Kwei |
| 7,933,810 B2 | 4/2011 | Morgenstern |
| 8,170,922 B2 | 5/2012 | Cavagnaro |
| 9,760,936 B1 | 9/2017 | Shaw et al. |
| 10,121,127 B1 | 11/2018 | Isaacson et al. |
| 10,679,207 B1 | 6/2020 | Huffines et al. |
| 2002/0042775 A1 | 4/2002 | Nelson et al. |
| 2002/0138573 A1 | 9/2002 | Saguy |
| 2004/0143600 A1 | 7/2004 | Musgrove et al. |
| 2004/0148228 A1 | 7/2004 | Kwei |
| 2006/0161484 A1 | 7/2006 | Pandhe |
| 2007/0208627 A1 | 9/2007 | Abadi |
| 2008/0228597 A1* | 9/2008 | Sondles ............ G06Q 30/0277 705/26.8 |
| 2008/0243684 A1 | 10/2008 | Ng et al. |
| 2008/0301005 A1 | 12/2008 | Nieda et al. |
| 2009/0254447 A1 | 10/2009 | Blades |
| 2010/0010906 A1 | 1/2010 | Grecia |
| 2010/0197754 A1 | 8/2010 | Chen et al. |
| 2010/0306040 A1 | 12/2010 | Arumugam et al. |
| 2012/0150729 A1 | 6/2012 | Isaacson et al. |
| 2012/0226587 A1 | 9/2012 | Lara |
| 2012/0226614 A1* | 9/2012 | Gura .................. G06Q 30/0605 705/44 |
| 2013/0046590 A1 | 2/2013 | Abraham et al. |
| 2013/0185195 A1 | 7/2013 | Hull et al. |
| 2013/0226688 A1 | 8/2013 | Harvilicz et al. |
| 2014/0074691 A1 | 3/2014 | Bank et al. |
| 2017/0287086 A1 | 10/2017 | Lopez et al. |
| 2018/0165675 A1 | 6/2018 | Isaacson et al. |
| 2020/0242681 A1* | 7/2020 | Porto Arantes .... G06Q 30/0631 |

FOREIGN PATENT DOCUMENTS

| | | |
|---|---|---|
| WO | 2002095635 A1 | 11/2002 |
| WO | 2013036856 A2 | 3/2013 |

OTHER PUBLICATIONS

Paycent, The Split Bill Phenomenon, https://paycent.com/split-bill-phenomenon/.

* cited by examiner

CO-PURCHASING SYSTEM AND METHOD

CROSS REFERENCE TO RELATED APPLICATIONS

Applicant states that this utility, non-provisional patent application is a continuation-in-part of and claims priority from pending non-provisional U.S. patent application Ser. No. 16/993,187 filed on Aug. 13, 2020, which claimed priority from provisional U.S. Pat. App. Nos. 62/886,150 filed on Aug. 13, 2019, and 63/044,230 filed on Jun. 25, 2020. The present non-provisional patent application also claims priority from provisional U.S. Pat. App. Nos. 623/241,521 filed on Sep. 7, 2021, and 63/321,656 filed on Mar. 18, 2022. All of the preceding applications are incorporated by reference herein in their entireties.

FIELD OF THE INVENTION

The present disclosure is related to systems and methods for sharing the cost of an item or co-purchasing an item, and more particularly for an item procured electronically.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.171 (c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Various patents and prior art disclosures exist for more than one purchaser to participate in purchasing goods and/or services, such as U.S. Pat. Nos. 7,792,699; 9,760,936; and, 10,825,075. However, the prior art includes various disadvantages, which include but are not limited to a lack of disclosure and/or enablement of a system for effectuating sharing the cost of an item or items purchased electronically among a plurality of individuals. The prior art fails to teach at least a system or method for transacting a single purchase with multiple contributors. The prior art further fails to set out any viable methodology or system under which the co-purchase can take place in the existing e-commerce ecosystem.

In addition to the foregoing, there is a major gap in the e-commerce payment ecosystem. While certain payment facilitators and/or money transmitters allow and enable individuals to repay one another for a purchase after the fact (such as Zelle, Venmo, or CashApp), obtaining repayment on a joint purchase remains a major problem. Further these systems result in the parties repaying the original buyer incurring a credit card fee if a credit card is used for repayment. Further, parties repaying the original purchaser have no assurance via the payment system that the good or service is being purchased for the identified person nor that the good or service will actually be or has been purchased. This is also a major fault and defect in the current crowd funding models (such as GoFundMe).

SUMMARY

The illustrative embodiments of a co-purchasing system & method disclosed herein (alternatively herein referred to interchangeably as "SplitCart," which is Applicant's exclusive trademark) may be configured to allow multiple individuals to share/split to cost of an item(s), which may be a good, collection of goods, service, and/or collection of services without limitation unless otherwise indicated in the following claims. Generally, a first user (who may be referred to herein as the "Organizer") may initiate a co-purchasing campaign and invite other individuals to contribute to the cost of the item(s) via an invitation and/or link sharing. In one illustrative embodiment, the co-purchasing system & method may be available as a checkout option on a retailer's web site without limitation unless otherwise indicated in the following claims.

Various illustrative embodiments of a co-purchasing system & method disclosed herein may be useful for situations wherein the cost of an item(s) desired is in excess of what one person may be willing to contribute. Various illustrative embodiments may provide an e-commerce solution that allows a plurality of contributors to share/split to cost of the desired item to be purchased, which may also include taxes, handling, wrapping and shipping costs without limitation unless otherwise indicated in the following claims. This eliminates the need to seek collection from other contributors to a purchase after the fact.

Further, the illustrative embodiments establish and set forth a process and method by which the Organizer of the co-purchasing campaign can create the co-purchasing campaign, share a dynamic Link to each possible contributor (whether via text, email, social media, and/or any other further disclosed mechanism), and effectuate the transaction, depending upon the full funding of the total purchase amount.

Further, the illustrative embodiments contain various details pertaining to in-application (or web-based platform) messaging, with any action taking place via multiple possible mediums, such as text (SMS), email, and social media, Apple AirDrop, and other common methods by which individuals commonly communicate via electronic means.

DETAILED DESCRIPTION—BRIEF DESCRIPTION OF DRAWINGS

The accompanying drawings, which are incorporated in and constitute a part of this specification, illustrate embodiments and together with the description, serve to explain the principles of the methods and systems.

Figure 3:
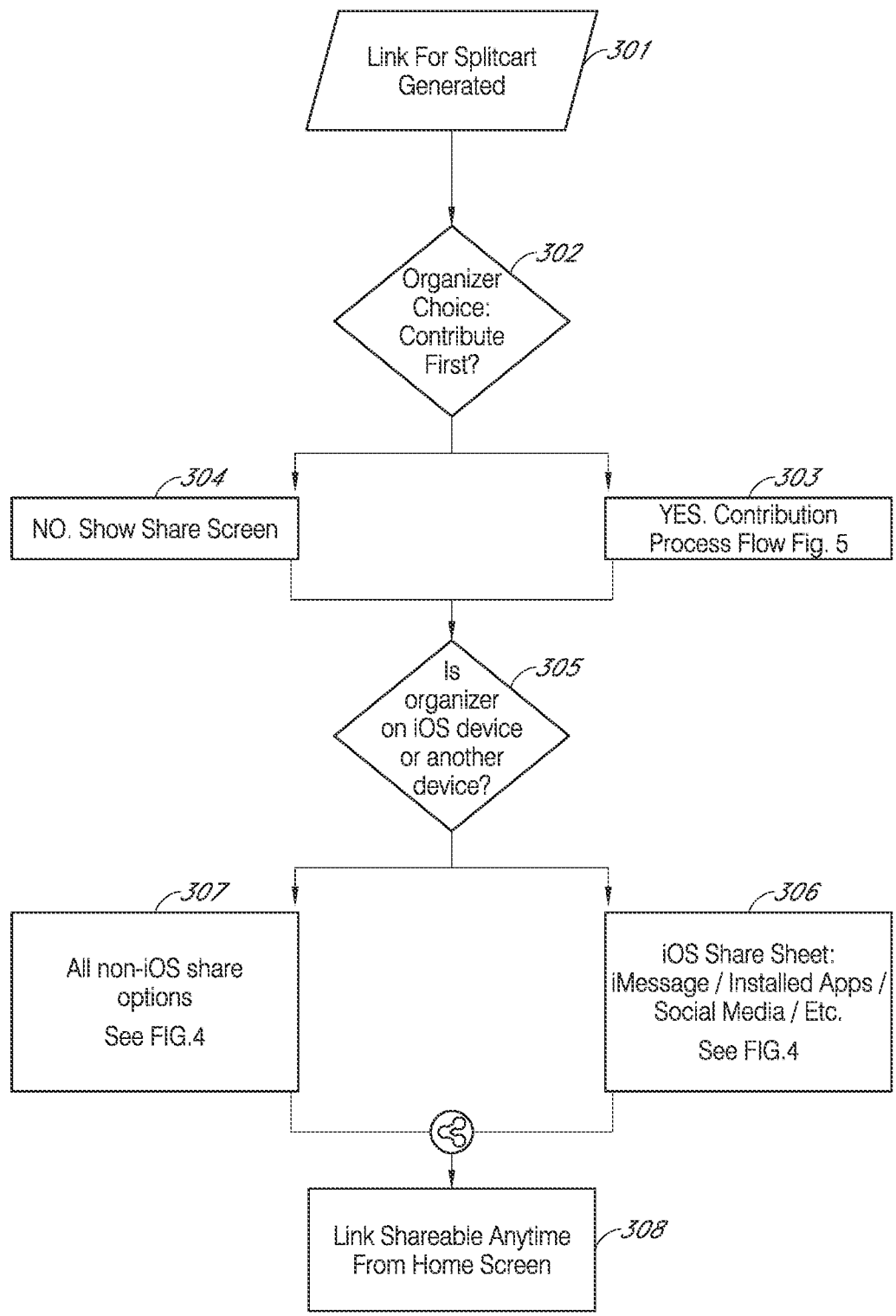

FIG. 3 is a schematic representation of a portion of the illustrative embodiment of a co-purchasing system & method illustrating the process by which a link to the co-purchase campaign may be created, and how an invitation to participate in a co-purchase campaign may be shared by the Organizer.

Figure 4:
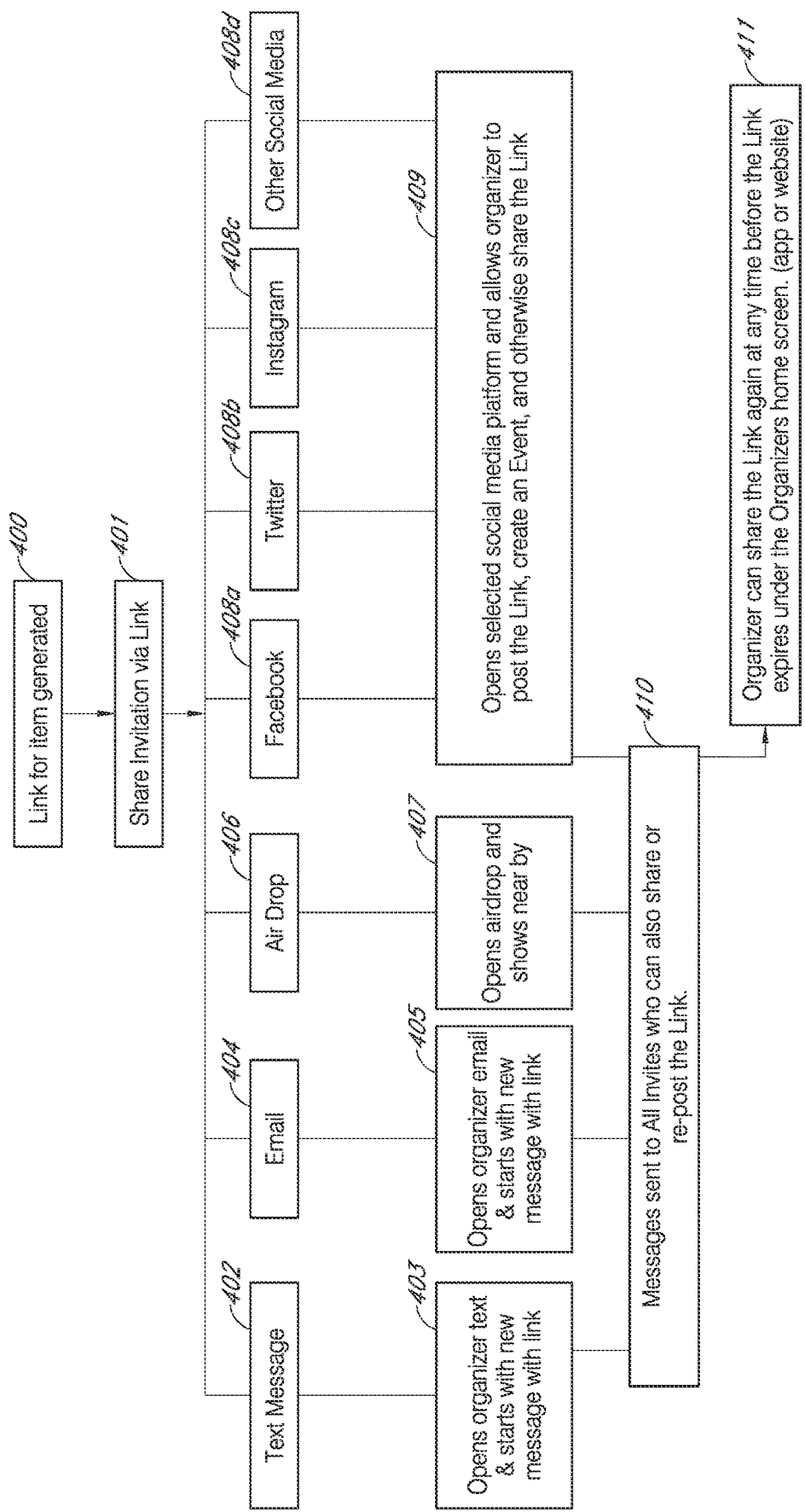

FIG. 4 is a schematic representation of a portion of the illustrative embodiment of a co-purchasing system & method illustrating some of the link sharing options that may be available to the Organizer when sharing the link for the co-purchase campaign and the corresponding process.

Figure 5:
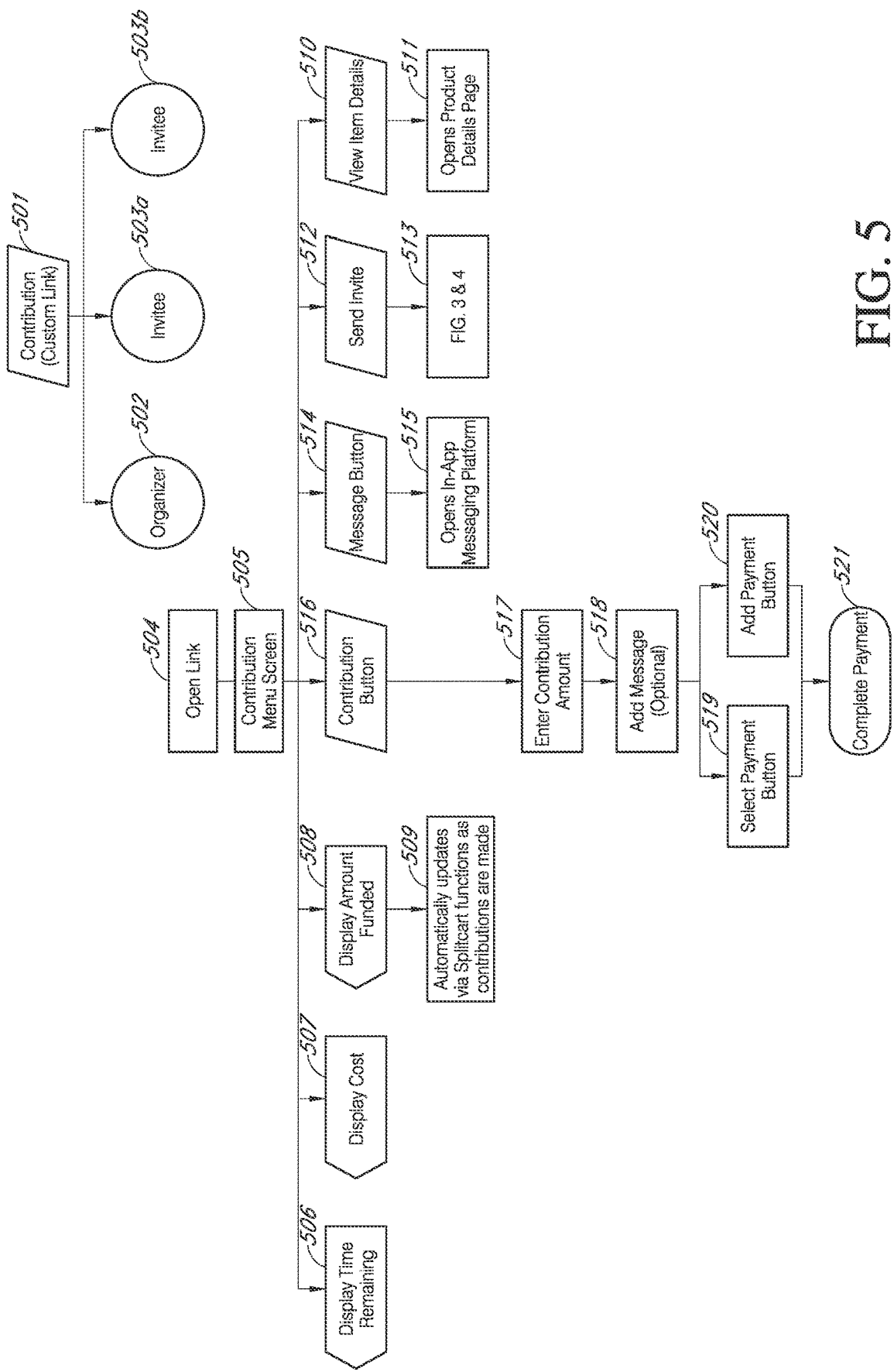

FIG. 5 is a schematic representation of a portion of the illustrative embodiment of a co-purchasing system & method illustrating the functions and options that may be displayed to anyone who opens the link, as well as the process for the user to contribute to the e-commerce co-purchase campaign.

Figure 6:
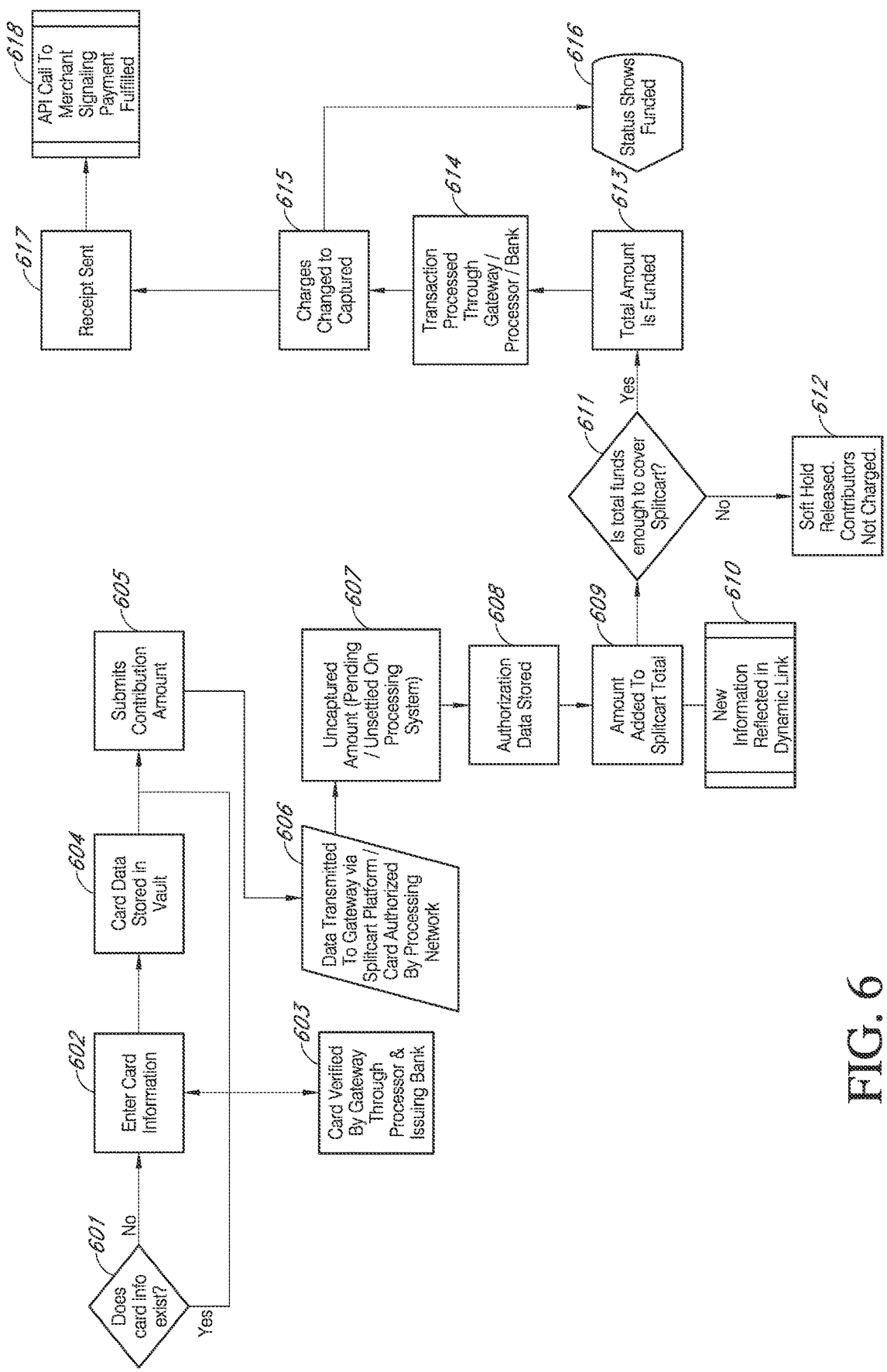
Figure 7:
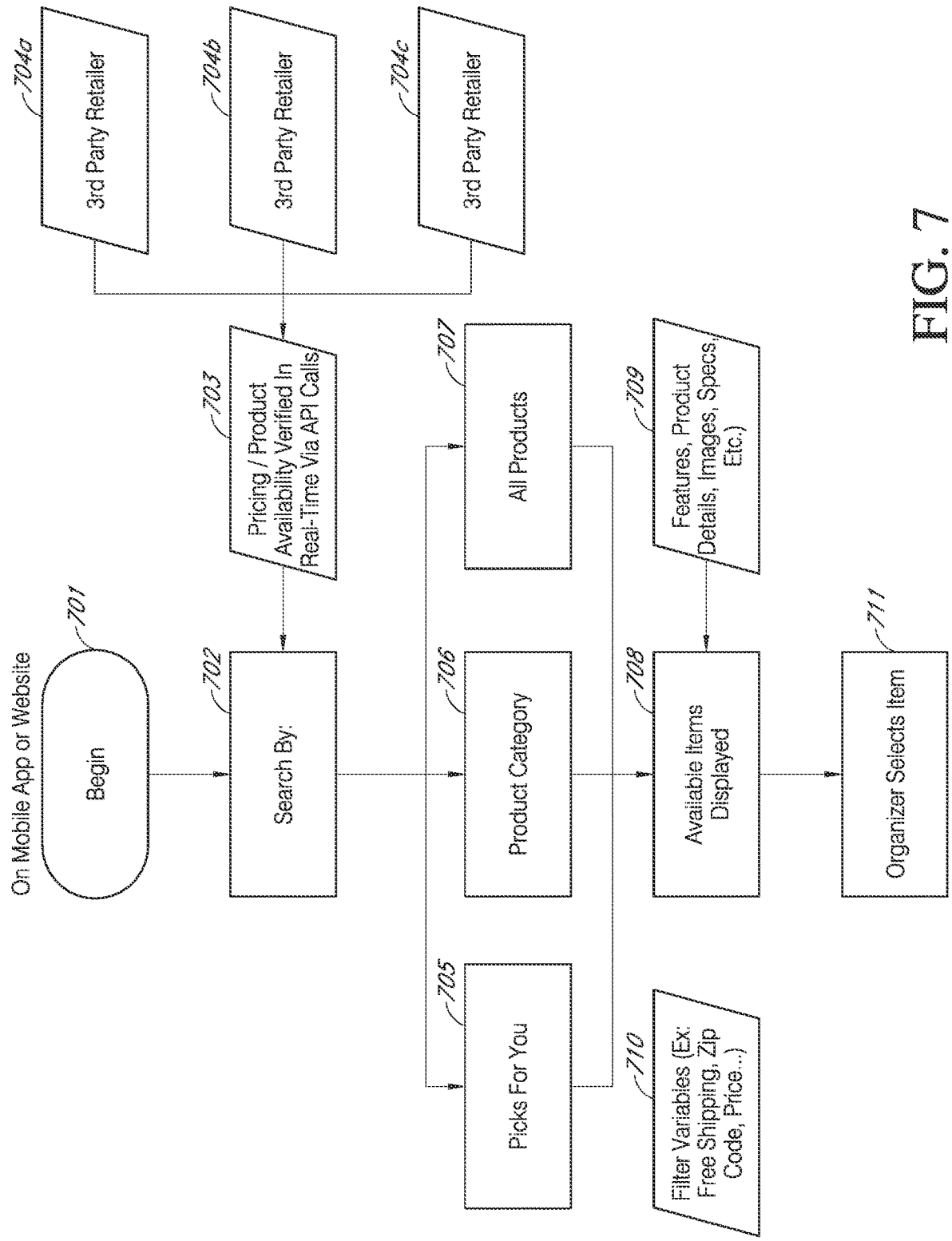

FIG. 6 is a schematic representation of a portion of the illustrative embodiment of a co-purchasing system and methodology by which each contributor's payment may be effectuated and handled for a given contribution to a co-purchase campaign FIG. 7 is a schematic representation of a portion of the illustrative embodiment of a co-purchasing system & method showing an illustrative embodiment of the product selection process.

Figure 8:
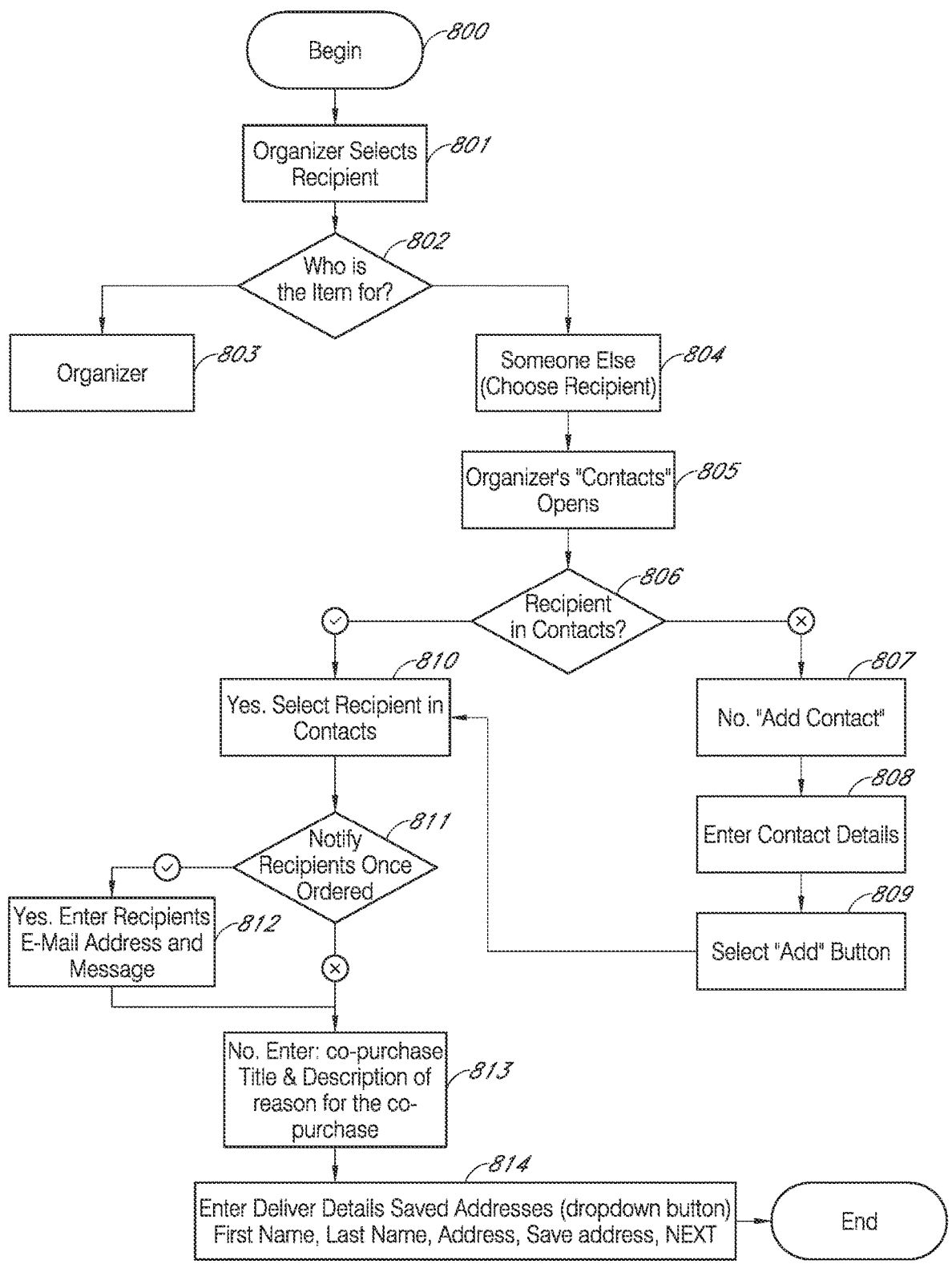

FIG. 8 is a schematic representation of a portion of the illustrative embodiment of a co-purchasing system & method illustrating how a co-purchase campaign Organizer may select a recipient for the purchased good.

Figure 9:
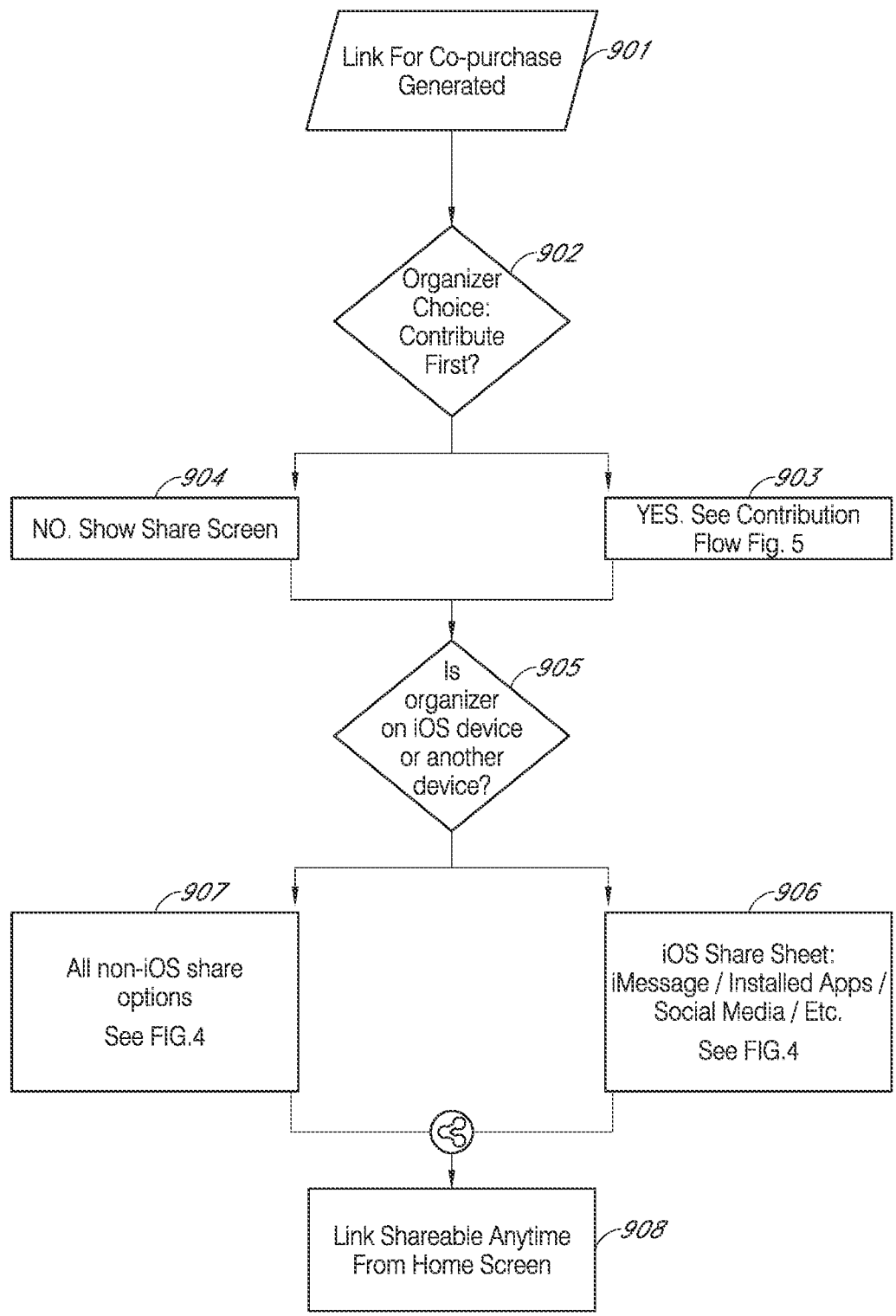

FIG. 9 is a schematic representation of a portion of the illustrative embodiment of a co-purchasing system & method showing an illustrative embodiment of the process by which a link to the co-purchase campaign may be created, and how an invitation to participate in a co-purchase campaign may be shared by the Organizer.

Figure 10:
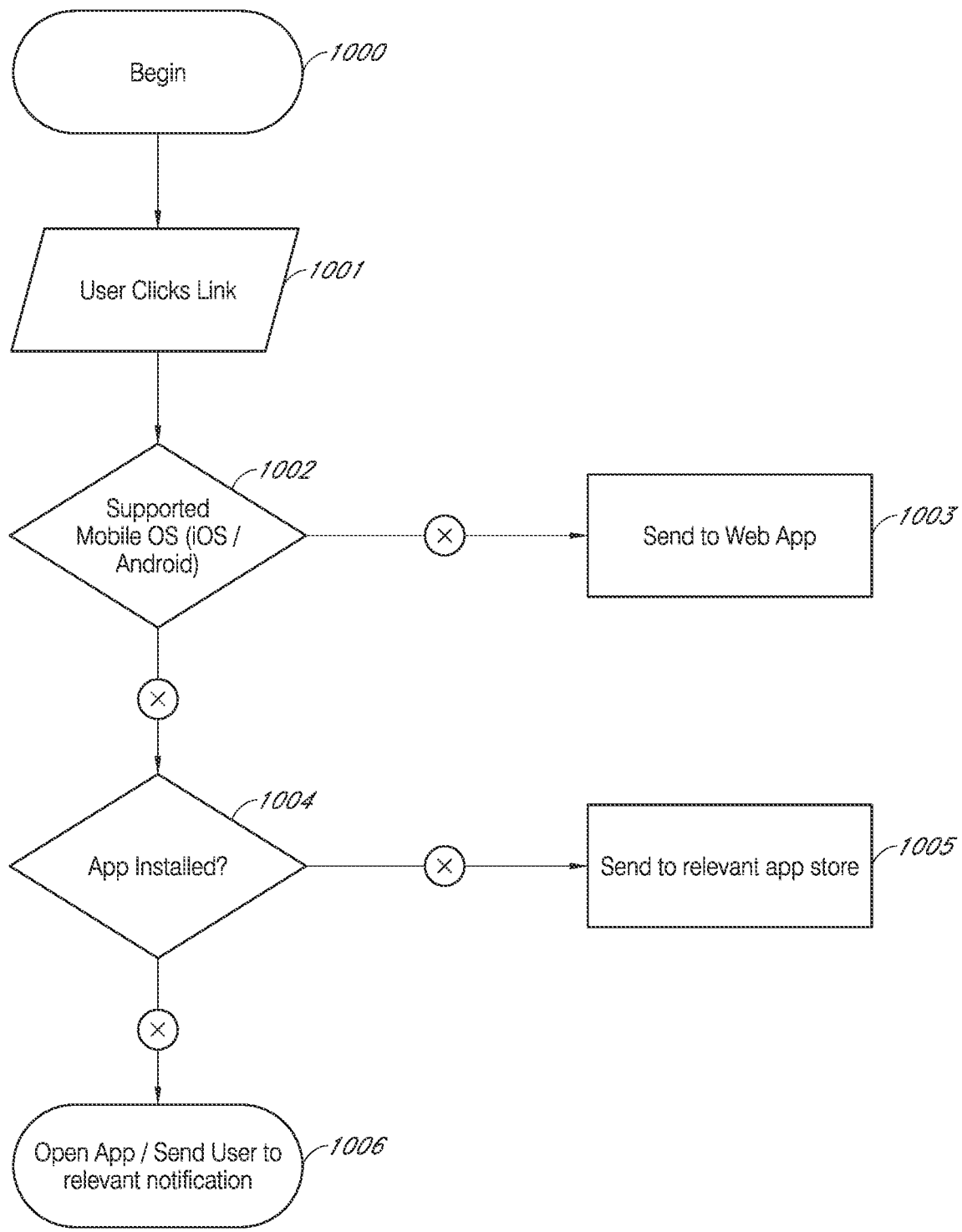

FIG. 10 is a schematic representation of a portion of the illustrative embodiment of a co-purchasing system & method illustrating how the platform may handle a link based upon the user's type of device and operating system.

Figure 11:
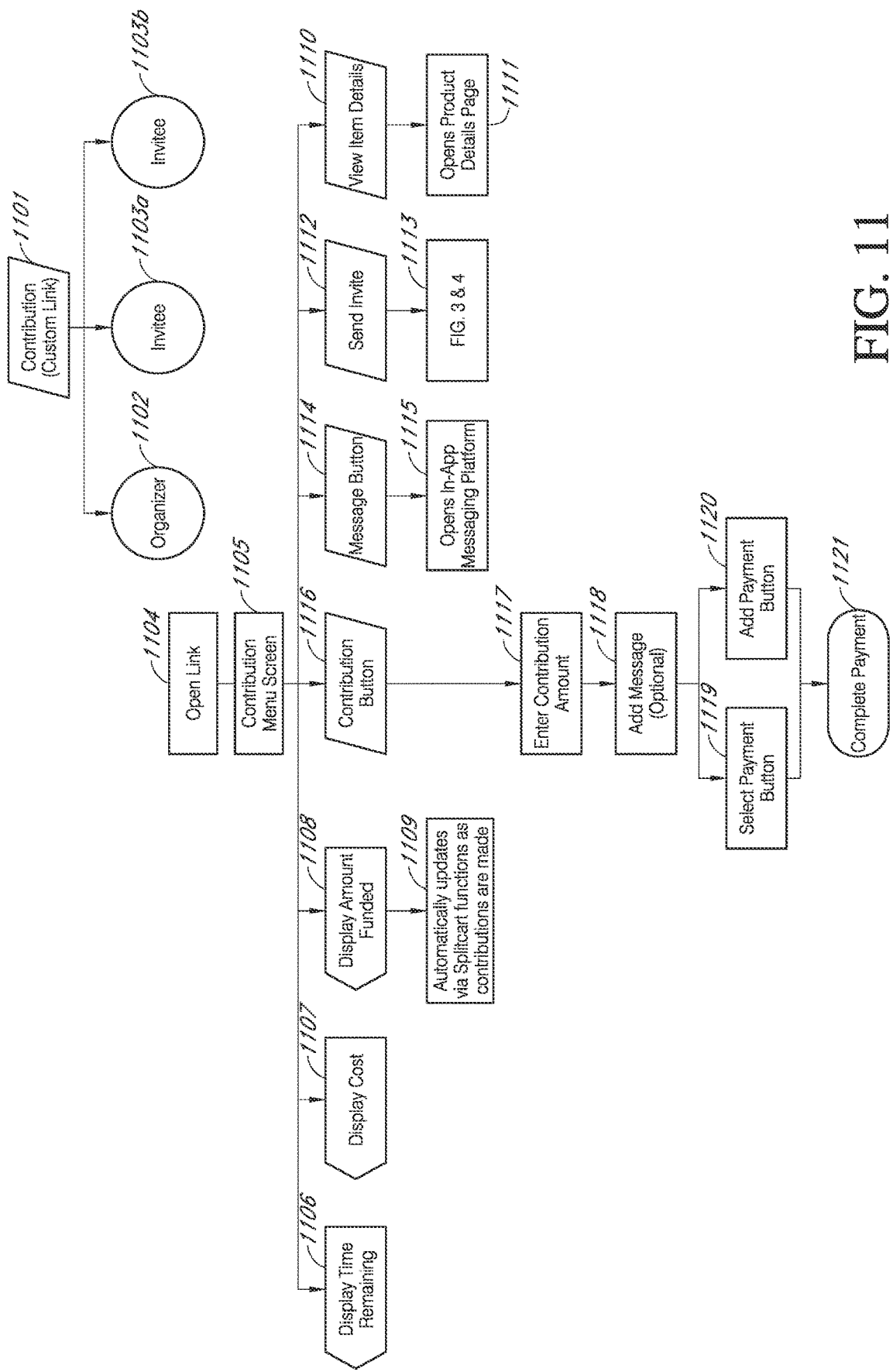

FIG. 11 is a schematic representation of a portion of the illustrative embodiment of a co-purchasing system & method showing the functions and options that may be displayed to anyone who opens the link, as well as the process for the user to contribute to the e-commerce co-purchase campaign.

Figure 12:
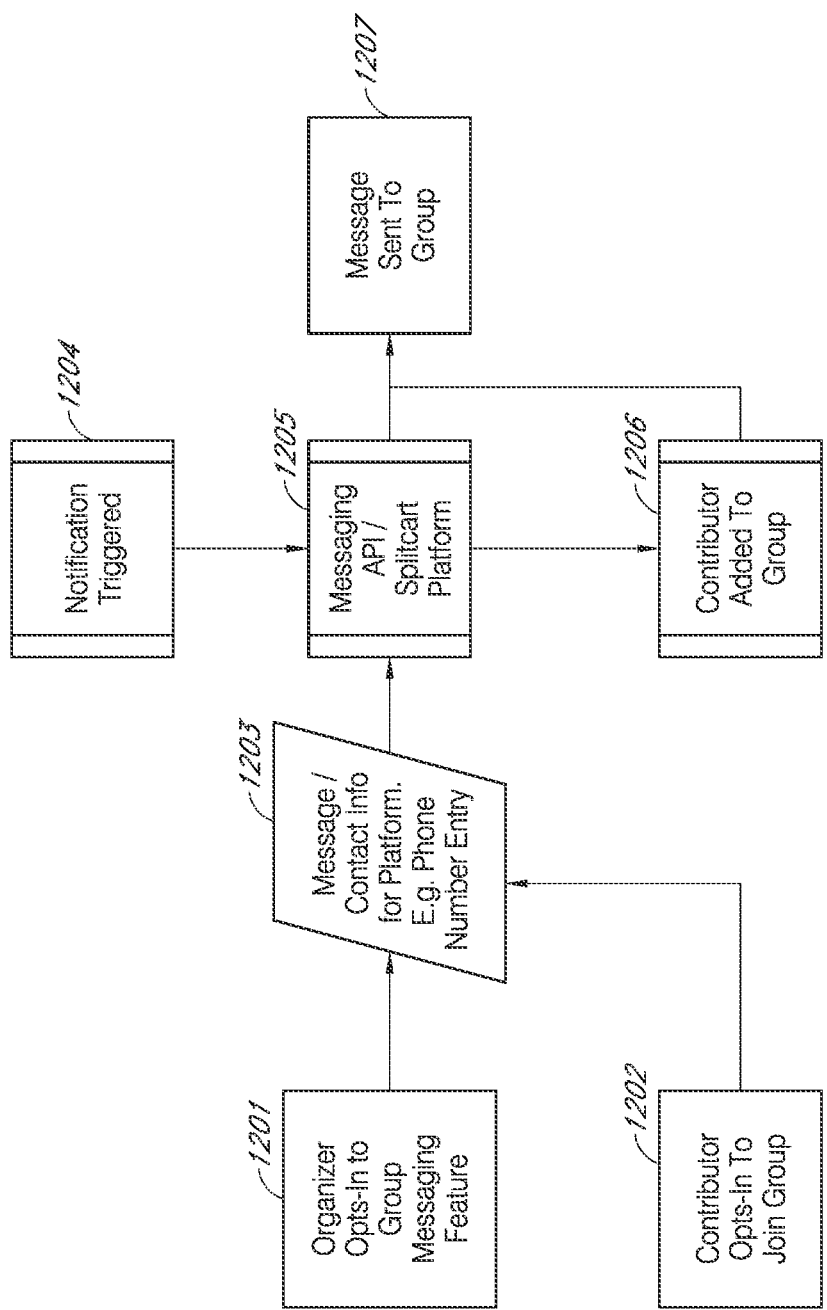

FIG. 12 is a schematic representation of a portion of the illustrative embodiment of a co-purchasing system & method showing the functions and operation of the in-application/platform messaging system that may be incorporated into the illustrative embodiment of the co-purchasing system.

Figure 13:
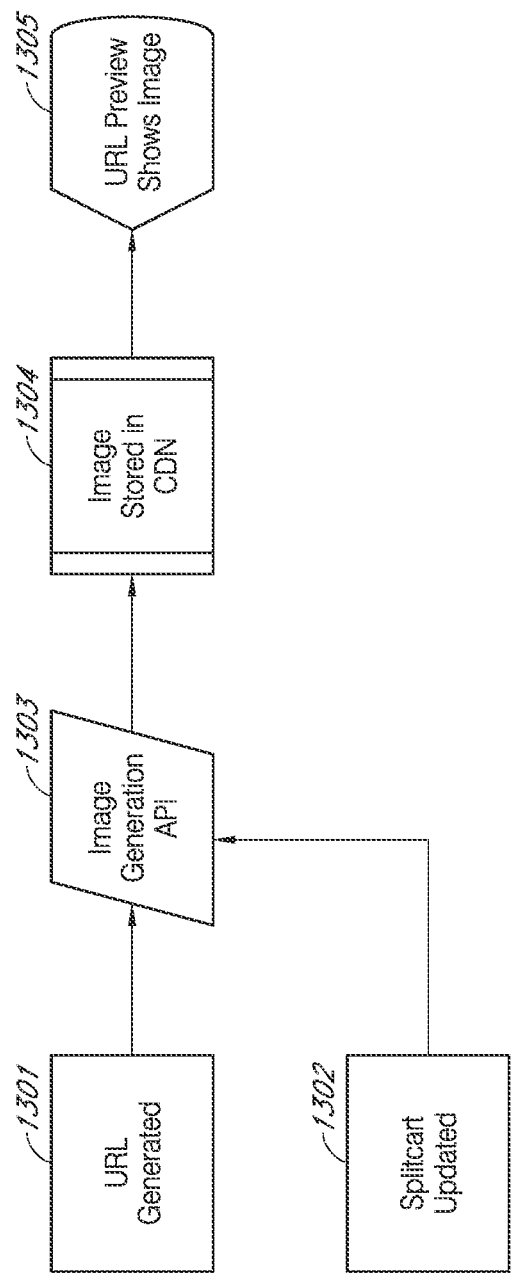

FIG. 13 is a schematic representation of a portion of the illustrative embodiment of a co-purchasing system & method showing the dynamic link components and functions whereby a user with the link can view the current status of the co-purchase campaign, the time remaining, the total price of the good(s) or service(s), the amount funded, and/or other related information.

Figure 14:
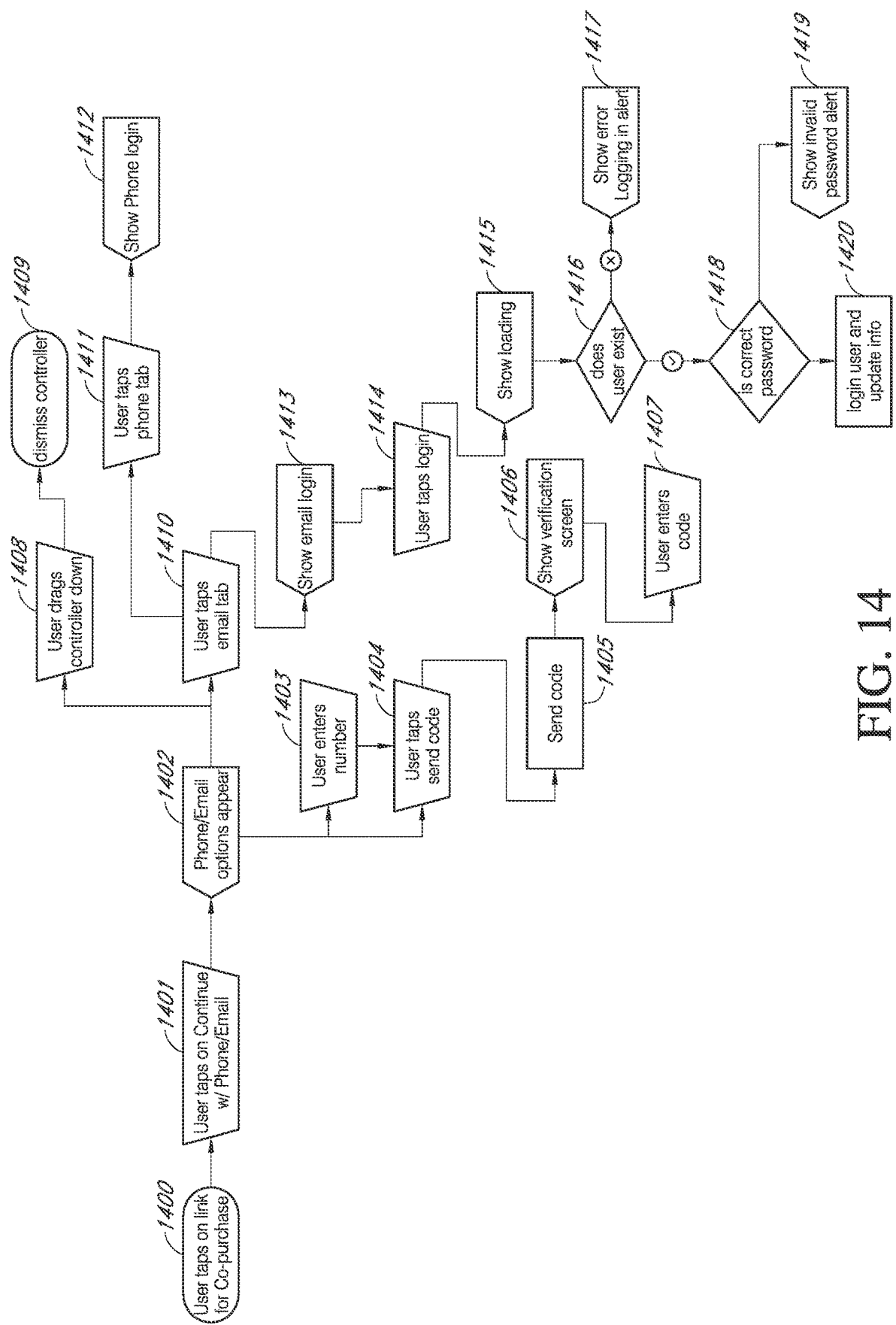

FIG. 14 is a schematic representation of a portion of the illustrative embodiment of a co-purchasing system & method showing an illustrative embodiment of a user login process.

Figure 15:
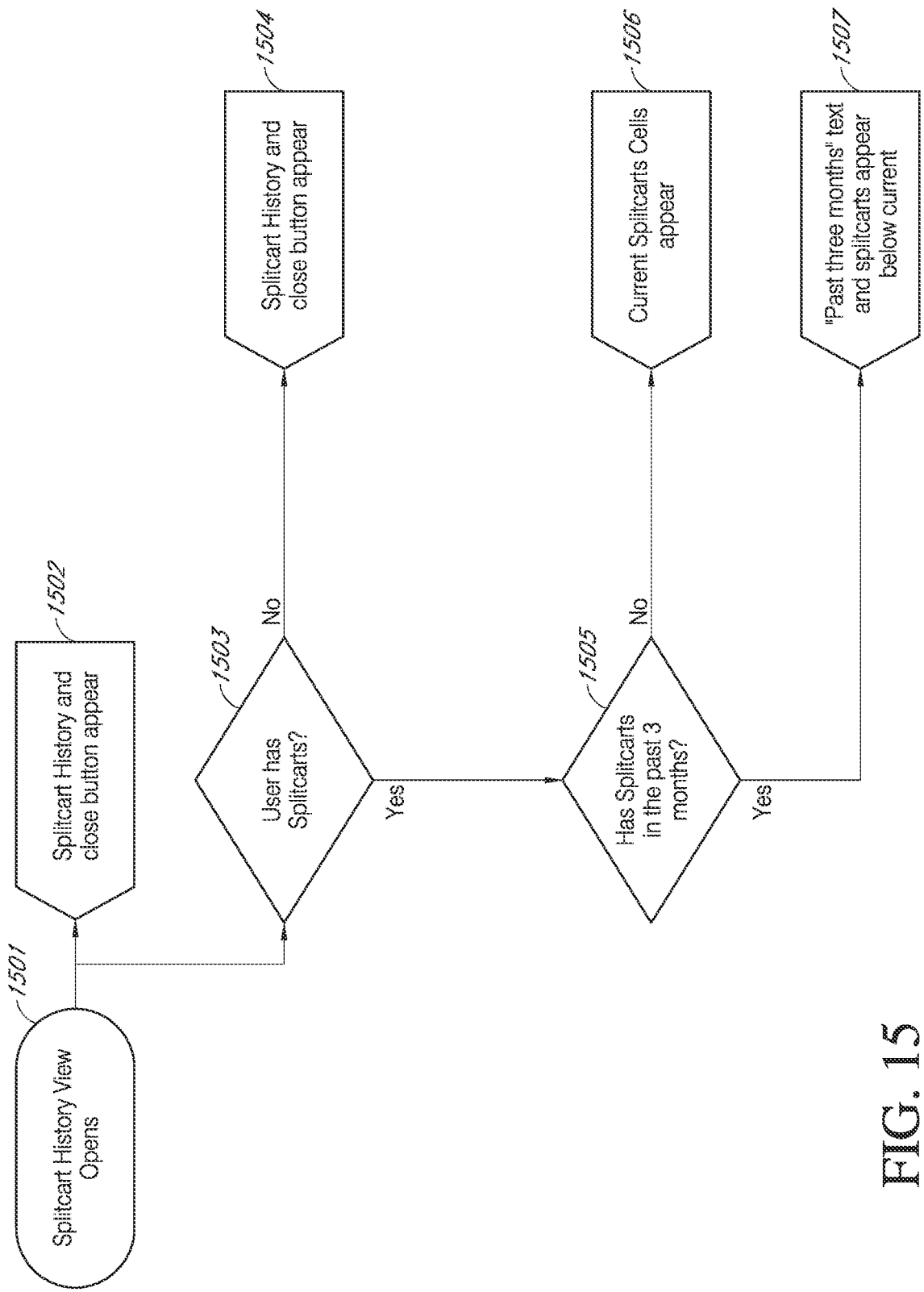

FIG. 15 is a schematic representation of a portion of the illustrative embodiment of a co-purchasing system & method showing the display process of a user's purchase history.

Figure 16:
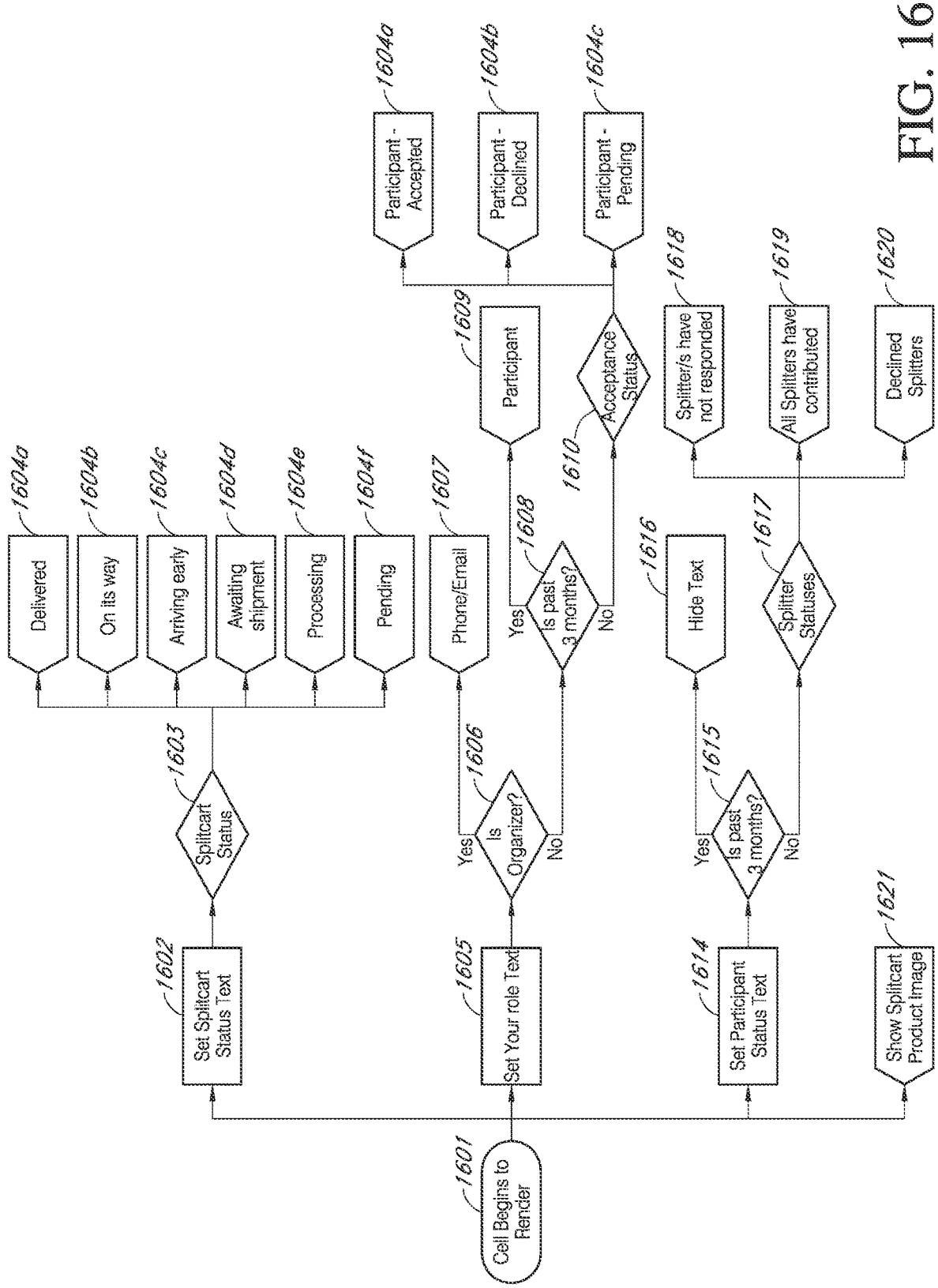

FIG. 16 is a schematic representation of a portion of the illustrative embodiment of a co-purchasing system & method showing the detailed process flow for the user's purchase history display based on the user's role.

Figure 17:
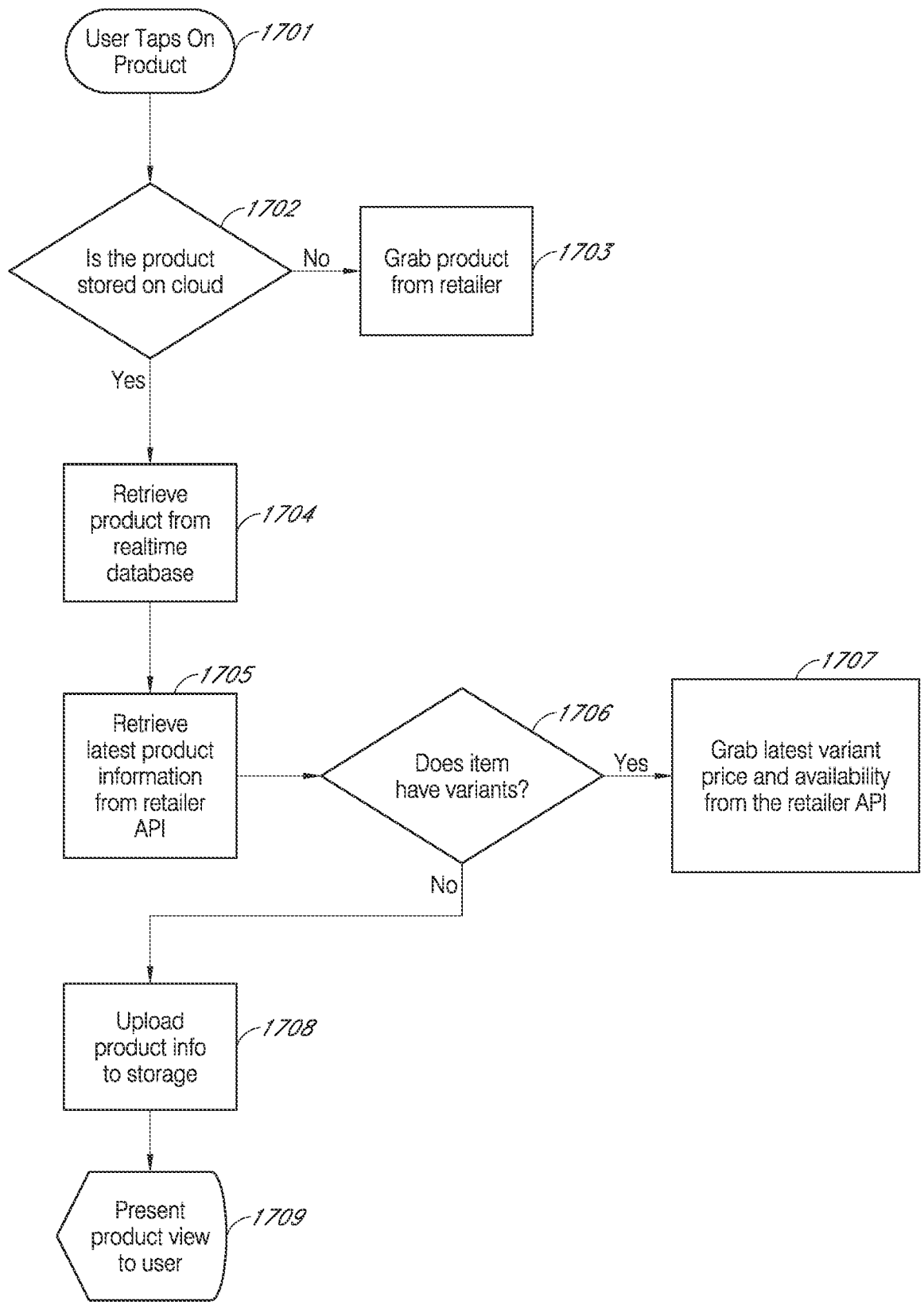

FIG. 17 is a schematic representation of a portion of the illustrative embodiment of a co-purchasing system & method showing how products and corresponding product information may be retrieved and loaded using the co-purchasing mobile application and/or web-based platform.

Figure 18:
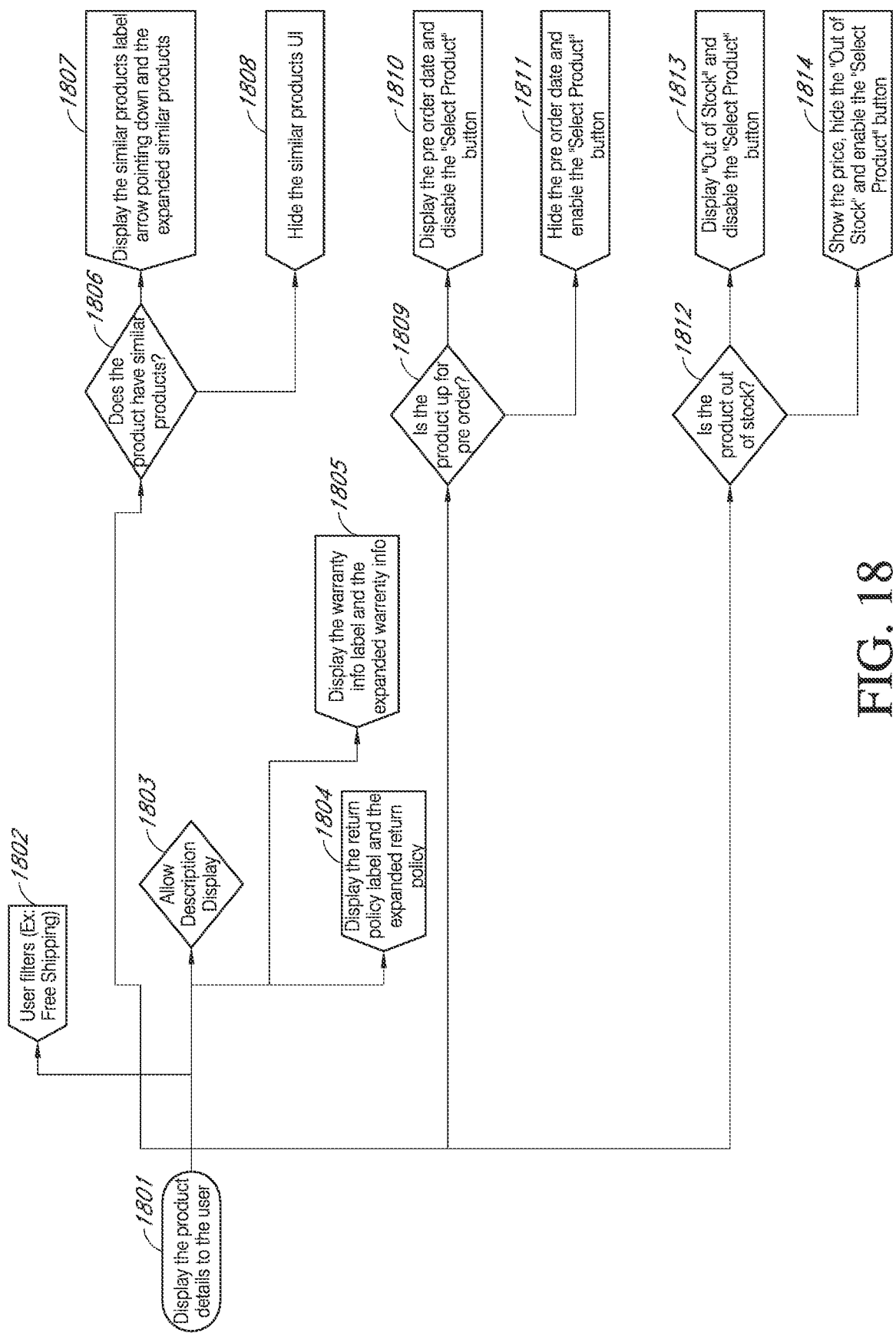

FIG. 18 is a schematic representation of a portion of the illustrative embodiment of a co-purchasing system & method showing how a product, related product information, and/or availability may be displayed to the co-purchasing platform users.

Figure 19:
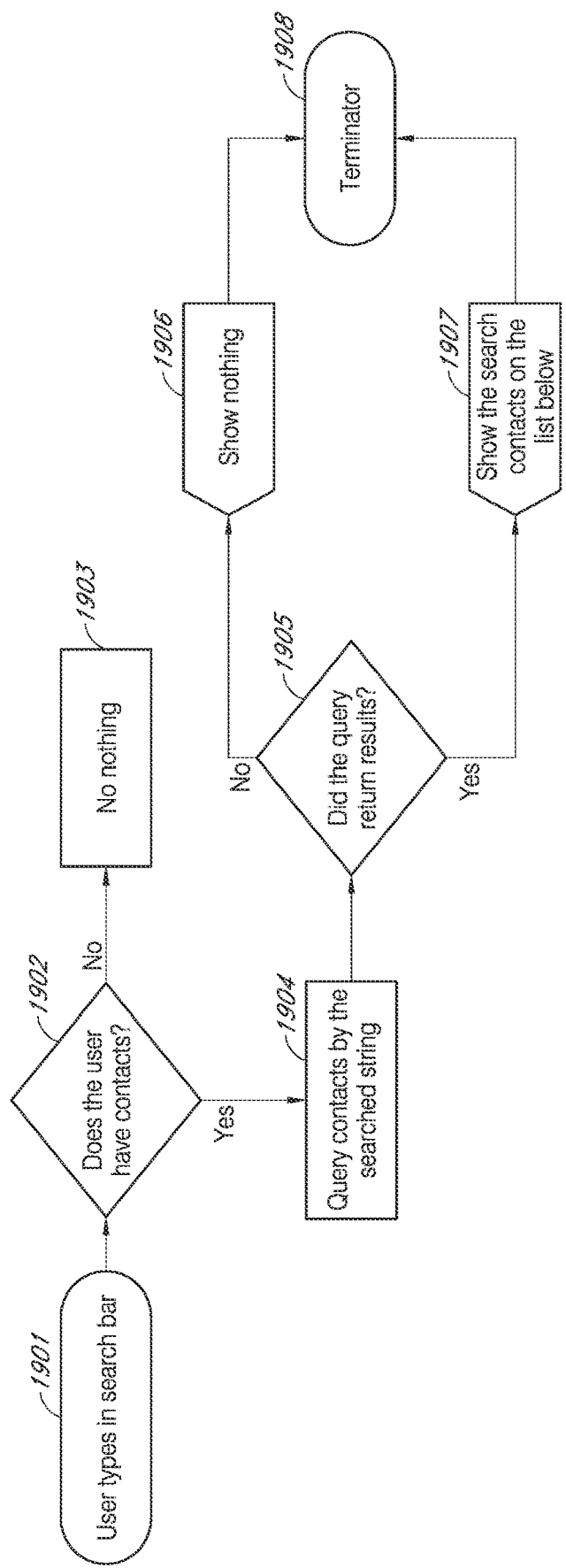

FIG. 19 is a schematic representation of a portion of the illustrative embodiment of a co-purchasing system & method showing how users can search the user's existing electronic contacts and/or add additional contact information for a potential recipient while in the co-purchasing mobile application and/or web-based platform.

Figure 20:
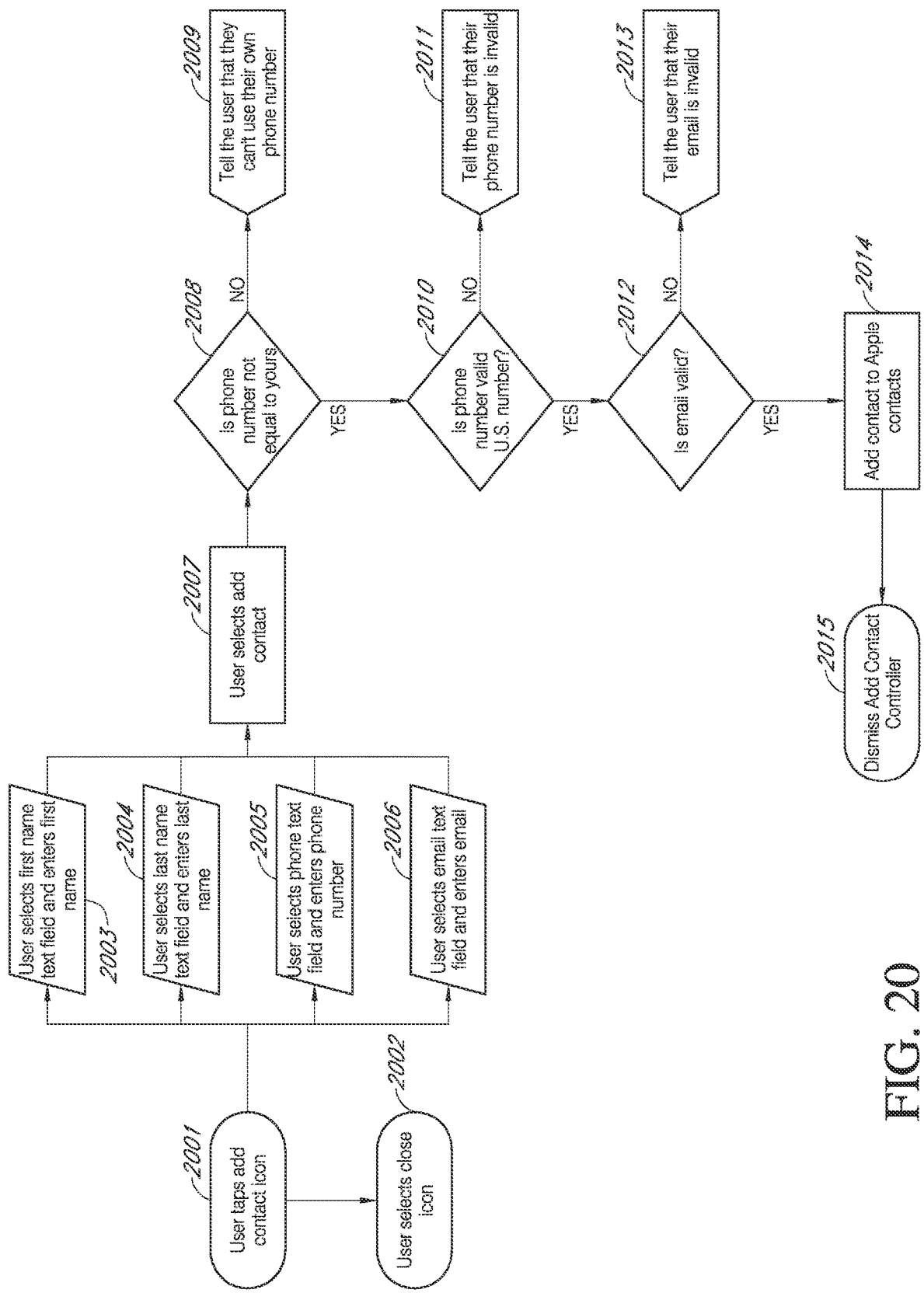

FIG. 20 is a schematic representation of a portion of the illustrative embodiment of a co-purchasing system & method showing how users can add contacts within the co-purchasing mobile application and/or web-based platform.

Figure 21:
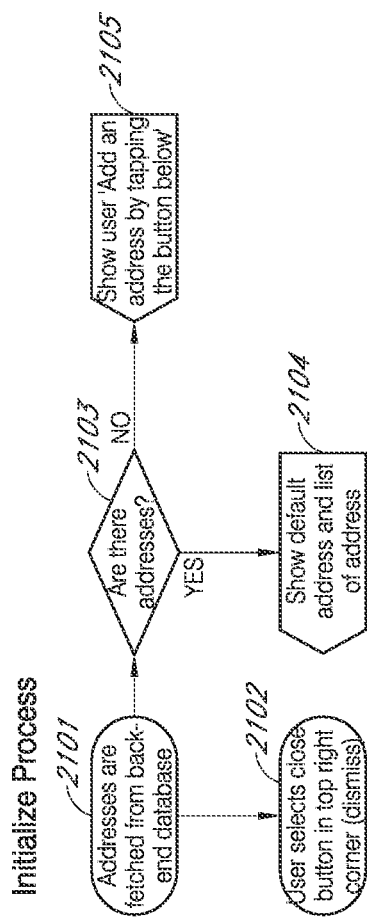
Figure 21:
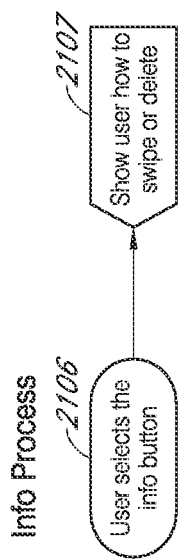
Figure 21:
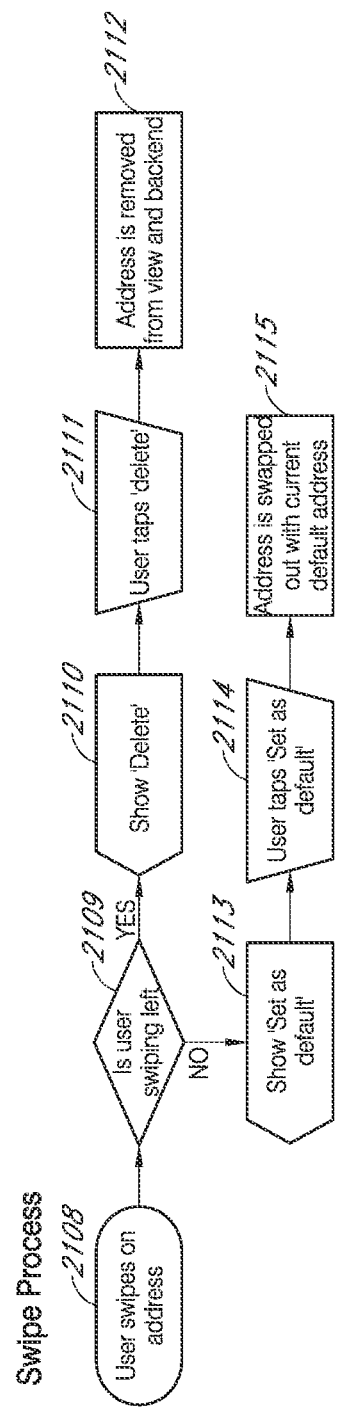
Figure 21:
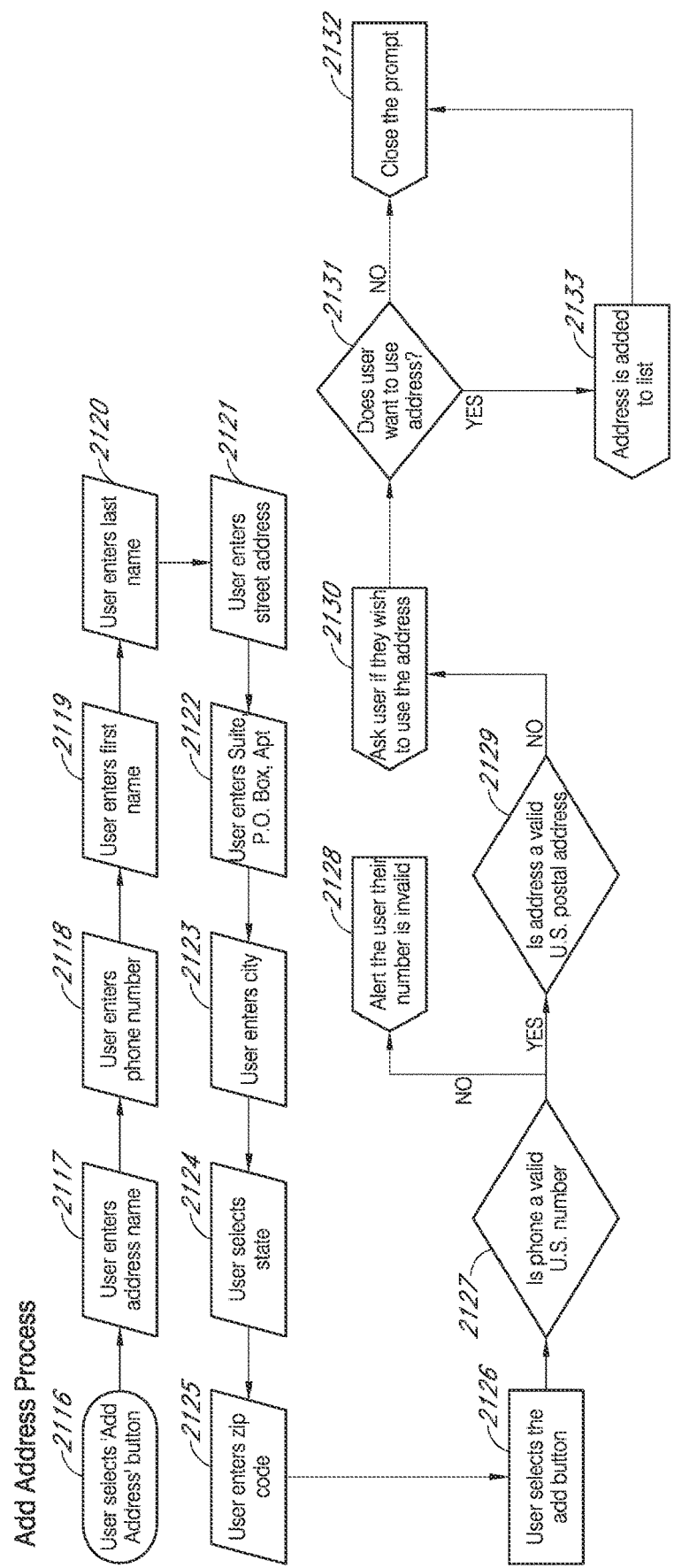

FIG. 21 is a schematic representation of a portion of the illustrative embodiment of a co-purchasing system & method showing how a user can select and/or add a shipping address in the co-purchasing mobile application and/or web-based platform.

Figure 22:
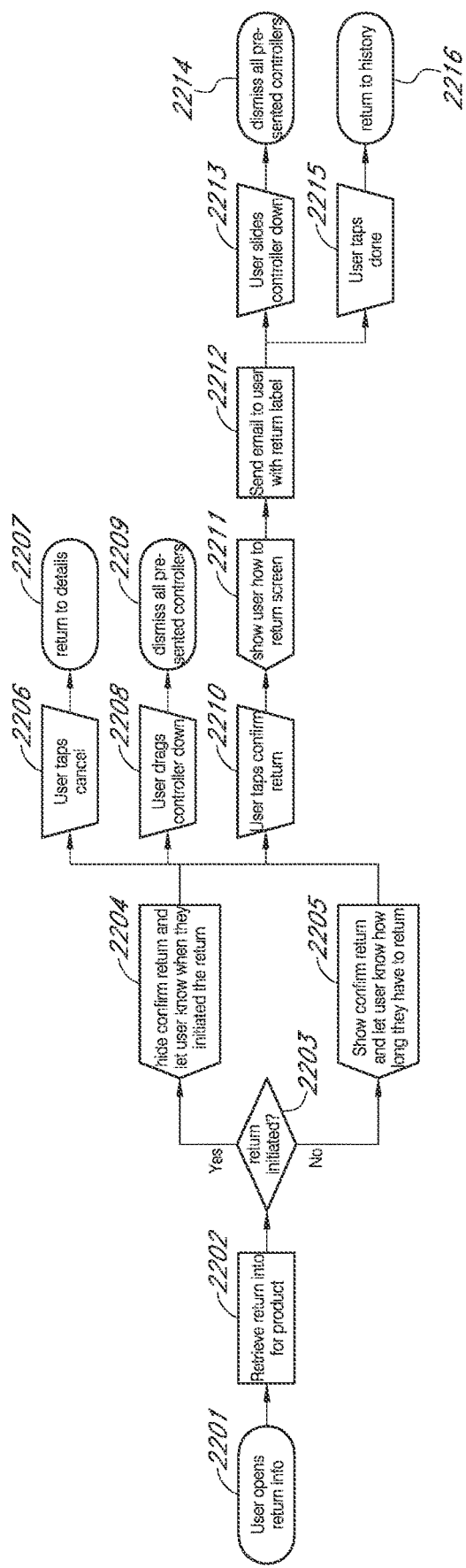

FIG. 22 is a schematic representation of a portion of the illustrative embodiment of a co-purchasing system & method showing an illustrative embodiment of one of the systems and methodologies by which a recipient can initiate and complete returns using the co-purchasing mobile application and/or web-based platform.

Figure 23:
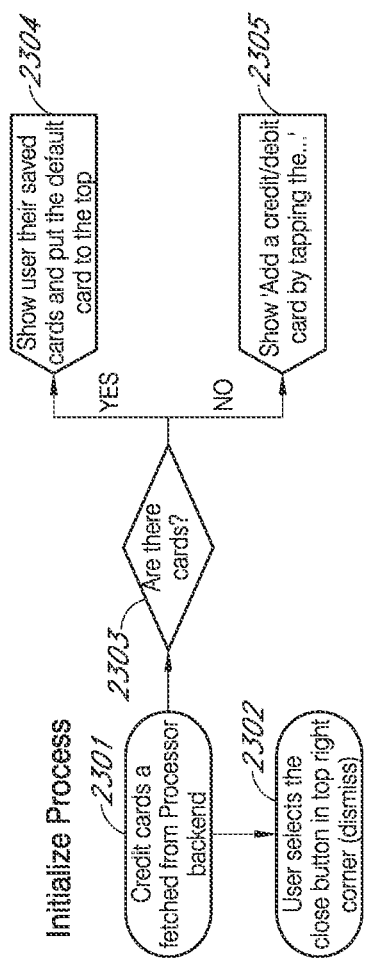
Figure 23:
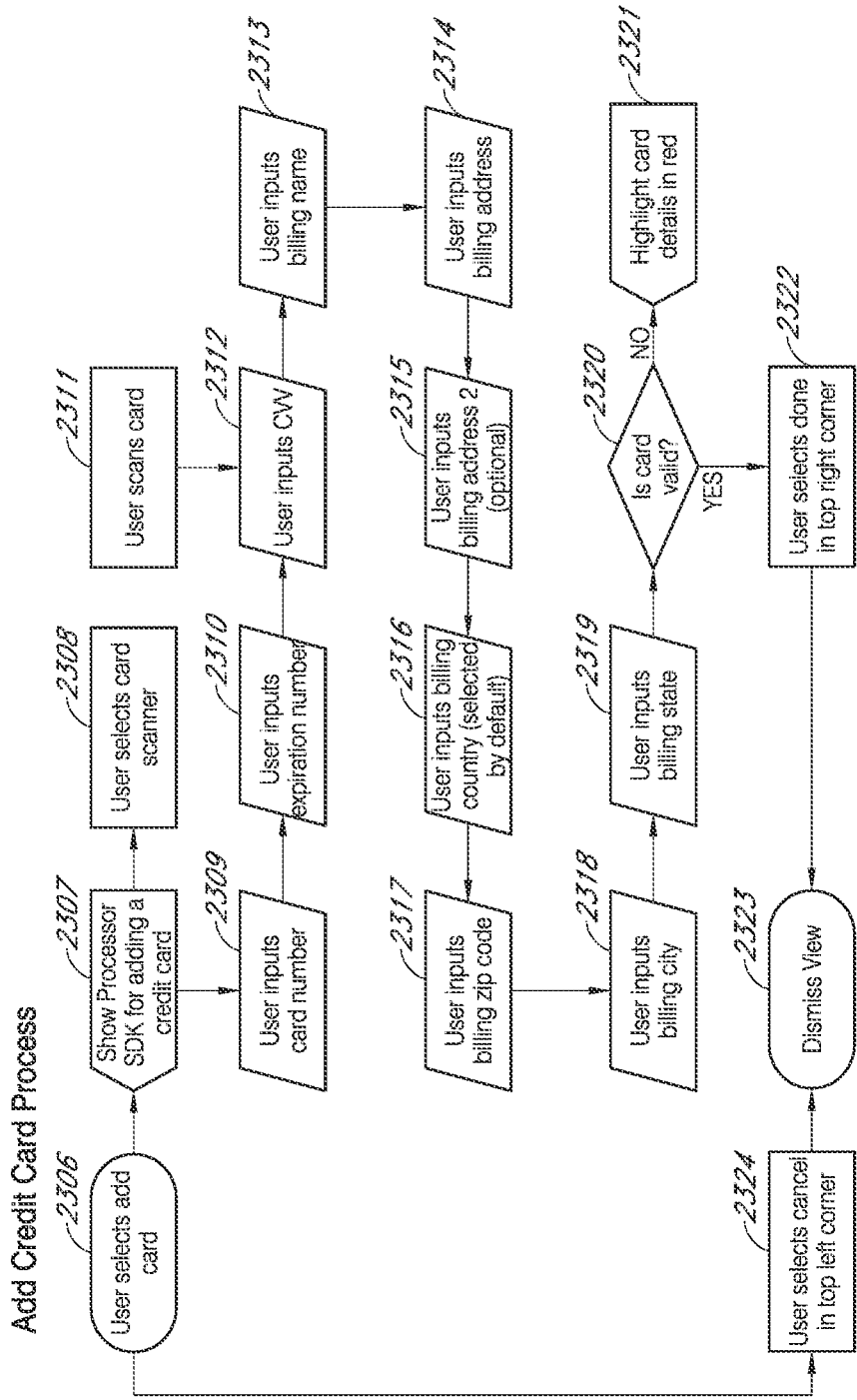

FIG. 23 is a schematic representation of a portion of the illustrative embodiment of a co-purchasing system & method showing an illustrative embodiment of a process for adding a credit card or debit card in the co-purchasing mobile application and/or web-based platform.

Figure 24:
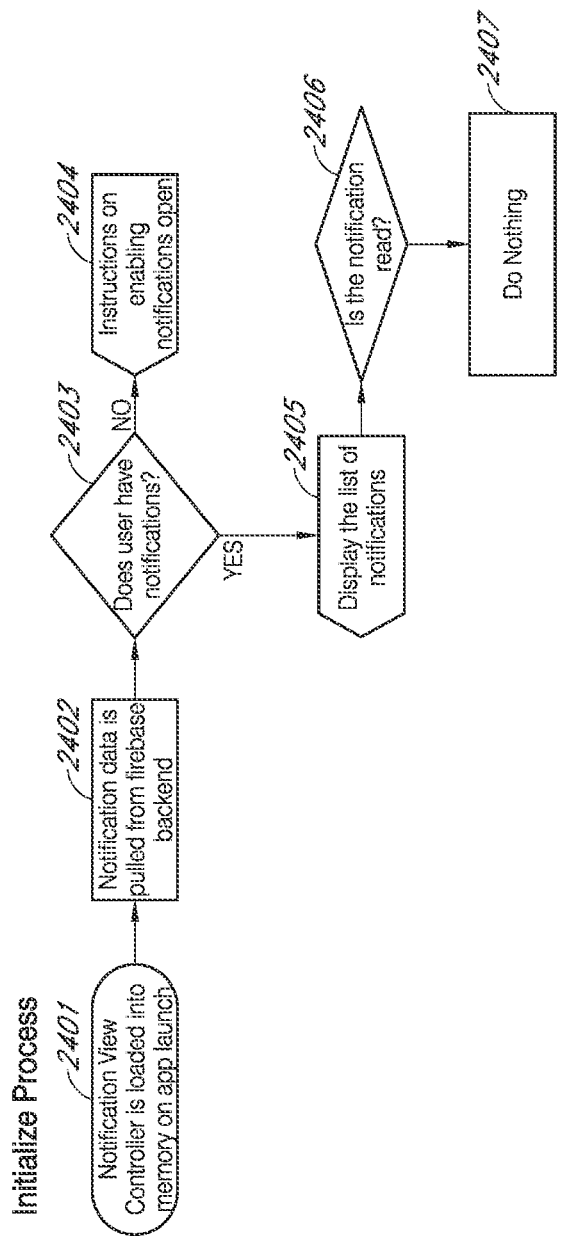
Figure 24:
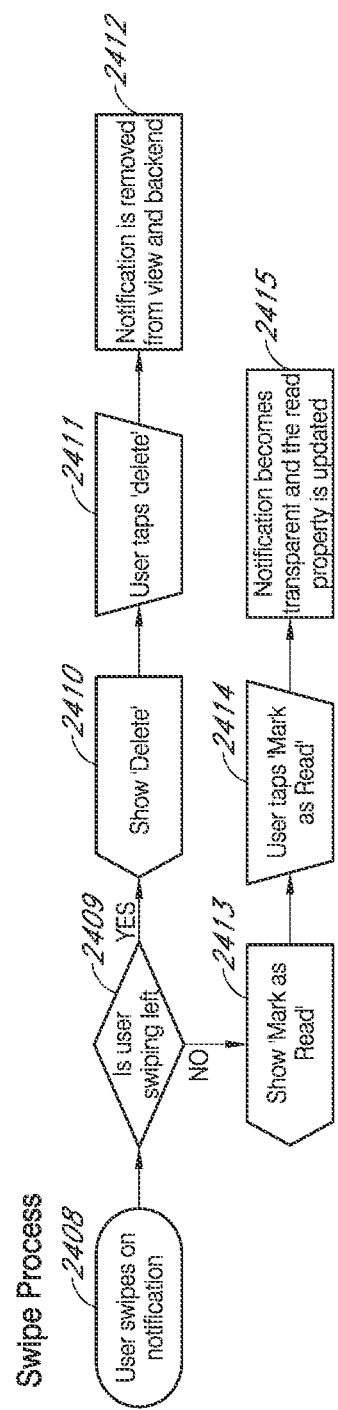
Figure 24:
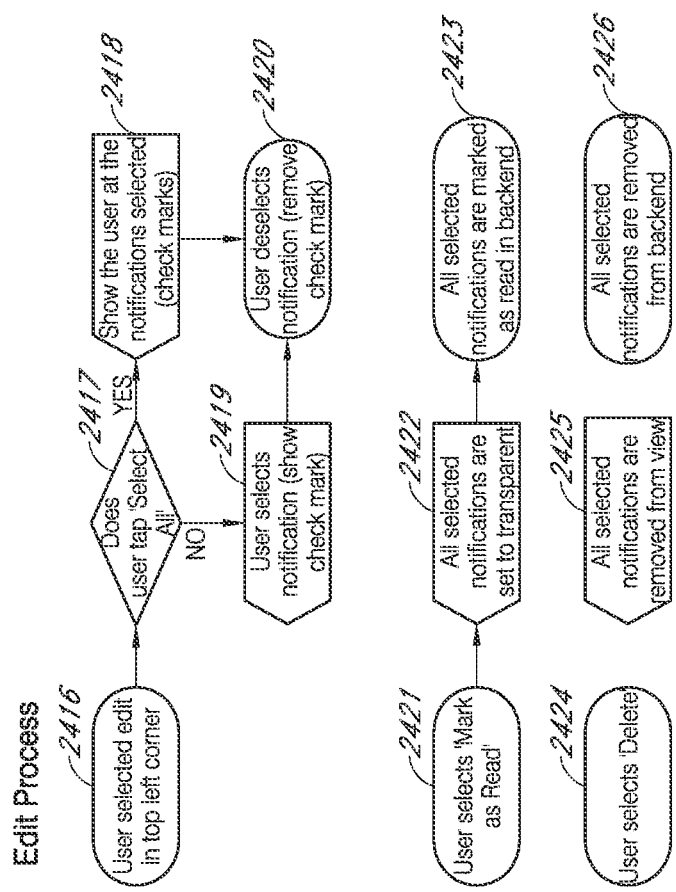

FIG. 24 is a schematic representation of a portion of the illustrative embodiment of a co-purchasing system & method showing an illustrative embodiment of the user notification settings in the co-purchasing mobile application and/or web-based platform.

Figure 25:
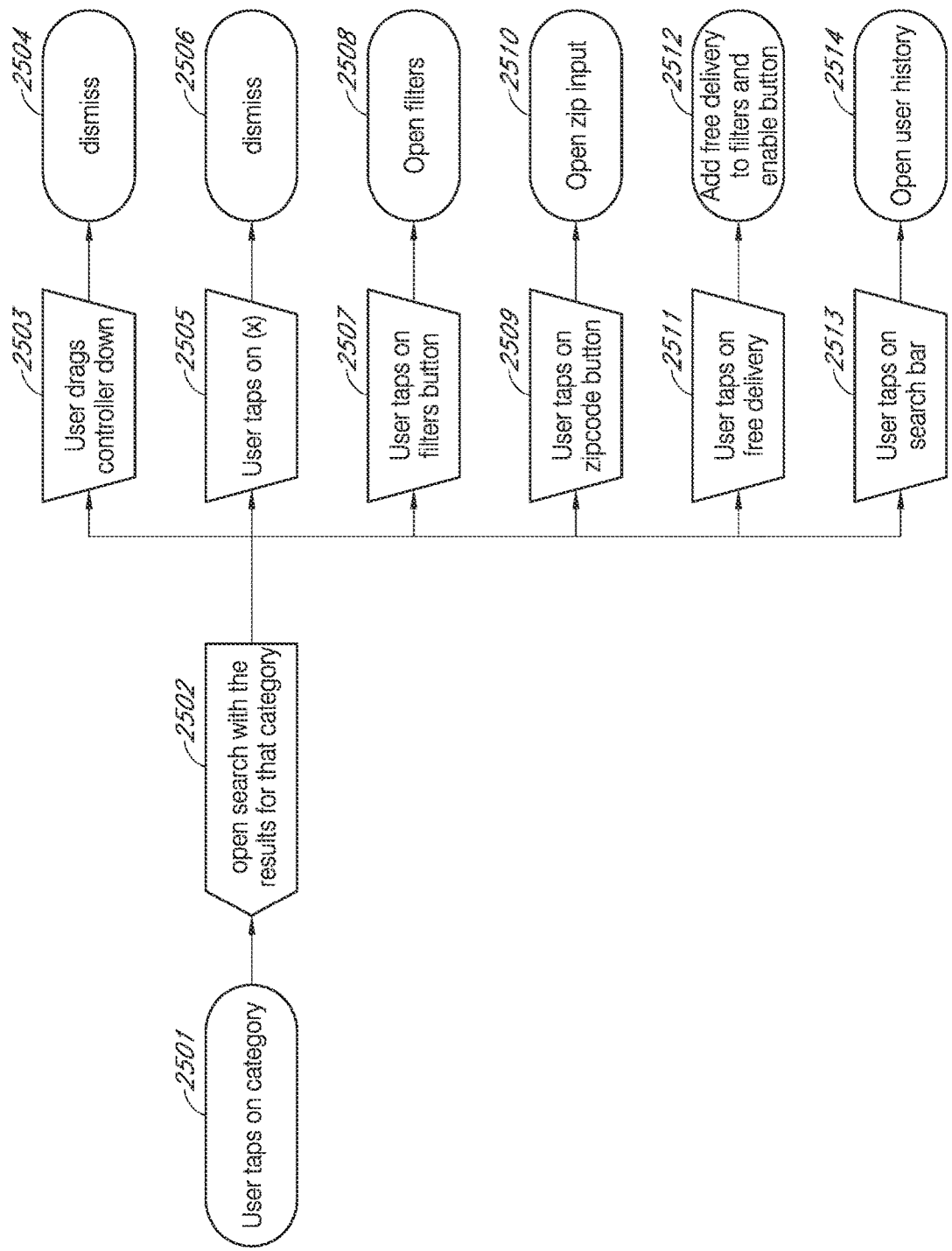

FIG. 25 is a schematic representation of a portion of the illustrative embodiment of a co-purchasing system & method showing how users can search by product category, further including without limitation, filtering, geographic location, availability, history, and prior searches, whether within the mobile application and/or web-based platform and/or on an e-commerce retailer's website.

Figure 26:
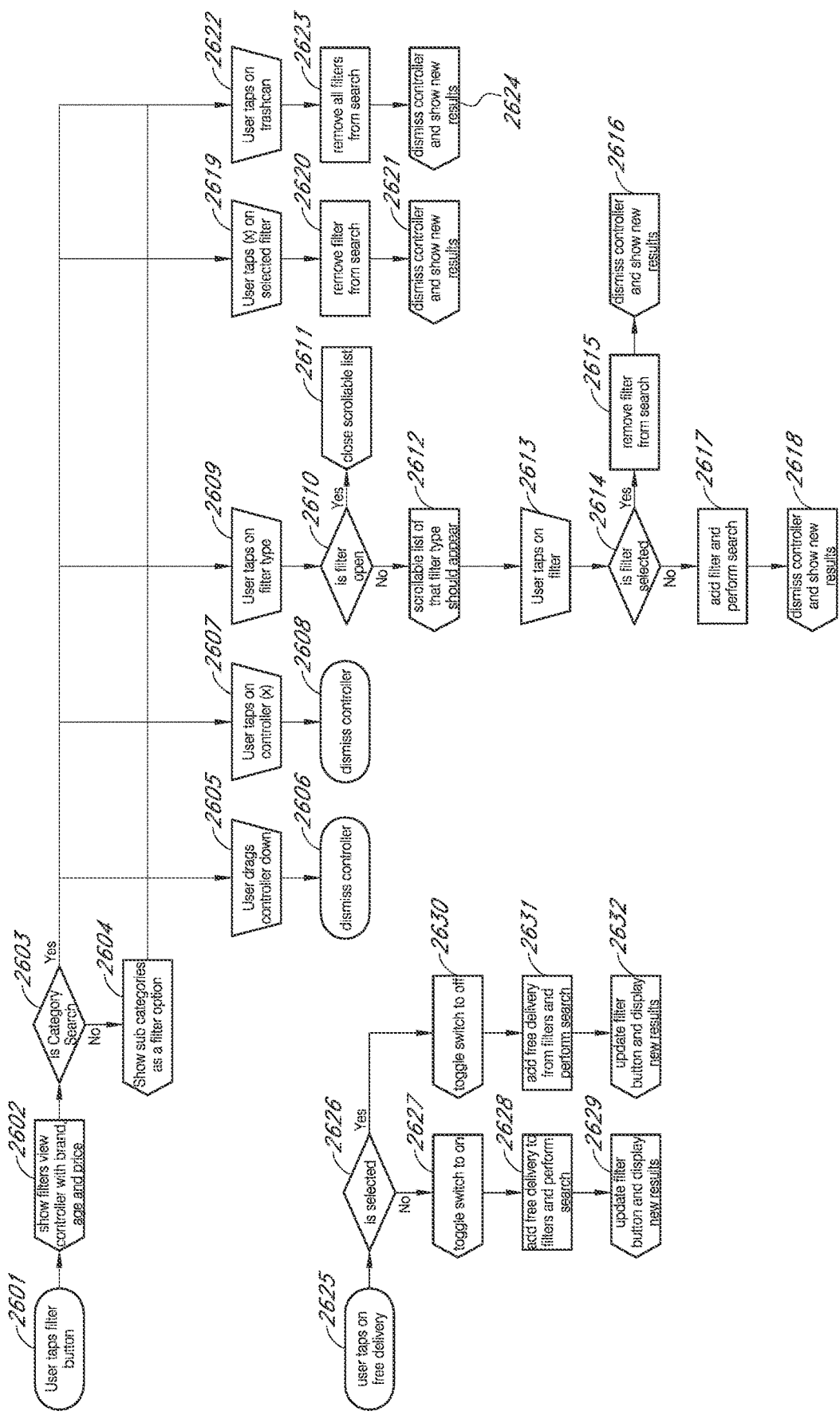

FIG. 26 is a schematic representation of a portion of the illustrative embodiment of a co-purchasing system & method showing certain product filter options, whether within the mobile application and/or web-based platform and/or on an e-commerce retailer's website.

Figure 27:
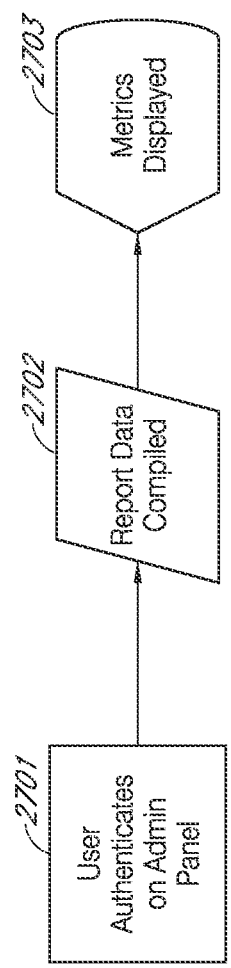

FIG. 27 is a schematic representation of a portion of the illustrative embodiment of a co-purchasing system & method by which an e-commerce merchant can access all information concerning consumer use of the system and sales via a retailer dashboard.

Figure 28A:
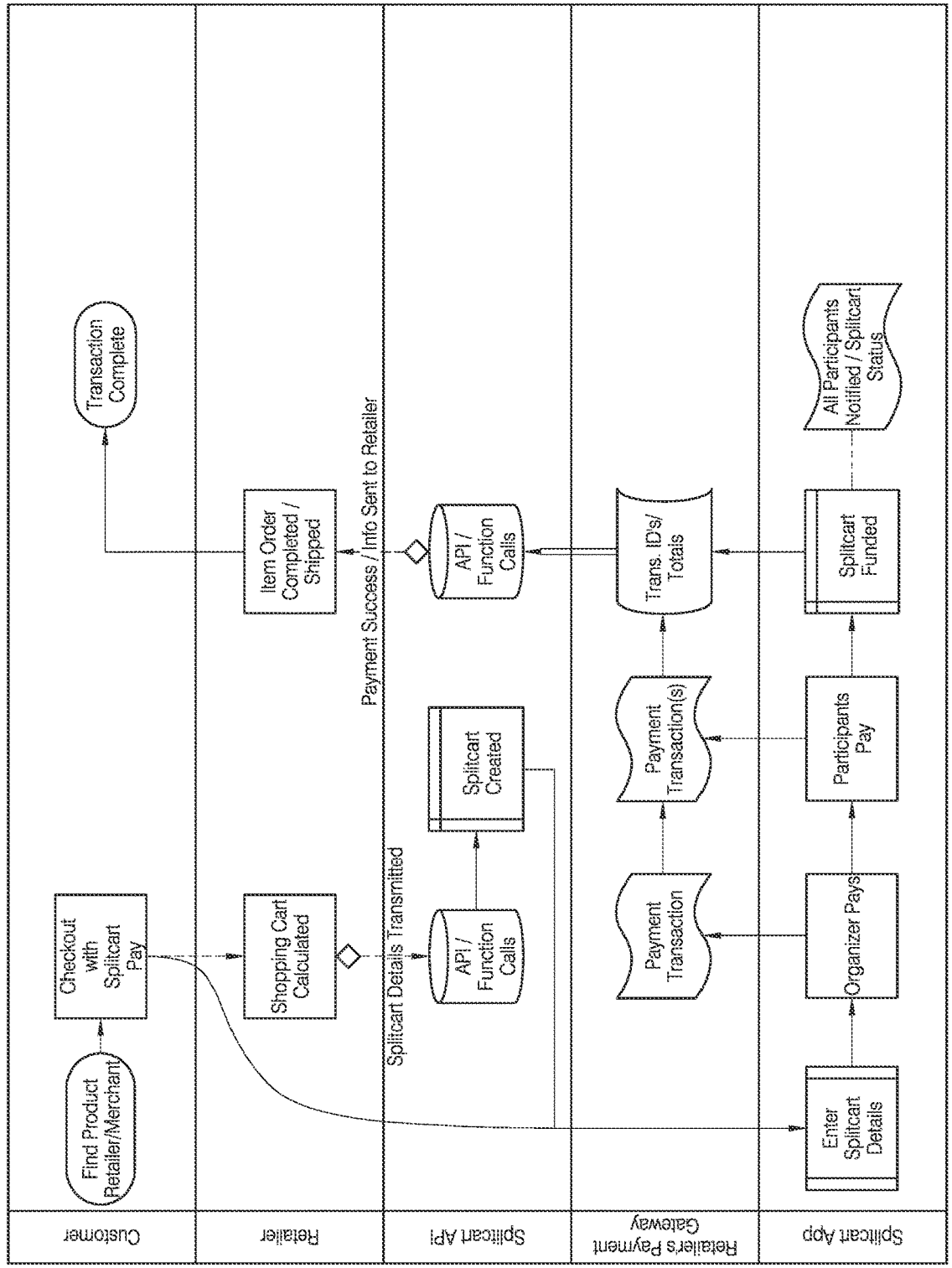

FIG. 28A is a schematic representation of a portion of an illustrative embodiment of a co-purchasing system & method.

Figure 28B:
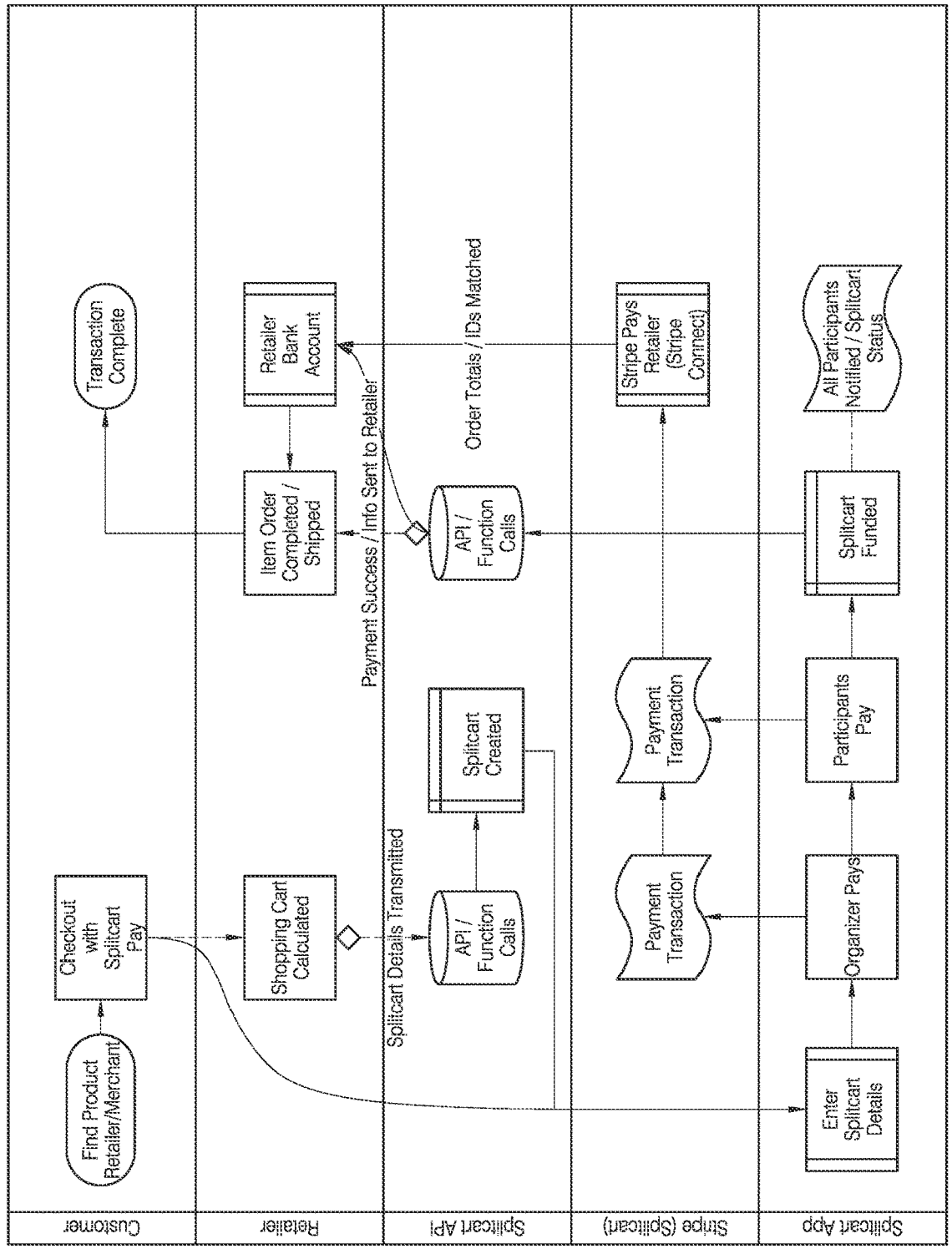

FIG. 28B is a schematic representation of a portion of another illustrative embodiment of a co-purchasing system & method.

Figure 29:
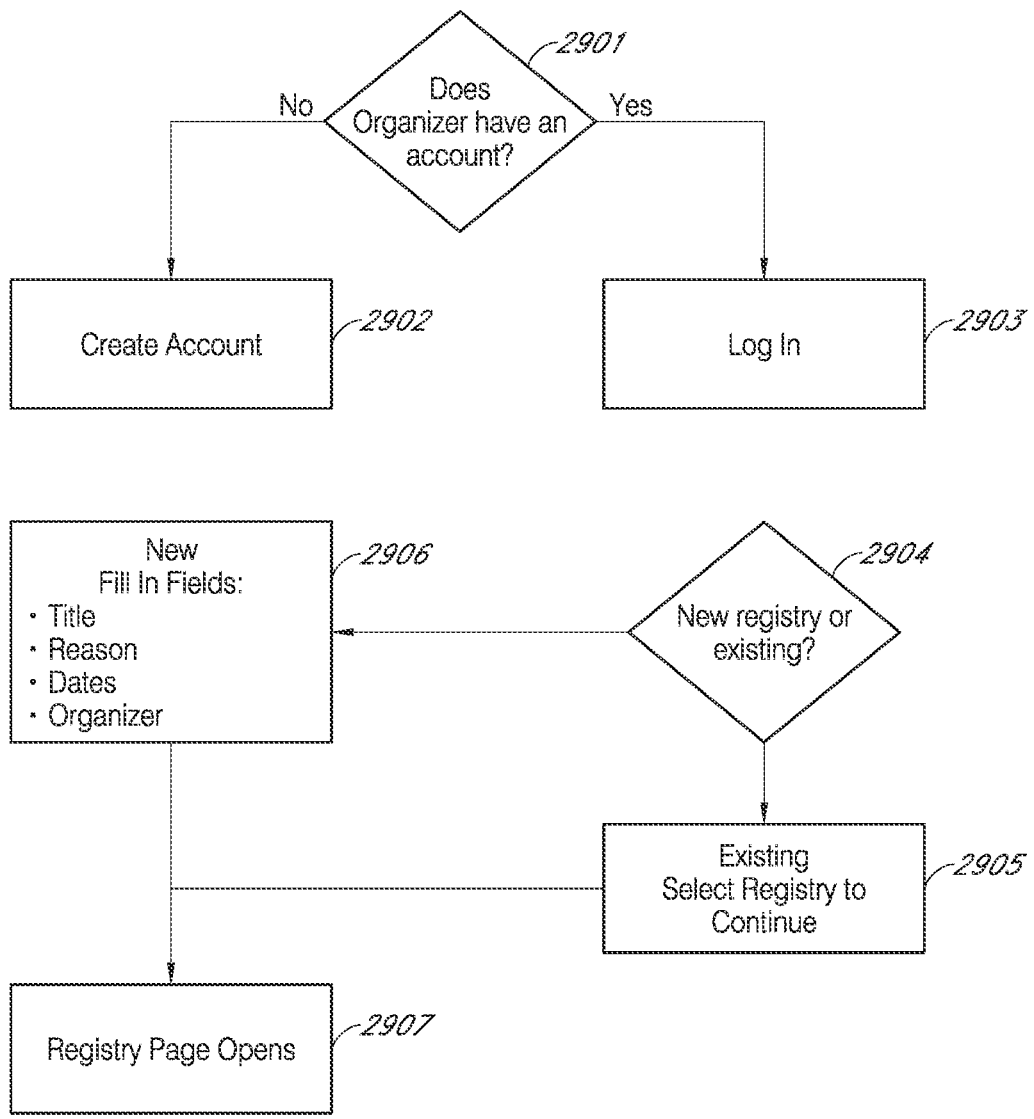

FIG. 29 is a schematic representation of the illustrative embodiment of a co-purchasing system & method showing how a gift registry may be created within the co-purchasing system & method platform.

Figure 30:
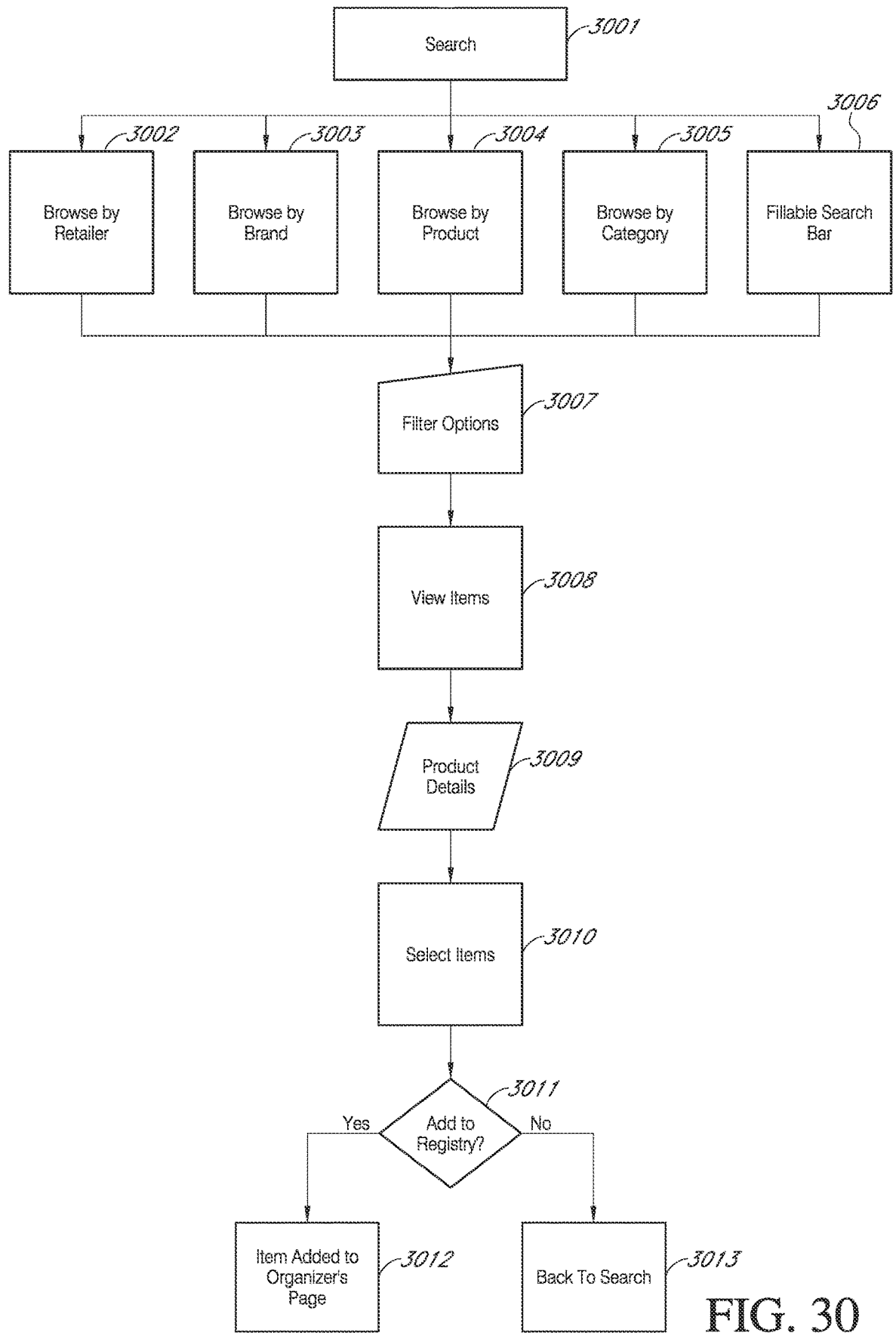

FIG. 30 is a schematic representation of the illustrative embodiment of a co-purchasing system & method showing how a user may search a gift registry that was created within the co-purchasing system & method platform.

Figure 31:
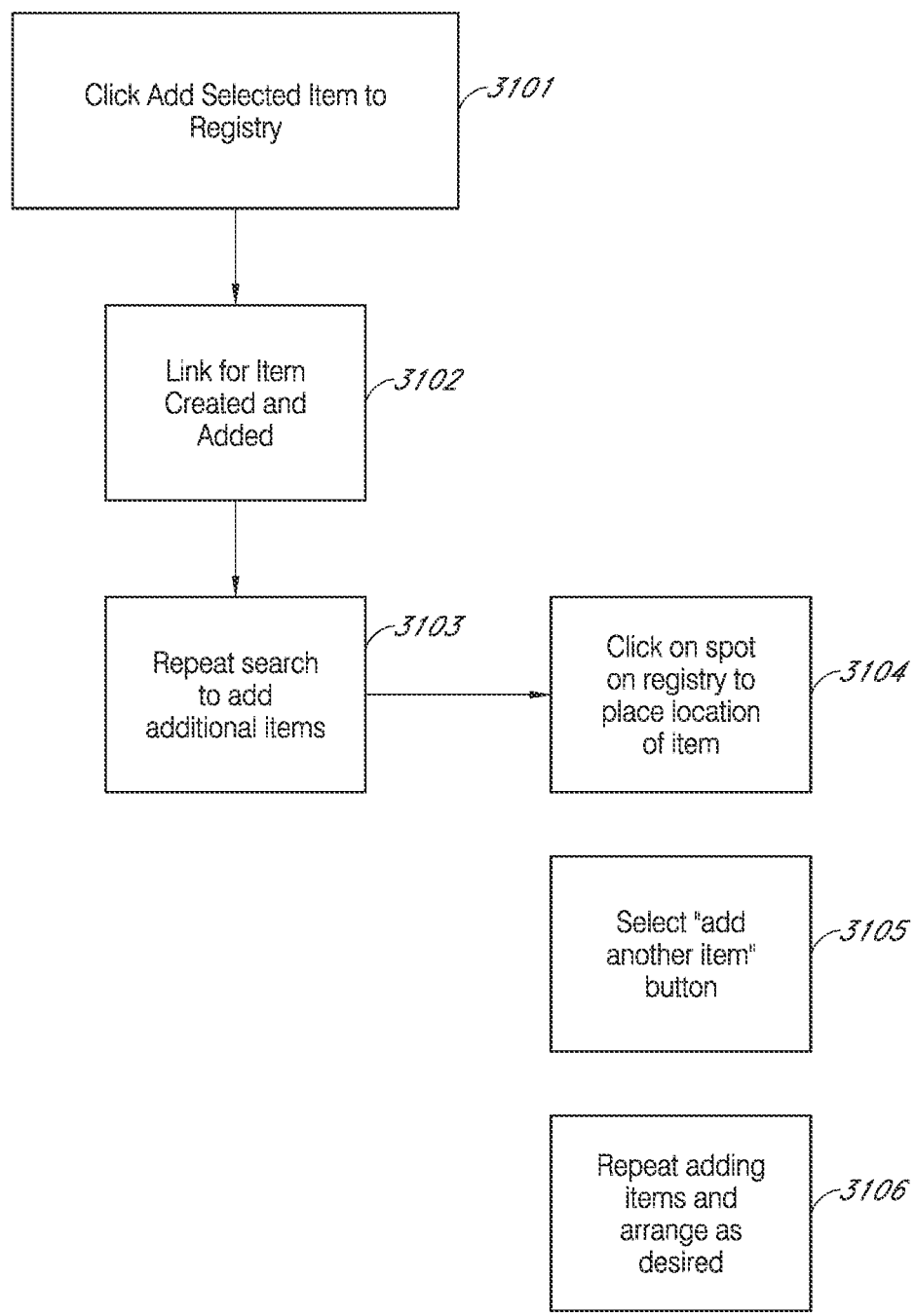

FIG. 31 is a schematic representation of the illustrative embodiment of a co-purchasing system & method showing how a gift registry may be organized and/or items added and/or removed from the registry.

Figure 32:
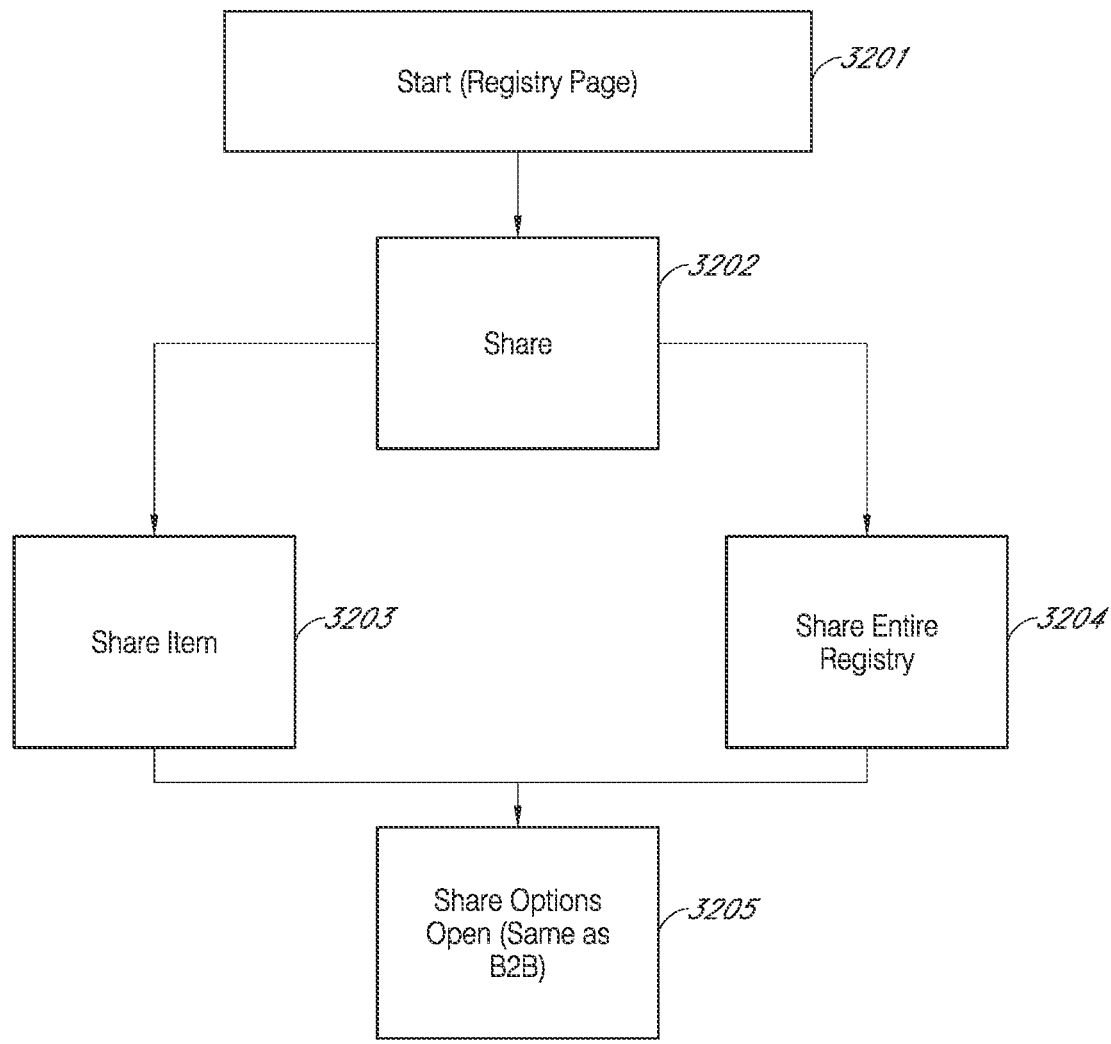

FIG. 32 is a schematic representation of the illustrative embodiment of a co-purchasing system & method showing how a user may share an item and/or subset of items from a gift registry.

Figure 33:
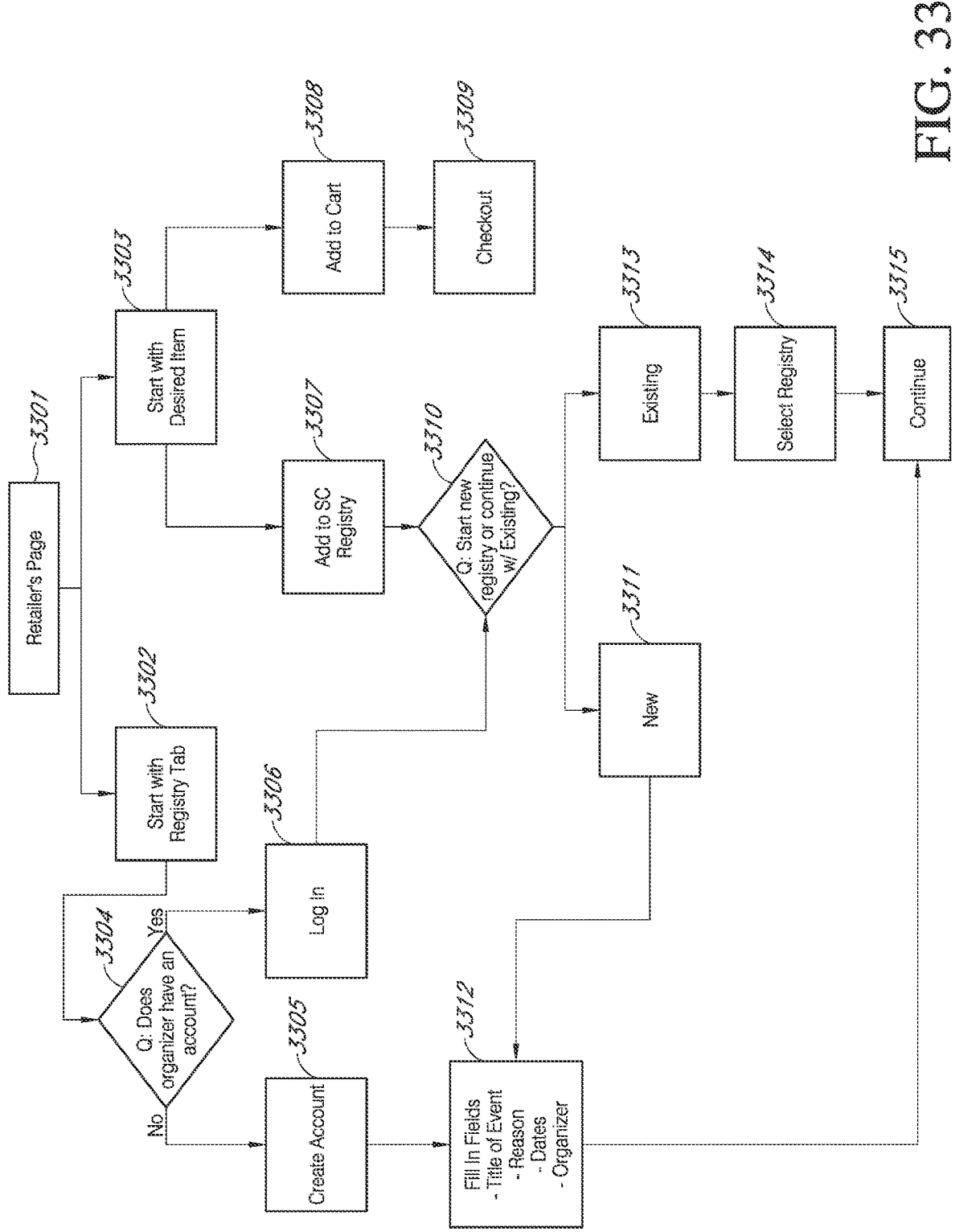

FIG. 33 is a schematic representation of the illustrative embodiment of a co-purchasing system & method showing how a gift registry may be created within a retailer's website into which the co-purchasing system & method platform has been integrated.

Figure 34:
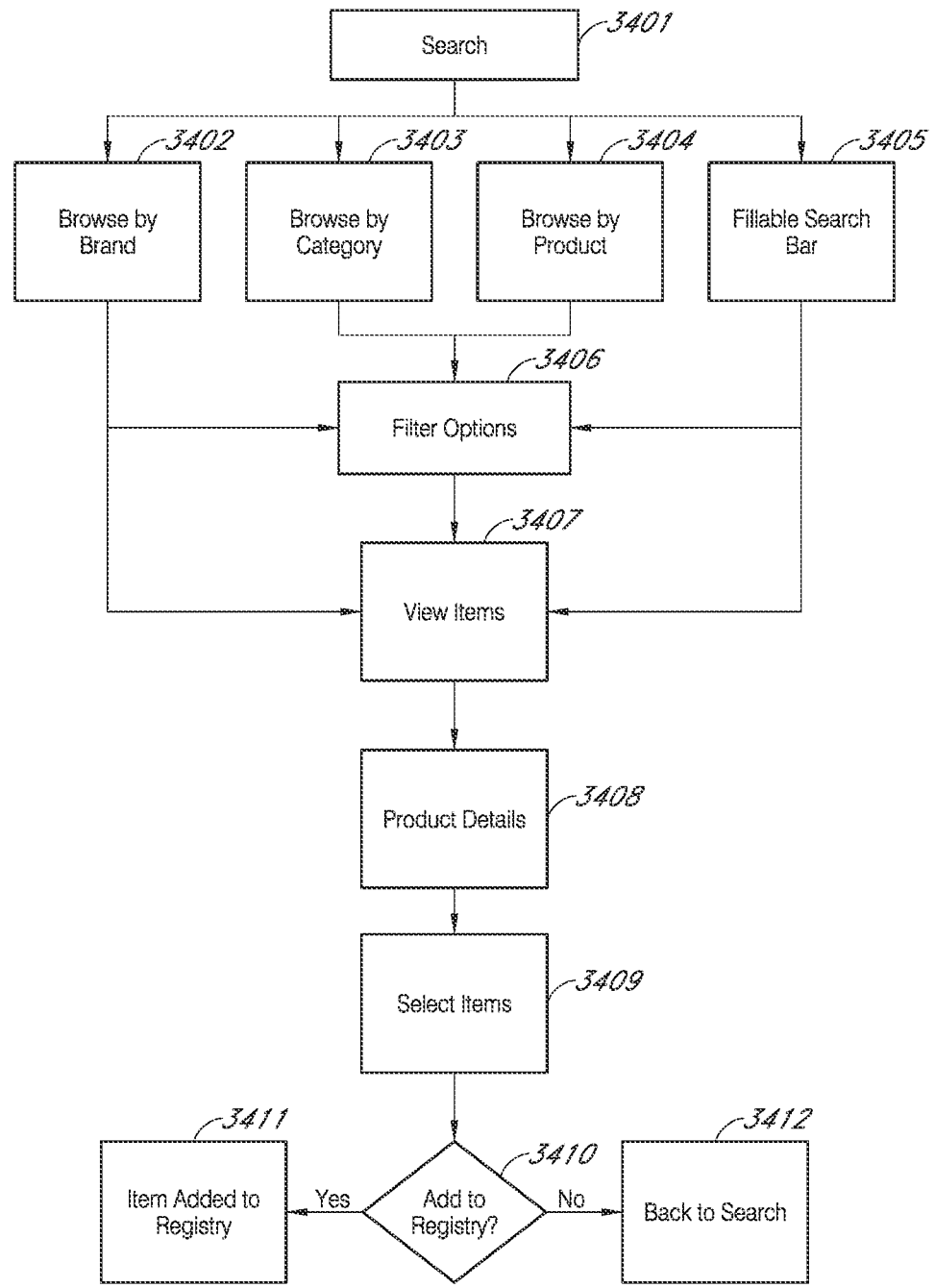

FIG. 34 is a schematic representation of the illustrative embodiment of a co-purchasing system & method showing how a user may search a gift registry that was created within a retailer's website into which the co-purchasing system & method platform has been integrated.

Figure 35:
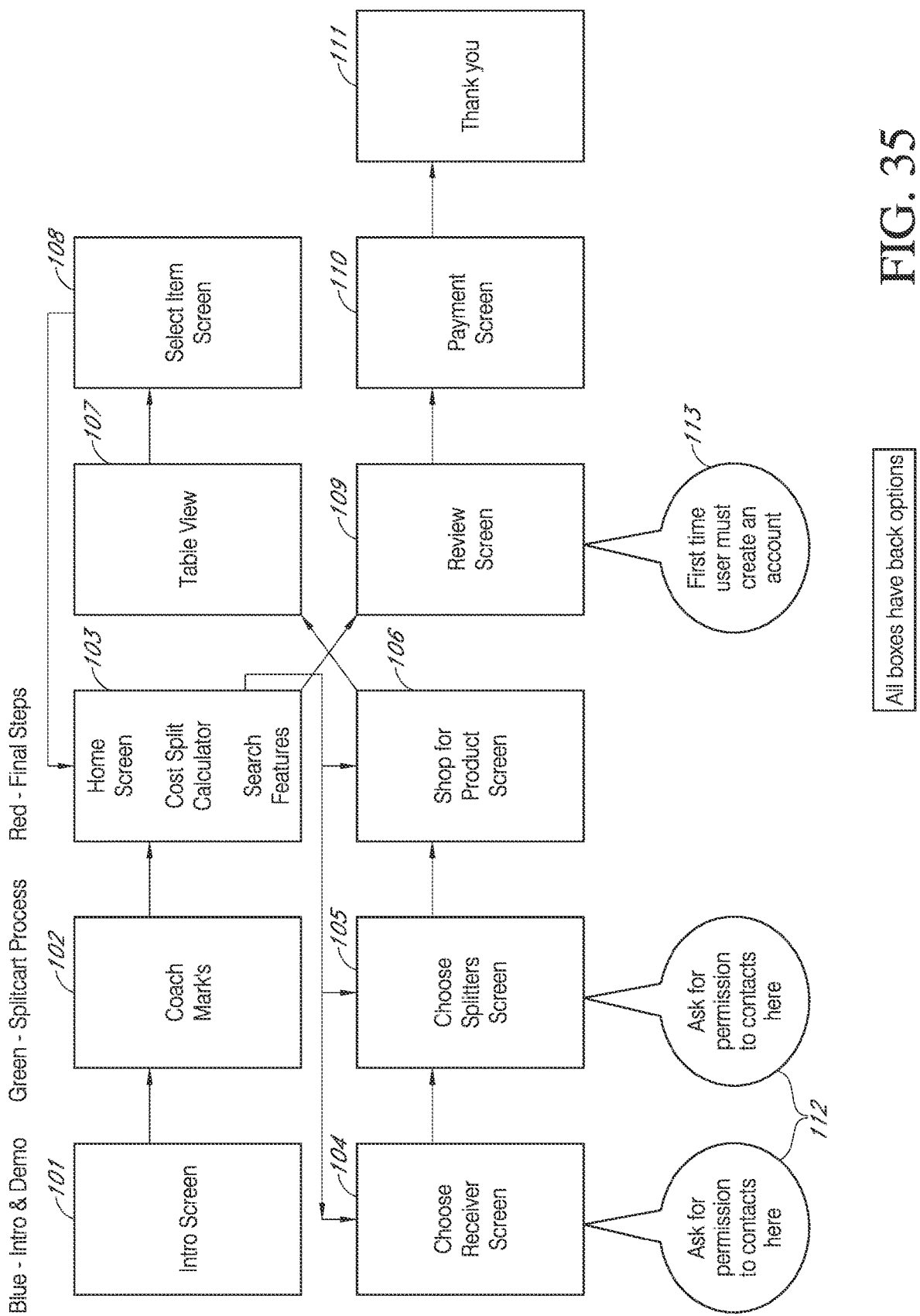

FIG. 35 is an overview of a gift splitting process for use of an application or a website as disclosed herein.

Figure 36:
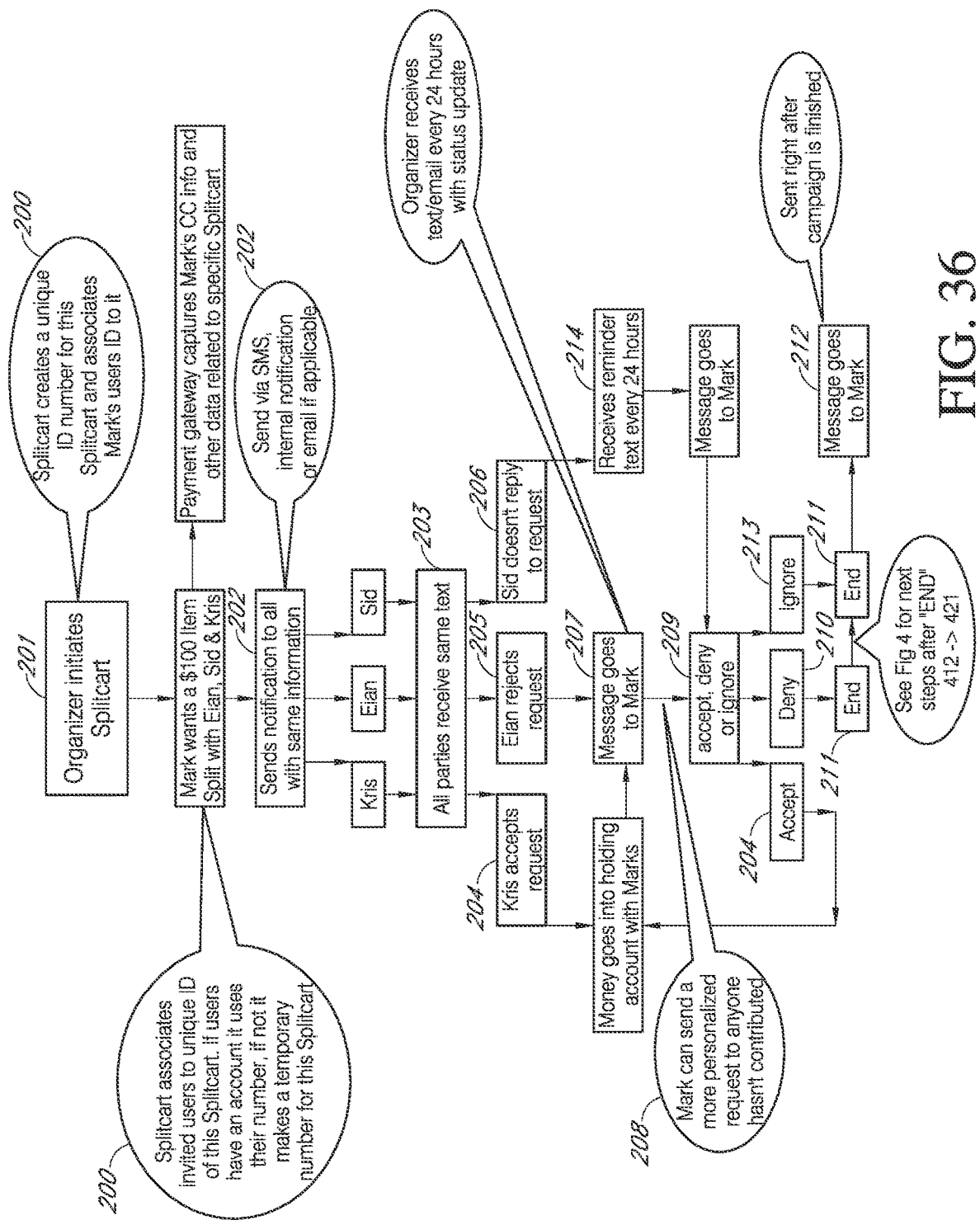

FIG. 36 is an overview of one embodiment of the Splitcart process as disclosed herein.

Figure 37:
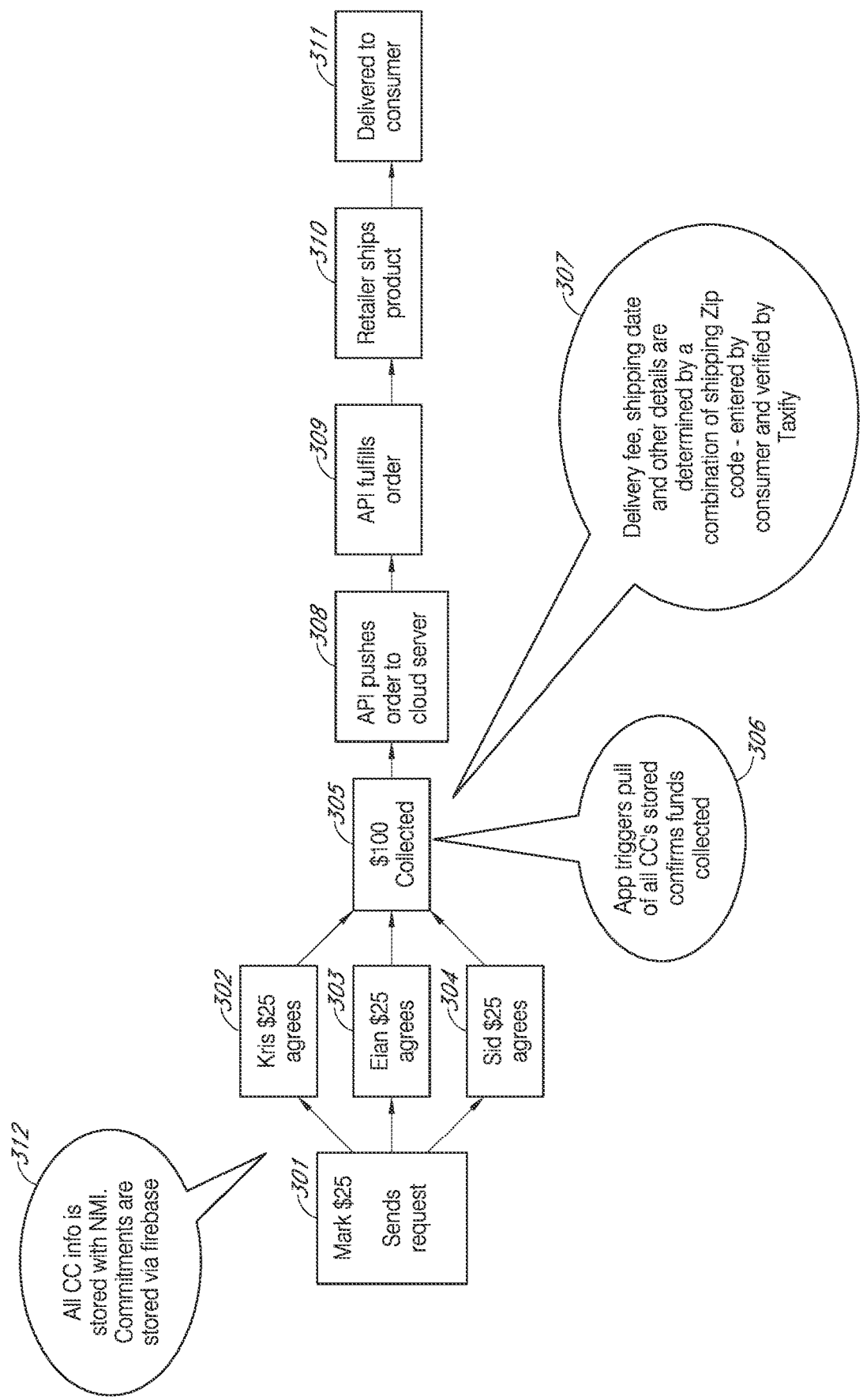

FIG. 37 is a process map of a flow of money and order processing as it relates to the Splitcart process as disclosed in FIG. 36.

Figure 38:
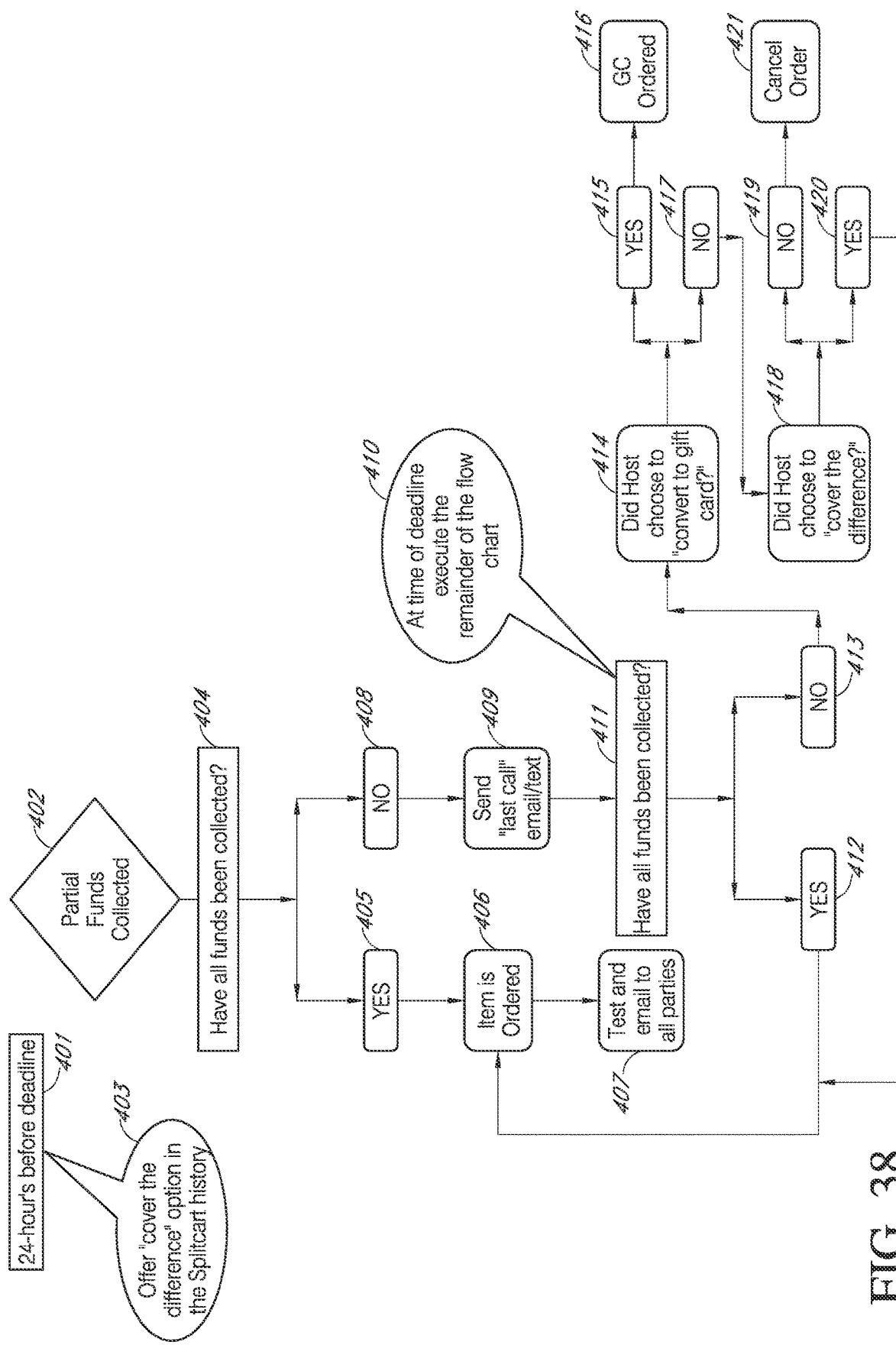

FIG. 38 is a high-level overview of a Splitcart process of what may happen if all the funds are not collected for the item selected as disclosed herein.

Figure 39:

FIG. 39 is an overview of a forward-facing experience that the user may have once downloaded the Splitcart application as disclosed herein.

Figure 40:

FIG. 40 is an overview of a coach mark of the Splitcart application as disclosed herein.

Figure 41:
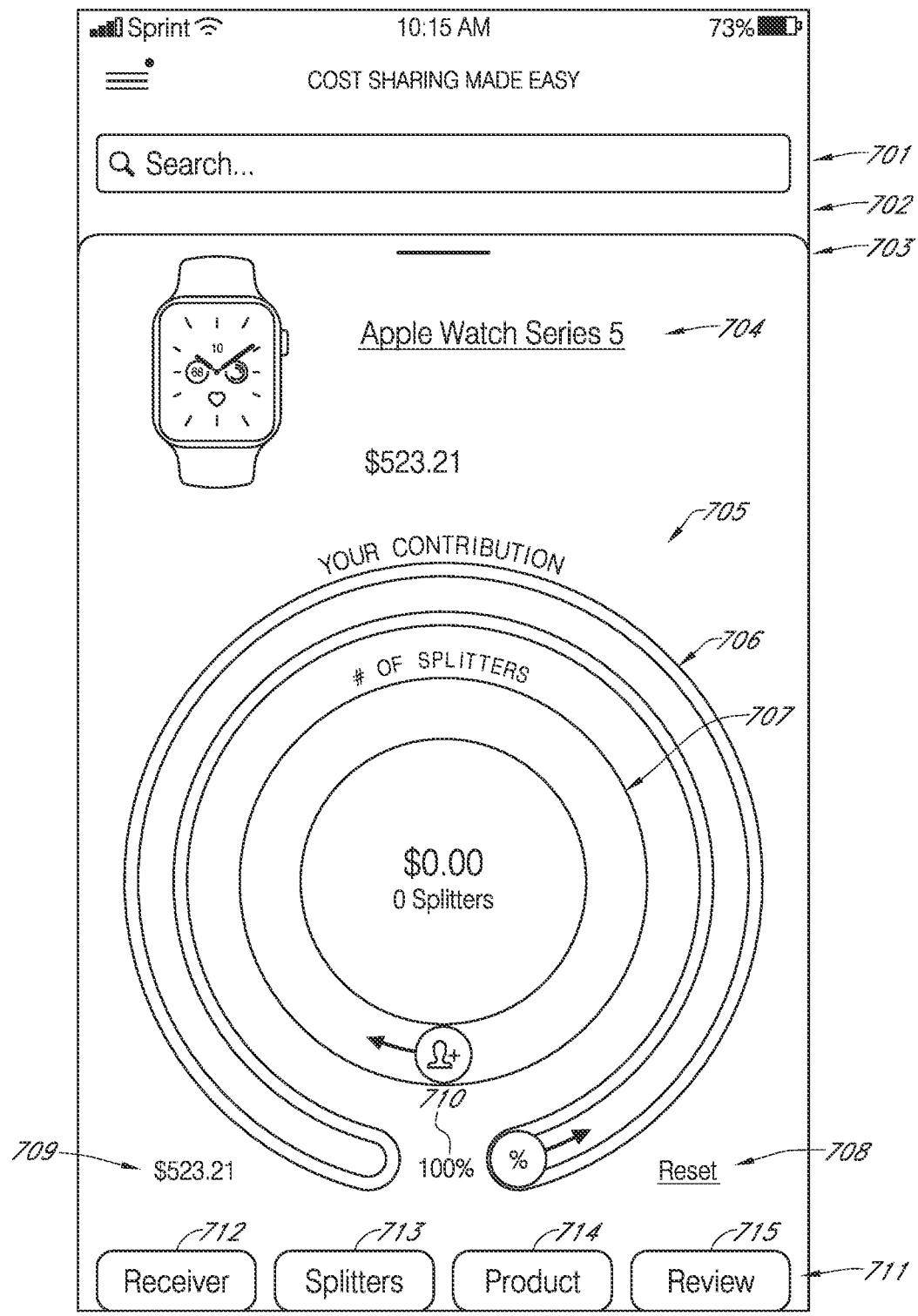

FIG. 41 is an example of what a home screen will look like after the coach mark's are completed. This is an overview of the heart of the app, the forward facing screen which offers multiple points of access to the entirety of the app as disclosed herein.

Figure 42:
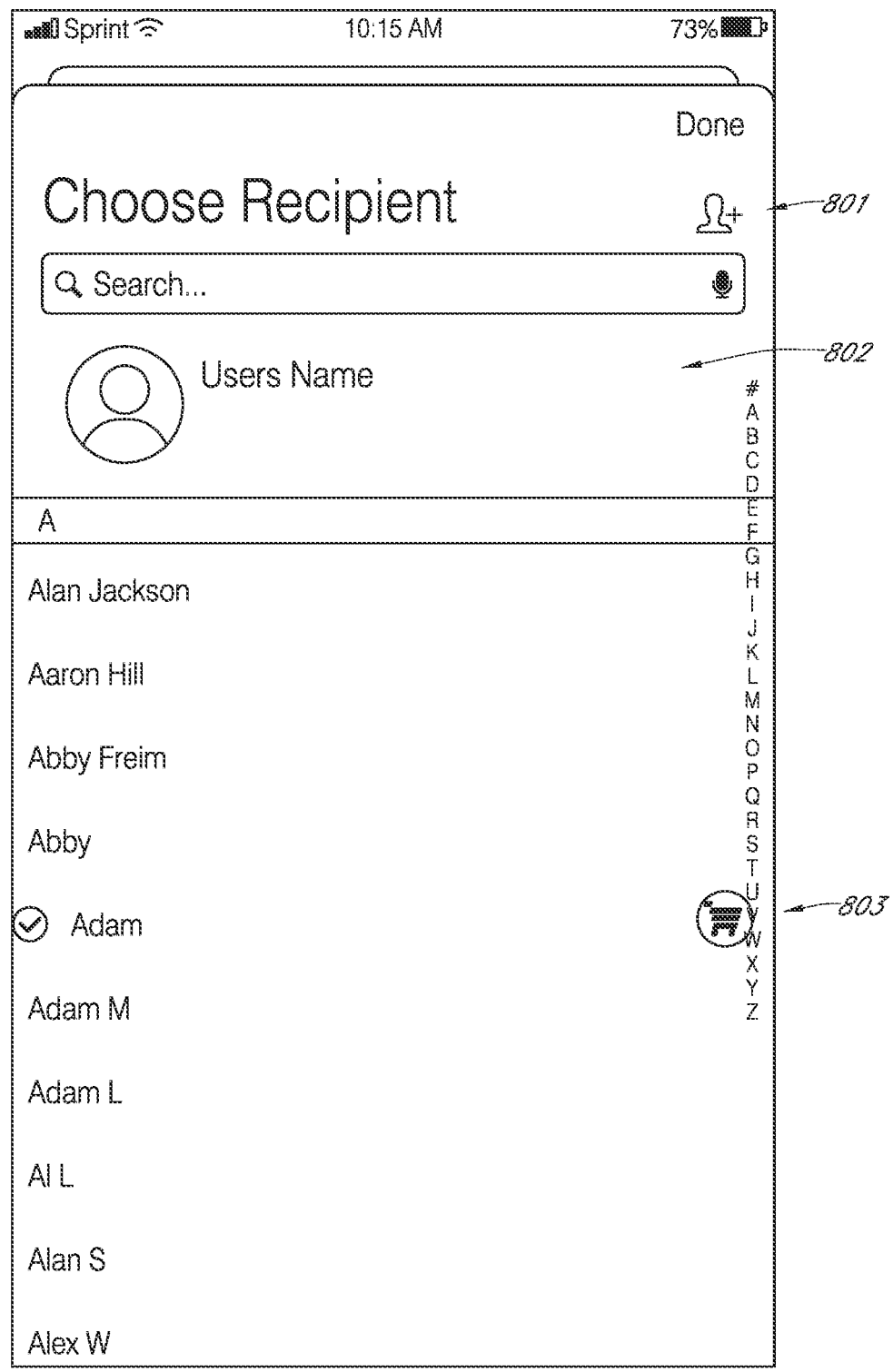

FIG. 42 is an overview of the receiver or choose recipients screen as disclosed herein.

Figure 43:
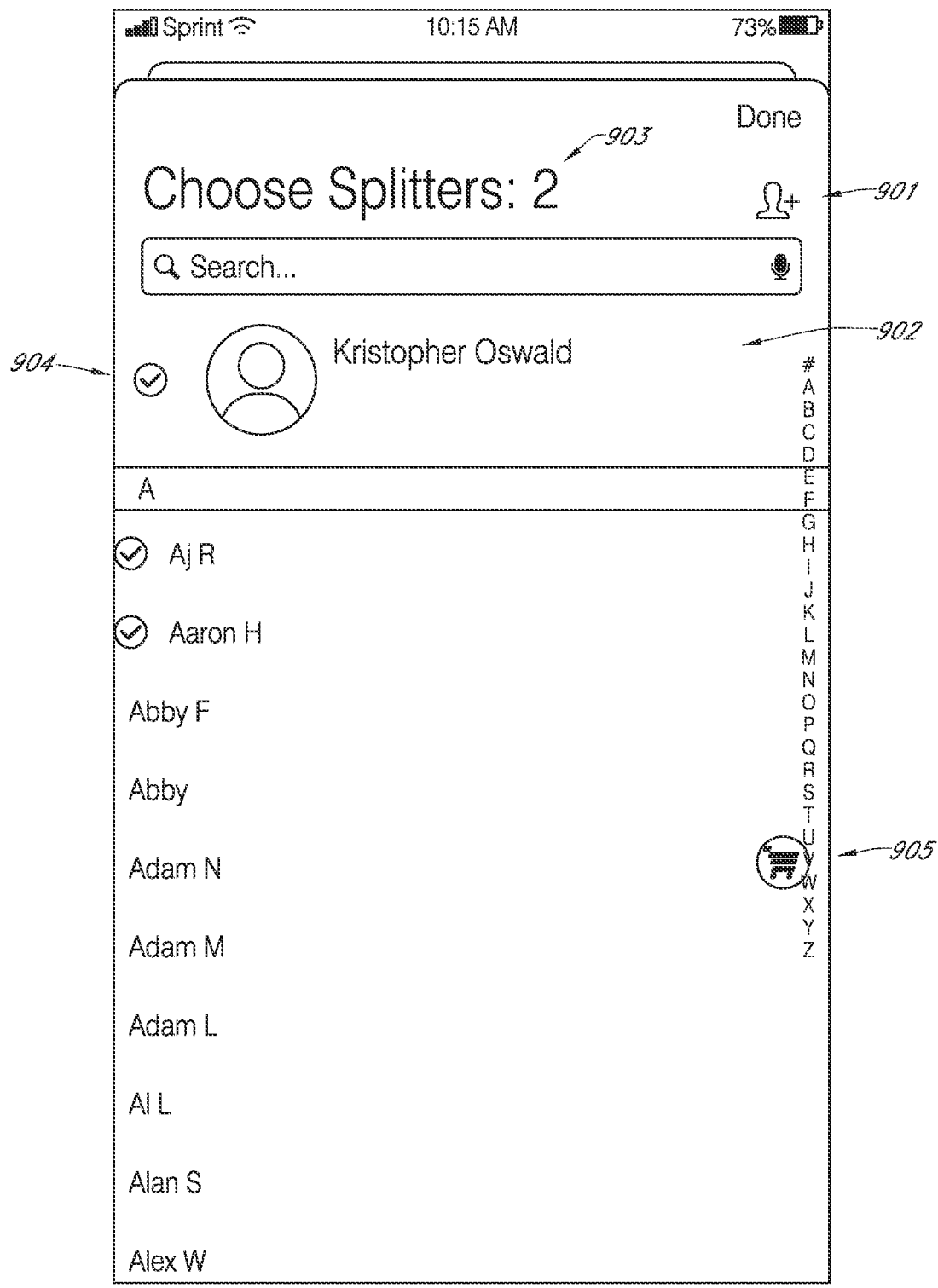

FIG. 43 is an overview of the splitter or choose splitters screen as disclosed herein.

Figure 44:
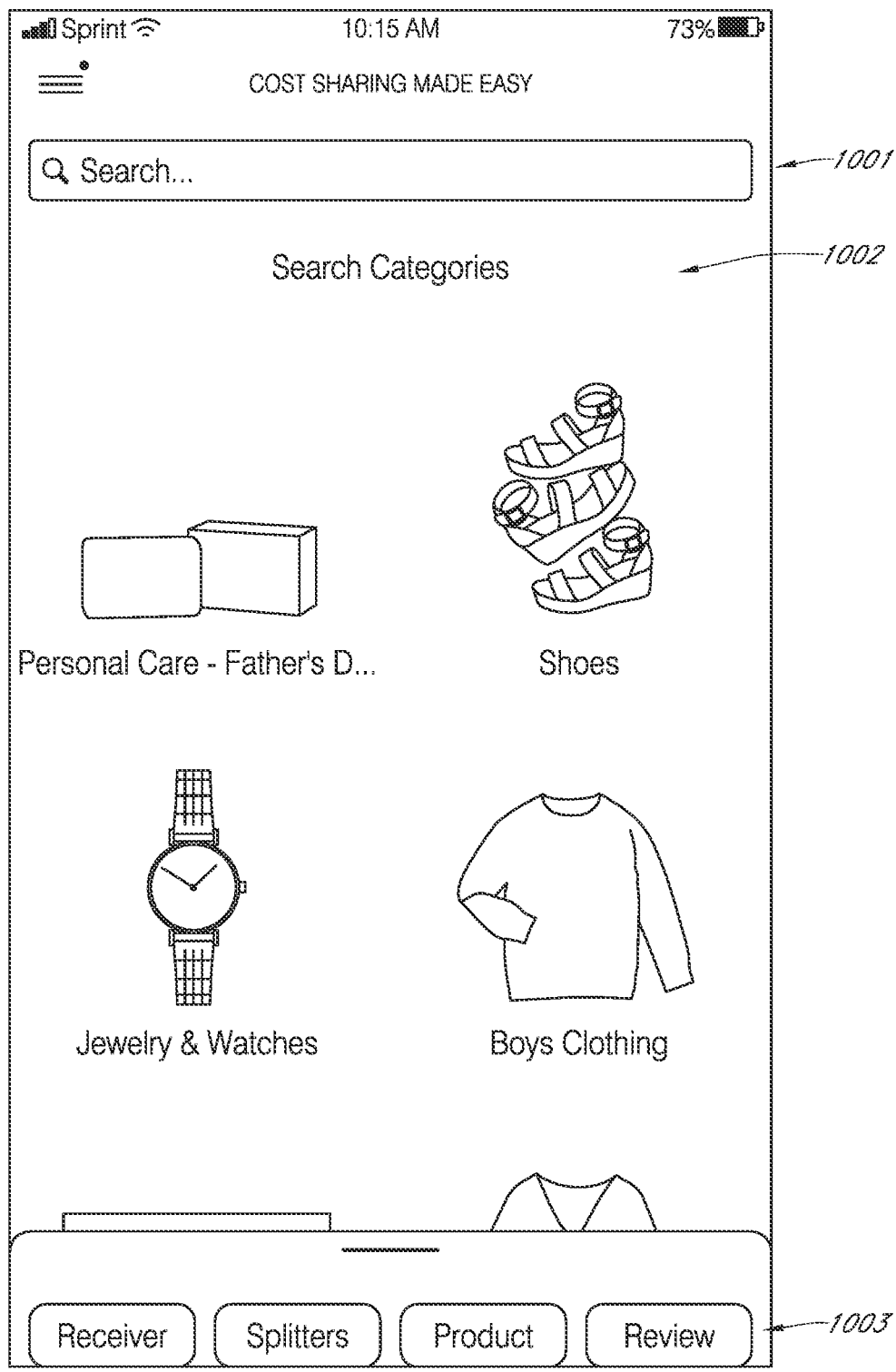

FIG. 44 is an overview of the manual search and category search screen as disclosed herein.

Figure 45:
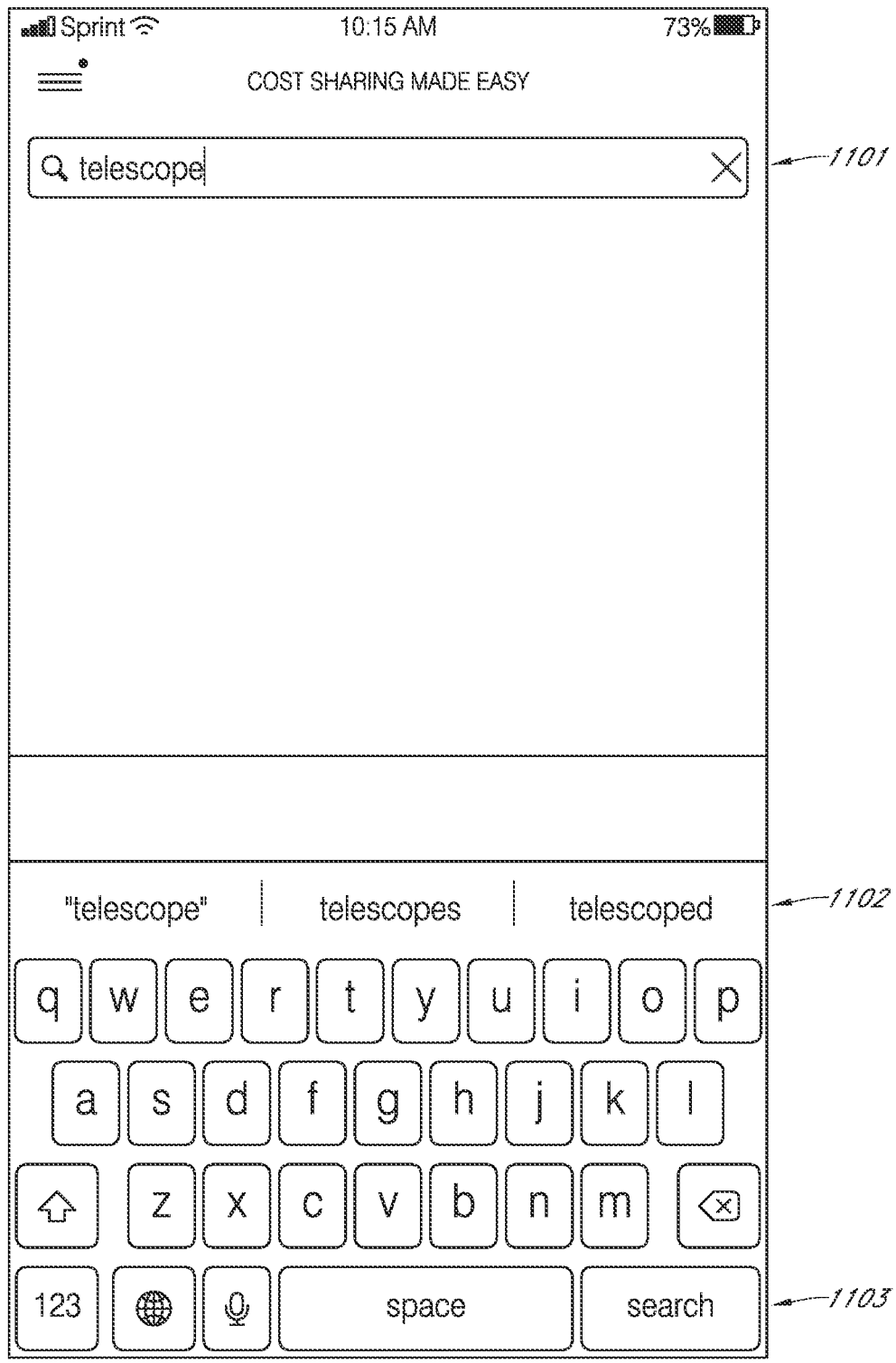

FIG. 45 is a representation of a manual search with autofill being utilized.

Figure 46:
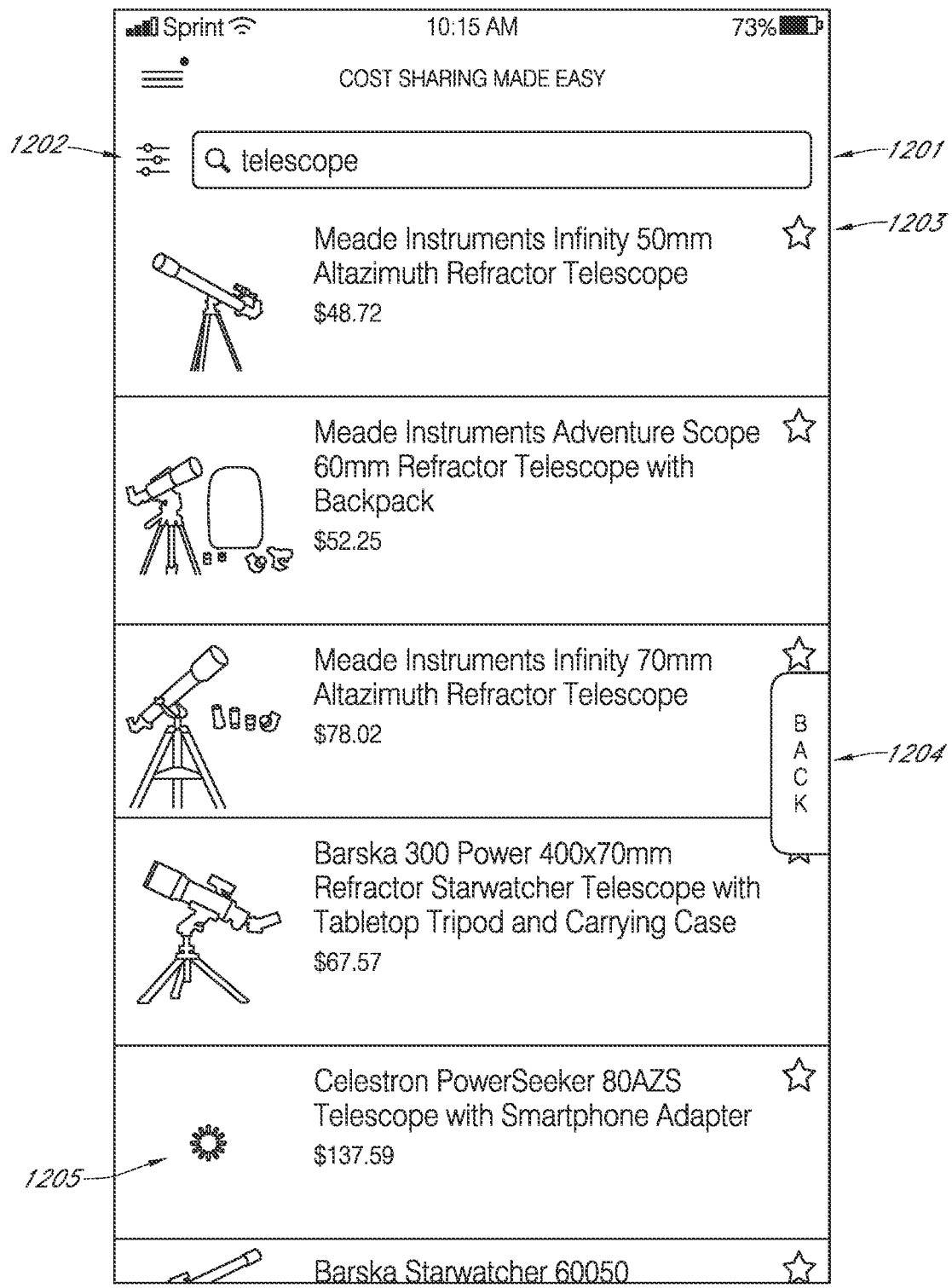

FIG. 46 is an overview of the search table view controller disclosed herein.

Figure 47:
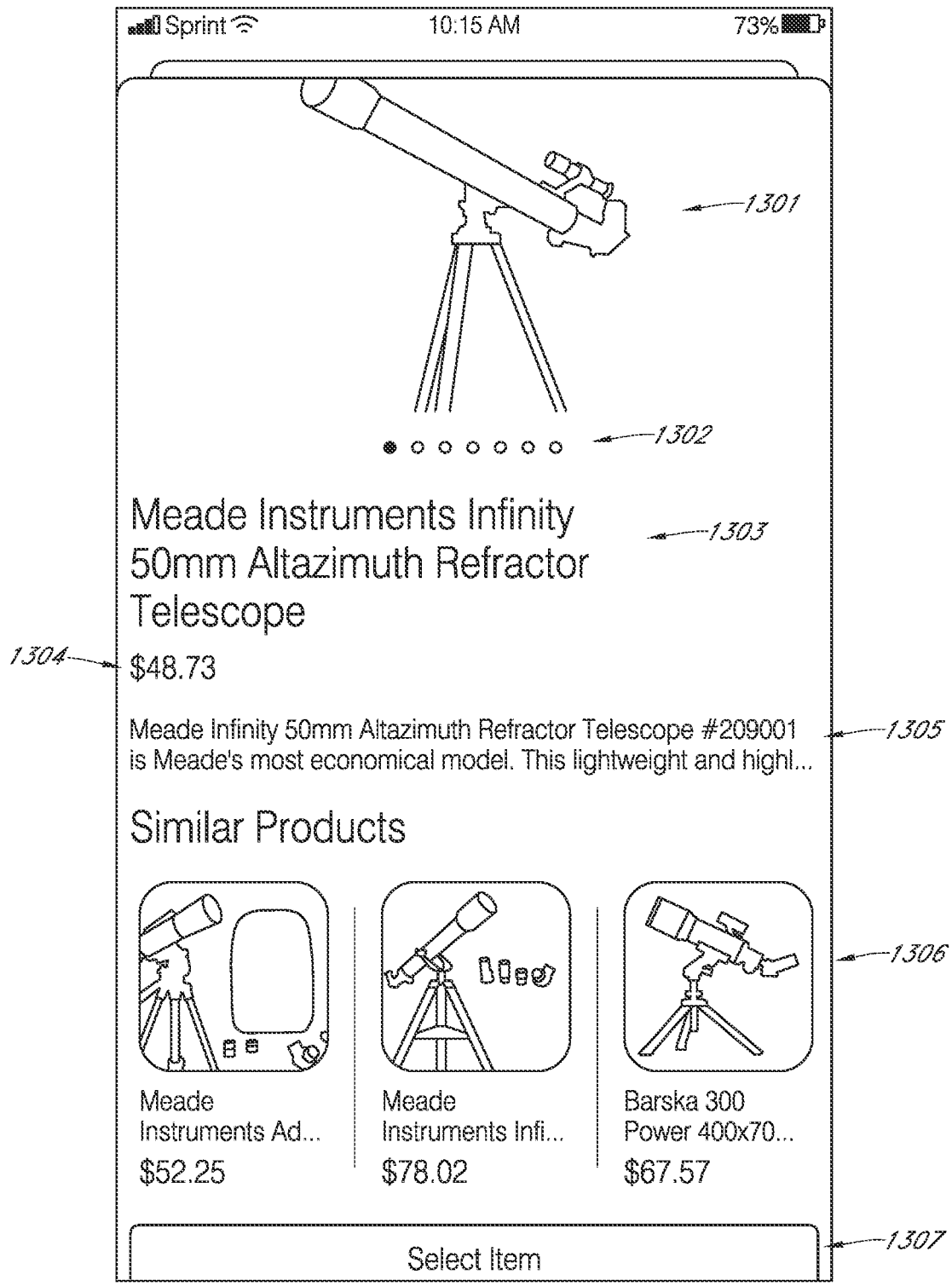

FIG. 47 is an overview of the select items screen as disclosed herein.

Figure 48:
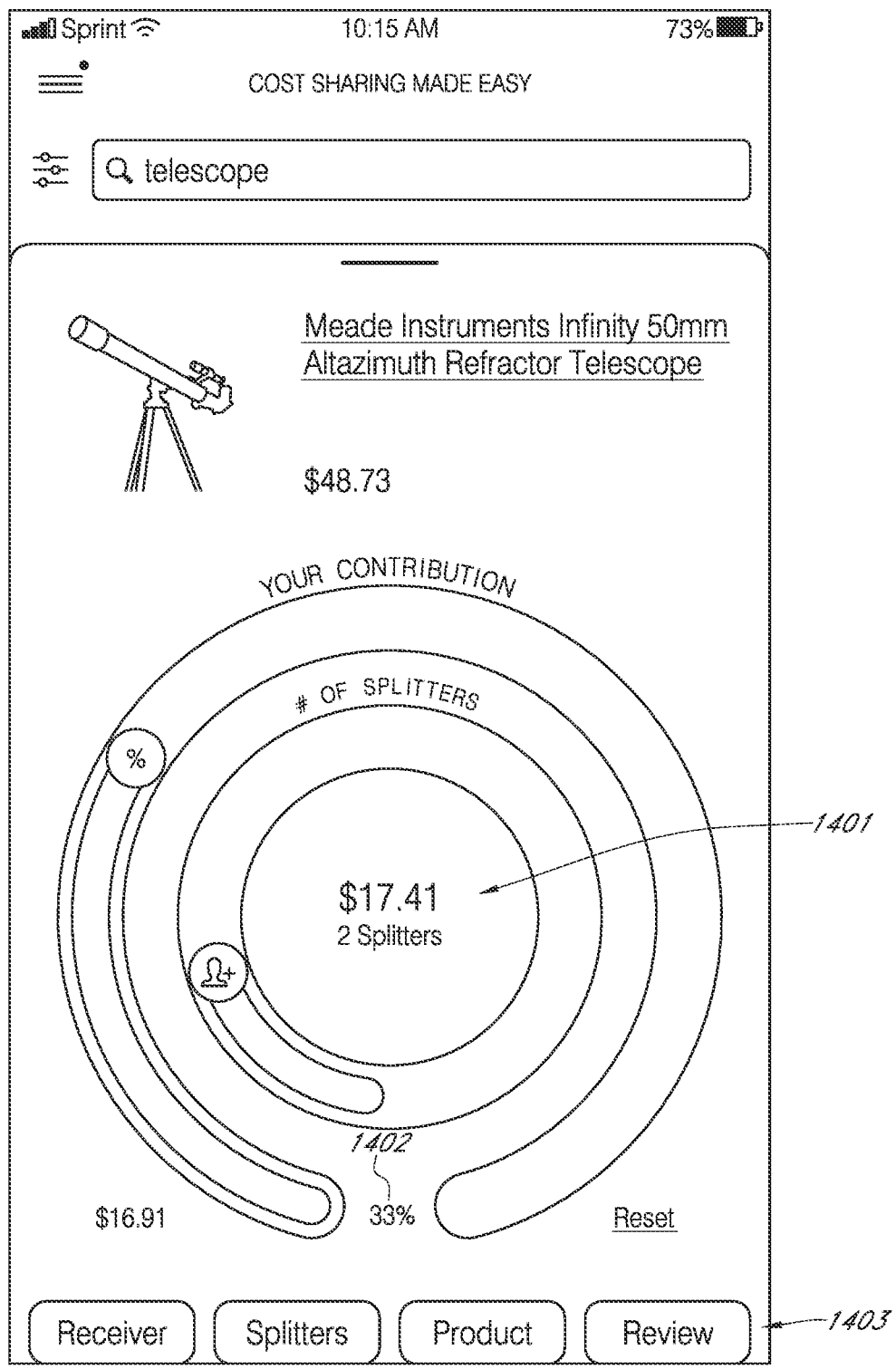

FIG. 48 is a representation the home screen once a specific item is selected and the organizer has selected a determined number of splitters as well as the inner and outer rings of the Splitcart cost calculator as disclosed herein.

Figure 49:
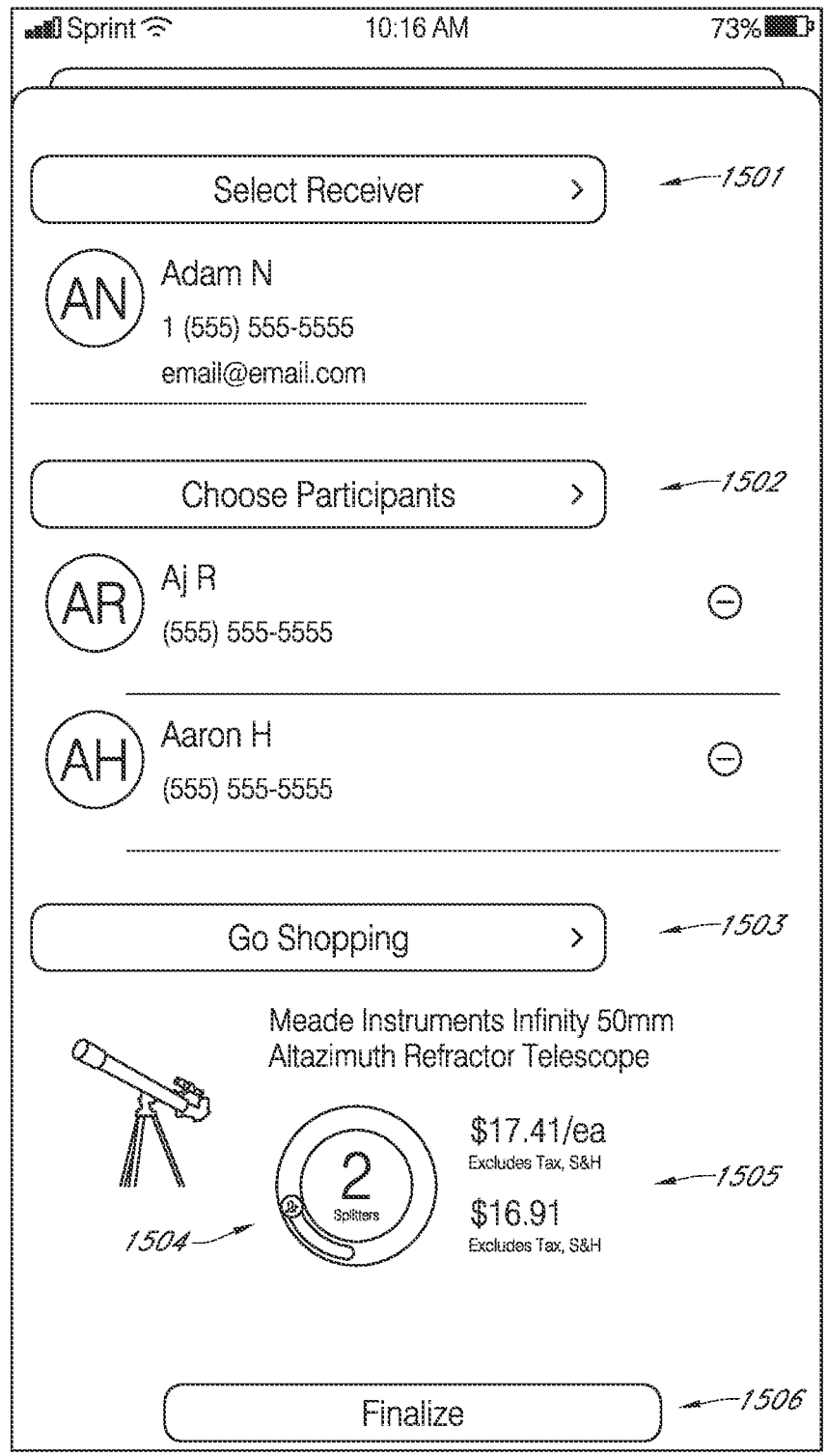

FIG. 49 is a representation of a review screen as disclosed herein.

Figure 50:
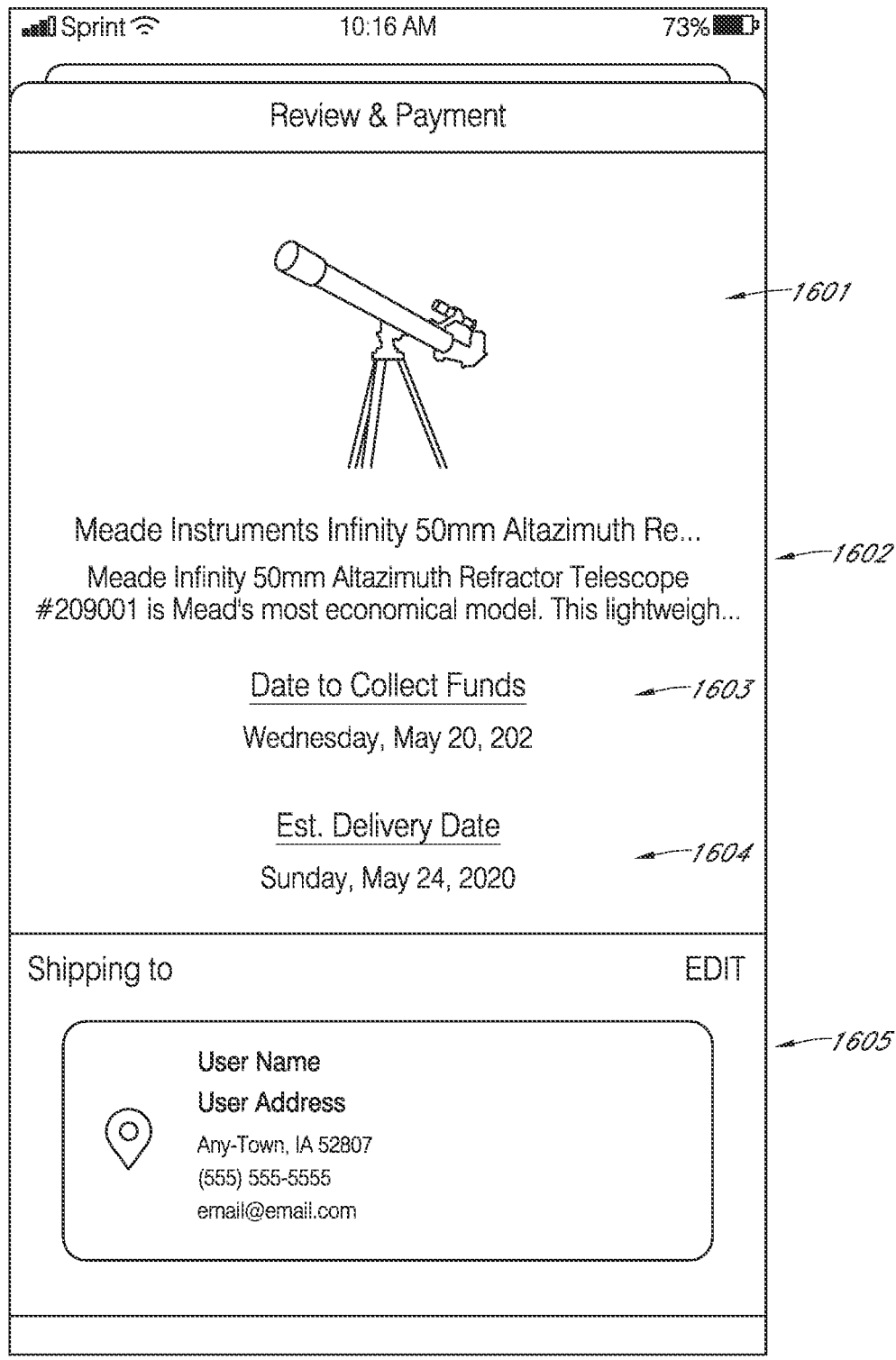

FIG. 50 is a representation of the first half or top of the final payment screen as disclosed herein.

Figure 51:
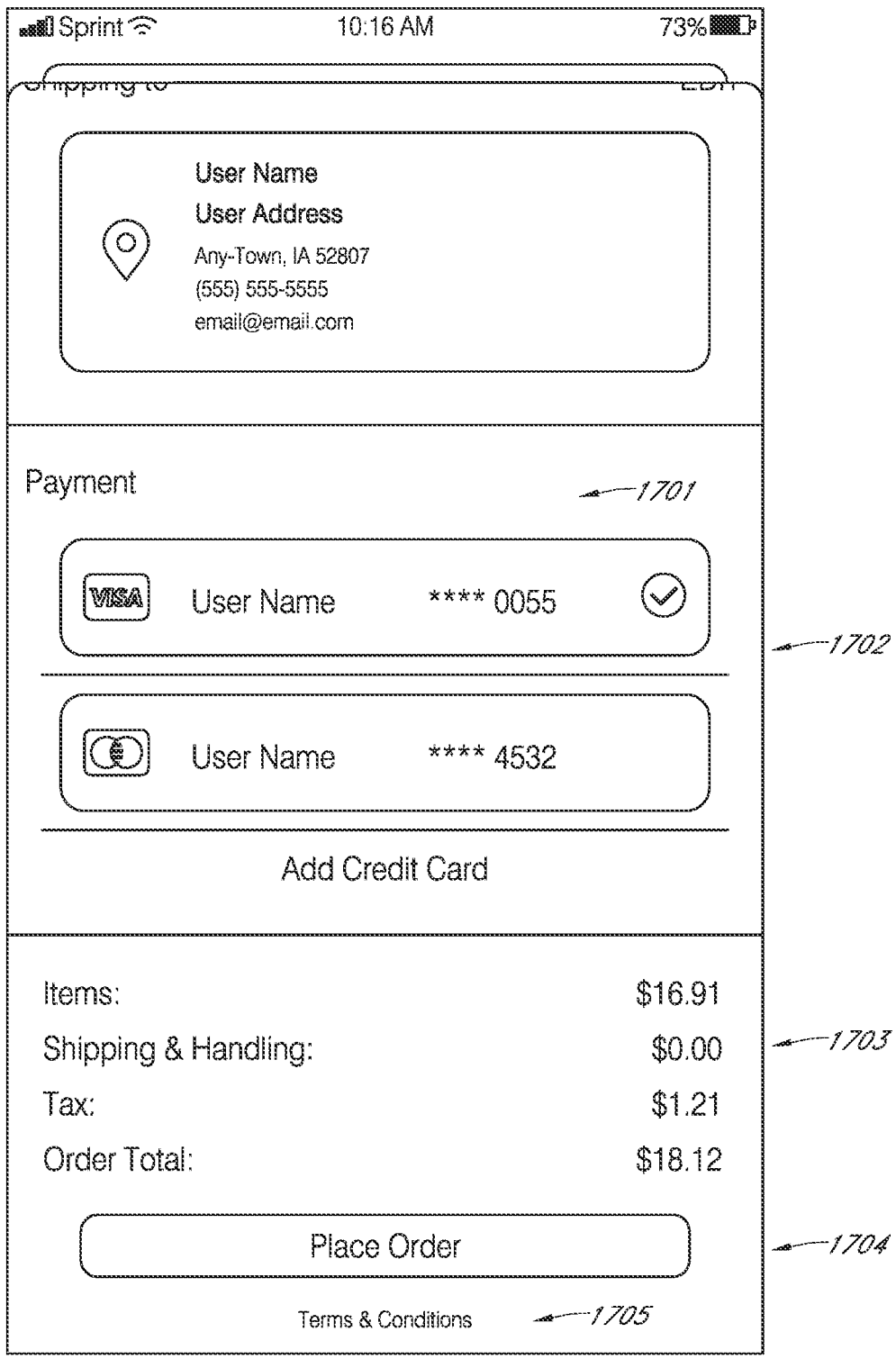

FIG. 51 is a representation of the second half or bottom of the final payment screen as disclosed herein.

Figure 52:
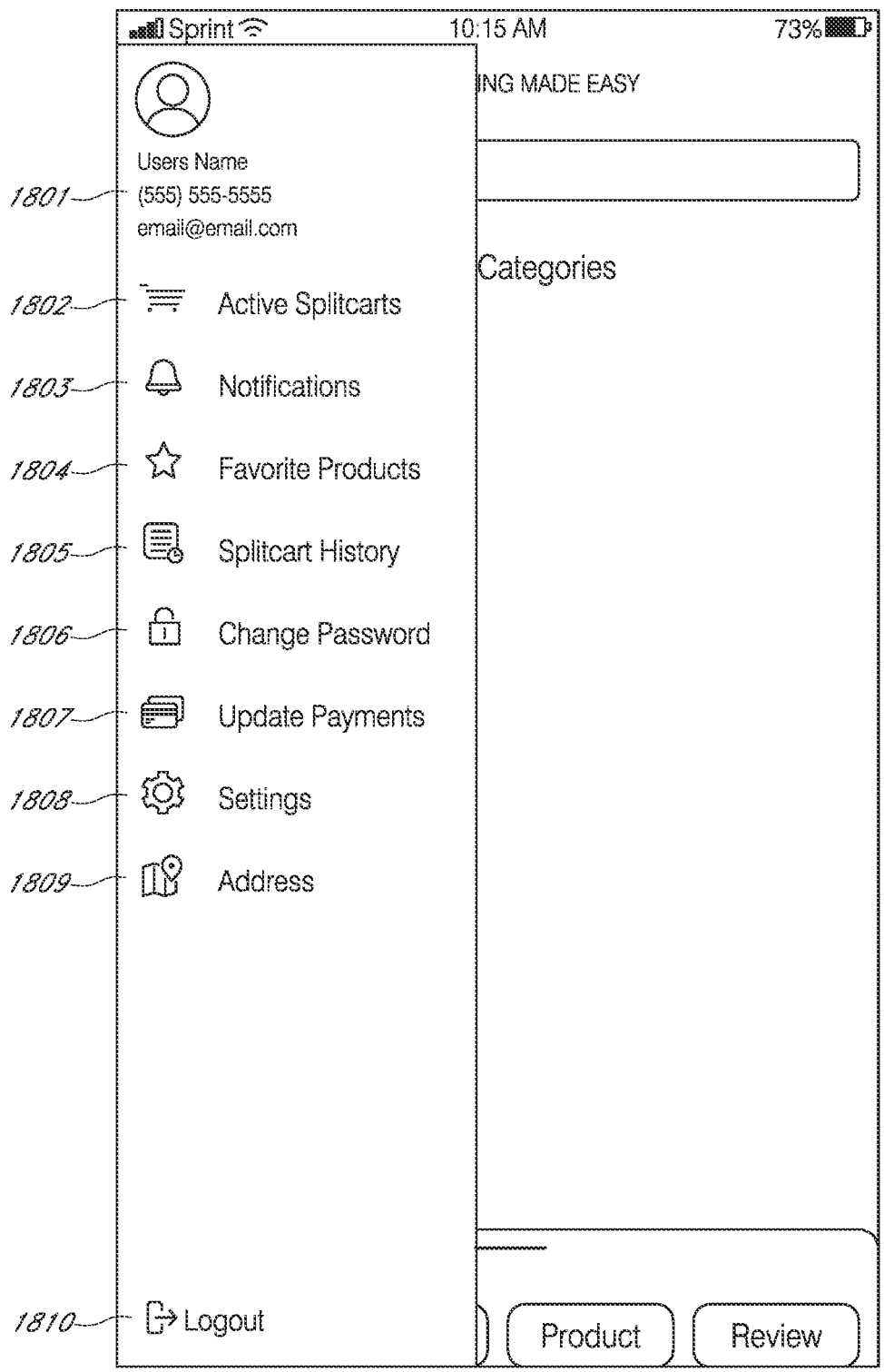

FIG. 52 is a representation of the hamburger or user option options disclosed herein.

Figure 53:
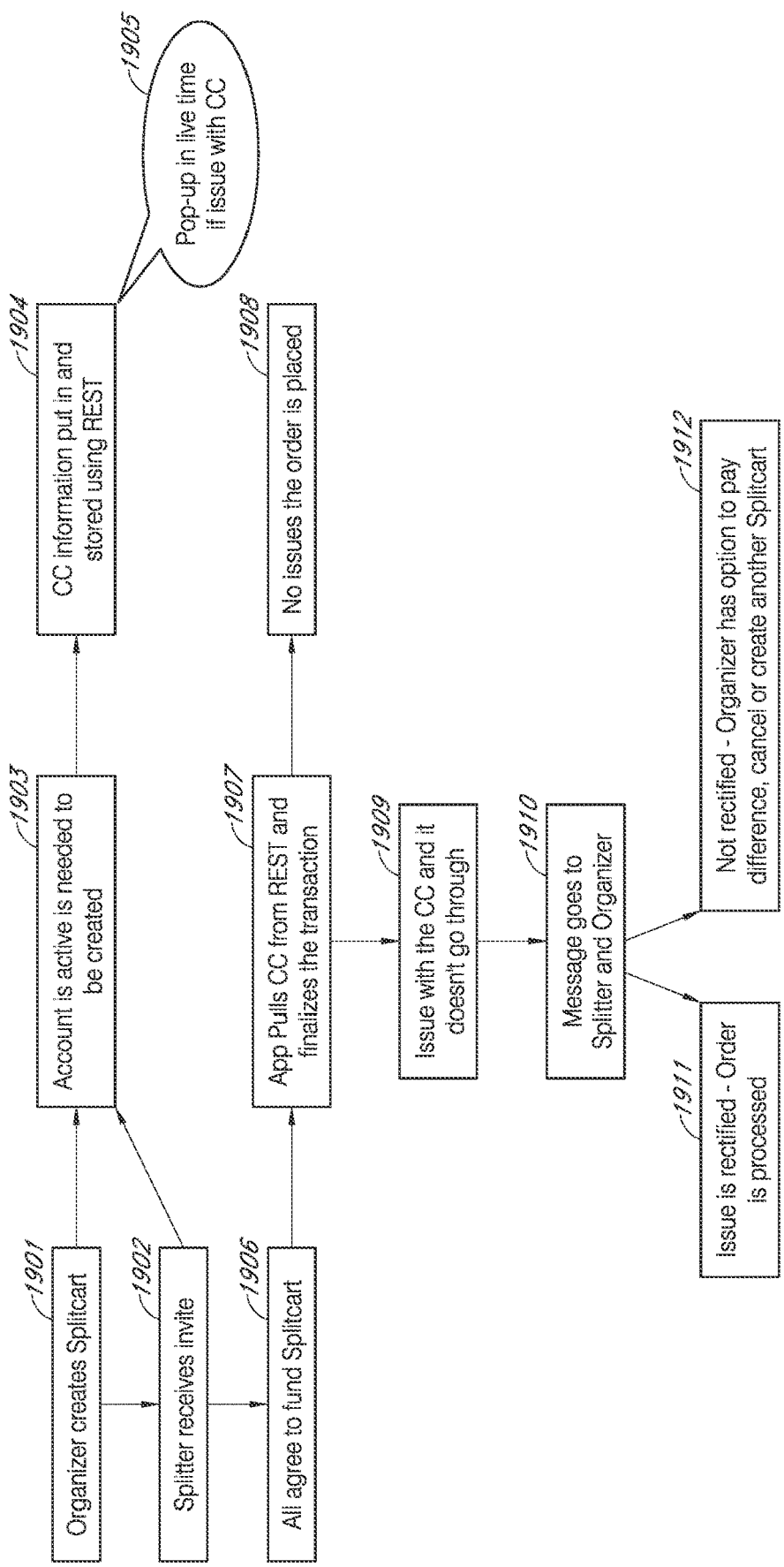

FIG. 53 is a representation of the process flow for credit cards upon account creation and acceptance and finalization of a created Splitcart disclosed herein.

DETAILED DESCRIPTION—LISTING OF ELEMENTS (FIGS. 1-34)

| Element Description | Element Number |
| --- | --- |
| Begin | 101 |
| Consumer browses retailer app or website for goods to buy | 102 |
| Consumer selects one or more goods and adds to shopping cart on app or website | 103 |
| User selects "checkout" | 104 |
| Checkout options open | 105 |
| Retailer checkout | 106 |
| Paypal | 107 |
| Google checkout | 108 |
| Apple Pay | 109 |
| Splitcart | 110 |
| Proceed to respective checkout platform | 111 |
| Does user have an account? | 112 |
| No - Register for Splitcart account | 113 |
| Yes - Login | 114 |
| Organizer selects recipient | 201 |
| Who is it for? | 202 |
| Someone else | 203 |
| Contacts accessible? | 204 |
| Enter recipient | 205 |
| Contacts open | 206 |
| Recipient in contacts? | 207 |
| Select recipient | 208 |
| Notify recipient once ordered? | 209 |
| Enter recipient E-mail and message | 210 |
| Organizer | 211 |
| Enter Splitcart title and description of reason for the Splitcart | 212 |
| Enter delivery details | 213 |
| Link for Splitcart generated | 301 |
| Organizer choice: contribute first? | 302 |
| Yes - See contribution flow chart. FIG. 5 | 303 |
| No - show share screen | 304 |
| Is Organizer on iOS device or another device? | 305 |
| If iOS device - iOS share sheet: Message/Installed Apps/Social media/Etc. See FIG. 4 | 306 |
| If non iOS device - All non iOS share options open. See FIG. 4 | 307 |
| Link shareable anytime from home screen | 308 |
| Link for item generated | 400 |
| Share invitation via link | 401 |
| Text message | 402 |
| Opens Organizer's text and starts new message with link | 403 |
| E-mail | 404 |
| Opens Organizer's e-mail and starts new e-mail with link | 405 |
| Air Drop | 406 |
| Opens Air Drop and shows near-by | 407 |
| Facebook | 408a |
| Twitter | 408b |
| Instagram | 408c |
| Other social media | 408d |
| Opens selected social media platform and | 409 |

-continued

| Element Description | Element Number |
|---|---|
| allows Organizer to post the link, create an event, and otherwise share the link | |
| Messages sent to all invitees who can also share or re-post the link | 410 |
| Organizer can share the link again at any time before the link expires under Organizer's home screen (app or website) | 411 |
| Contribute (Custom Link) | 501 |
| Organizer | 502 |
| Invitee | 503a |
| Invitee (x) | 503b |
| Open link | 504 |
| Contribute screen displays | 505 |
| Display time remaining | 506 |
| Display cost | 507 |
| Display amount funded | 508 |
| Automatically updates via SplitCart functions as contributions are made | 509 |
| View item details | 510 |
| Opens product details page | 511 |
| Send invite | 512 |
| See FIG. 3 and 4 | 513 |
| Message button | 514 |
| Opens in-app messaging platform | 515 |
| Contribute button | 516 |
| Enter contribution amount | 517 |
| Add message (optional) | 518 |
| Select payment button | 519 |
| Add payment button | 520 |
| Complete payment | 521 |
| Does card info exist? | 601 |
| No - enter card info | 602 |
| Yes - Card verified by gateway through processor & issuing bank | 603 |
| Card stored in data vault | 604 |
| Submits contribution amount | 605 |
| Data transmitted to gateway via Splitcart/ Card authorized by processing network | 606 |
| Uncaptured amount (pending/unsettled on processing system) | 607 |
| Authorized data stored | 608 |
| Amount added to Splitcart total | 609 |
| New information reflected in dynamic Link | 610 |
| Is total funds enough to cover Splitcart? | 611 |
| No - soft hold released, contributors not charged | 612 |
| Yes - total amount is funded | 613 |
| Transaction processed through gateway, processor, and bank | 614 |
| Charges changed to captured | 615 |
| Status shows funded | 616 |
| Receipt sent | 617 |
| API call to merchant signaling payment fulfilled | 618 |
| Begin | 701 |
| Search By: | 702 |
| Pricing/Product/Availability verified in real-time via API Calls | 703 |
| Third-Party retailer | 704a |
| Third-Party retailer | 704b |
| Third-Party retailer | 704c |
| Picks for you | 705 |
| Product category | 706 |
| All products | 707 |
| Available items displayed | 708 |
| Features, product details, images, specs, etc. | 709 |
| Filter varieties (Ex: Free shipping, zip code, price . . .) | 710 |
| Organizer selects item | 711 |
| Begin | 800 |
| Organizer selects recipient | 801 |
| Who is this item for? | 802 |
| Organizer | 803 |
| Someone else - choose recipient | 804 |
| Organizer "contacts" open | 805 |
| Recipient in contacts? | 806 |
| No - add contact | 807 |

-continued

| Element Description | Element Number |
|---|---|
| Enter contact details | 808 |
| Select "Add" button | 809 |
| Yes - select recipient in contacts | 810 |
| Notify recipient once ordered | 811 |
| Yes - enter recipients E-mail address and message | 812 |
| No - enter Splitcart title and description of reason for the Splitcart | 813 |
| Enter delivery details (saved addresses, last name, first name, address) | 814 |
| Link for Splitcart generated | 901 |
| Organizer choice. Contribute first? | 902 |
| Yes - contribution flow chart FIG. 5 | 903 |
| No - show share screen | 904 |
| Is Organizer on iOS device or another device? | 905 |
| If iOS device - iOS share sheet: Message/Installed Apps/Social media/Etc. See FIG. 4 | 906 |
| If non iOS device - All non iOS share options open. See FIG. 4 | 907 |
| Link shareable anytime from home screen | 908 |
| Begin | 1000 |
| User clicks link | 1001 |
| Supported mobile (iOS/Android) | 1002 |
| Send to web app | 1003 |
| App installed? | 1004 |
| Send to relevant app store | 1005 |
| Open app/Send used to relevant notification | 1006 |
| Contribute (Custom Link) | 1101 |
| Organizer | 1102 |
| Invitee | 1103a |
| Invitee (x) | 1103b |
| Open link | 1104 |
| Contribute screen displays | 1105 |
| Display time remaining | 1106 |
| Display cost | 1107 |
| Display amount funded | 1108 |
| Automatically updates via Splitcart functions as contributions are made | 1109 |
| View item details | 1110 |
| Opens product details page | 1111 |
| Send invite | 1112 |
| See FIG. 3 and 4 | 1113 |
| Message button | 1114 |
| Opens in-app messaging platform | 1115 |
| Contribute button | 1116 |
| Enter contribution amount | 1117 |
| Add message (optional) | 1118 |
| Select payment button | 1119 |
| Add payment button | 1120 |
| Complete payment | 1121 |
| User taps on link for Splitcart | 1400 |
| User taps on continue with phone/E-mail | 1401 |
| Phone/E-mail options appear | 1402 |
| User enters number | 1403 |
| User taps "send code" | 1404 |
| Send code | 1405 |
| Show verification screen | 1406 |
| User enters code | 1407 |
| User drags controller down | 1408 |
| Dismiss controller | 1409 |
| User taps email tab | 1410 |
| User taps phone tab | 1411 |
| Show phone login | 1412 |
| Show email login | 1413 |
| User taps login | 1414 |
| Show loading | 1415 |
| Does user exist? | 1416 |
| Show "error logging in" alert | 1417 |
| Is correct password? | 1418 |
| Show "invalid password" alert | 1419 |
| Login user and update info | 1420 |
| Splitcart history view opens | 1501 |
| Splitcart history and close button appear | 1502 |
| User has Splitcarts? | 1503 |
| If No - "You have no Splitcarts" text appears | 1504 |
| If Yes - Has Splitcarts in the past 3 months? | 1505 |

| Element Description | Element Number |
|---|---|
| If No - Current Splitcarts cells appear | 1506 |
| If Yes - "Past 3 months" text and Splitcarts appear below current | 1507 |
| Cell begins to render | 1601 |
| Set Splitcart status text | 1602 |
| Splitcart status | 1603 |
| Delivered | 1604a |
| On its way | 1604b |
| Arriving early | 1604c |
| Awaiting shipment | 1604d |
| Processing | 1604e |
| Pending | 1604f |
| Set your role text | 1605 |
| Is Organizer? | 1606 |
| Yes | 1607 |
| Is past 3 months? | 1608 |
| Participant | 1609 |
| Acceptance status | 1610 |
| Participant - accepted | 1611 |
| Participant - declined | 1612 |
| Participant - pending | 1613 |
| Set participant status text | 1614 |
| Is past 3 months? | 1615 |
| Yes - hide text | 1616 |
| No - splitter statuses | 1617 |
| If splitters have not responded | 1618 |
| All splitters have contributed | 1619 |
| Declined splitters | 1620 |
| Show Splitcart product image | 1621 |
| User taps on product | 1701 |
| Is the product stored on cloud? | 1702 |
| No - grab product from retailer | 1703 |
| Yes - retrieve product from real-time database | 1704 |
| Retrieve latest product information from retailer API | 1705 |
| Does item have variants? | 1706 |
| Yes - grab latest variant price and availability from retailer API | 1707 |
| No - upload product info to storage | 1708 |
| Present product view to user | 1709 |
| Display the product details to the user | 1801 |
| User filters (Ex. Free shipping) | 1802 |
| Allow description display | 1803 |
| Display the return policy label and the expanded return policy | 1804 |
| Display the warranty info label and the expanded warranty info | 1805 |
| Does the product have similar products? | 1806 |
| Display the similar products label, arrow pointing down and the expanded similar products | 1807 |
| Hide the similar products UI | 1808 |
| Is the product up for pre-order? | 1809 |
| Display the pre-order date and disable the "select product" button | 1810 |
| Hide the pre-order date and enable the "select product" button | 1811 |
| Is the product out of stock? | 1812 |
| Display "out of stock" and disable the "select product" button | 1813 |
| Show the price, hide the "out of stock", and enable the "select product" button | 1814 |
| User types in search bar | 1901 |
| Does the user have contacts? | 1902 |
| No - no nothing | 1903 |
| Yes - query contacts by the search string | 1904 |
| Did the query return results? | 1905 |
| No - show nothing | 1906 |
| Yes - show the search contacts on the list below | 1907 |
| Terminator | 1908 |
| User taps "add contact" icon | 2001 |
| User selects "close" icon | 2002 |
| User selects "first name" text field and enters first name | 2003 |
| User selects "last name" text field and enters last name | 2004 |
| User selects "phone" text field and enters phone number | 2005 |
| User selects "E-mail" text field and enters email | 2006 |
| Use selects "add contact" | 2007 |
| Is phone number not equal to yours? | 2008 |
| No - tell the user that they can't use their own phone number | 2009 |
| Yes - is the phone number a valid U.S. number? | 2010 |
| No - tell the user that their phone number is invalid | 2011 |
| Yes - is the E-mail valid? | 2012 |
| No - tell the user that their email is invalid | 2013 |
| Yes - add contact to Apple contacts | 2014 |
| Dismiss "Add contact" controller | 2015 |
| Addresses are fetched from backend database | 2101 |
| User selects close button in top right corner (dismiss) | 2102 |
| Are there addresses? | 2103 |
| Yes - show default address and list of address | 2104 |
| No - show user "add an address by tapping on the button below" | 2105 |
| User selects the info button | 2106 |
| Show user how to swipe or delete | 2107 |
| User swipes on address | 2108 |
| Is user swiping left? | 2109 |
| Yes - show "delete" | 2110 |
| User taps "delete" | 2111 |
| Address is removed from view and backend | 2112 |
| No - show "set at default" | 2113 |
| User taps "set as default" | 2114 |
| Address is swapped out with current default address | 2115 |
| User selects "add address" button | 2116 |
| User enters address name | 2117 |
| User enters phone number | 2118 |
| Use enters first name | 2119 |
| User enters last name | 2120 |
| User enters street address | 2121 |
| User enters Suite, PO Box, Apt | 2122 |
| User enters city | 2123 |
| User enters state | 2124 |
| User enters zip code | 2125 |
| User selects the "add" button | 2126 |
| Is phone a valid US number? | 2127 |
| No - alert the user their number is invalid | 2128 |
| Yes - is the address a valid US postal address? | 2129 |
| No - Ask user if they wish to use the address | 2130 |
| Does user want to use address? | 2131 |
| No - close the prompt | 2132 |
| Yes - address is added to the list | 2133 |
| User opens return info | 2201 |
| Retrieve return info for product | 2202 |
| Return initiated | 2203 |
| Yes - hide "confirm return" and let user know when they initiated the return | 2204 |
| No - show "confirm return" and let user know how long they have to return | 2205 |
| User taps "cancel" | 2206 |
| Return to details | 2207 |
| User drags controller down | 2208 |
| Dismiss all presented controllers | 2209 |
| User taps "confirm return" | 2210 |
| Show user how to return screen | 2211 |
| Send email to user with return label | 2212 |
| User slides controller down | 2213 |
| Dismiss all presented controllers | 2214 |
| User taps "done" | 2215 |
| Return to history | 2216 |
| Credit cards are fetched from processor backend | 2301 |
| User selects the "close" button in top right corner (dismiss) | 2302 |

-continued

| Element Description | Element Number |
|---|---|
| Are there cards? | 2303 |
| Yes - show user their saved cars and put the default card to the top | 2304 |
| No - show "add a credit/debit card" | 2305 |
| User selects "add card" | 2306 |
| Show processor SDK for adding a credit card | 2307 |
| User selects card scanner | 2308 |
| User inputs card number | 2309 |
| User inputs expiration date | 2310 |
| User scans card | 2311 |
| User inputs CVV | 2312 |
| User inputs billing name | 2313 |
| User inputs billing address | 2314 |
| User inputs billing address 2 (optional) | 2315 |
| User inputs billing country (selected by default" | 2316 |
| User inputs billing zip code | 2317 |
| User inputs billing city | 2318 |
| User inputs billing state | 2319 |
| Is card valid? | 2320 |
| No - highlight card details in red | 2321 |
| Yes - user selects "done" in top right corner | 2322 |
| Dismiss view | 2323 |
| User selects "cancel" in top left corner | 2324 |
| Notification view controller is loaded into memory on app launch | 2401 |
| Notification data is pulled from firebase backend | 2402 |
| Does user have notifications? | 2403 |
| No - instructions on enabling notifications opens | 2404 |
| Yes - display the list of notifications | 2405 |
| Is the notification read? | 2406 |
| Do nothing | 2407 |
| User swipes on notification | 2408 |
| Is user swiping left? | 2409 |
| Yes - show "delete" | 2410 |
| User taps "delete" | 2411 |
| Notification is removed from view and back end | 2412 |
| No - show "mark as read" | 2413 |
| User taps "mark as read" | 2414 |
| Notification becomes transparent and the read property is updated | 2415 |
| User selected "edit" in top left corner | 2416 |
| Does user tap "select all" | 2417 |
| Yes - show the user all the notifications selected (check marks) | 2418 |
| No - user selects notification (show check marks) | 2419 |
| User deselects notification (remove check marks) | 2420 |
| User selects "mark as read" | 2421 |
| All selected notifications are set to transparent | 2422 |
| All selected notifications are marked as read in backend | 2423 |
| User selects "delete" | 2424 |
| All selected notifications are removed from view | 2425 |
| All selected notifications are removed from backend | 2426 |
| User taps on category | 2501 |
| Open search with the results for that category | 2502 |
| User drags controller down | 2503 |
| Dismiss | 2504 |
| User taps on "x" | 2505 |
| Dimiss | 2506 |
| User taps on "filters" button | 2507 |
| Open filters | 2508 |
| User taps on "zip code" button | 2509 |
| Open zip input | 2510 |
| User taps on "free delivery" | 2511 |
| Add free delivery to filters and enable button | 2512 |
| User taps on search bar | 2513 |
| Open user history | 2514 |
| User taps "filter" button | 2601 |

-continued

| Element Description | Element Number |
|---|---|
| Show filters view controller with brand, age, and price | 2602 |
| Is category search? | 2603 |
| No - show sub categories as a filter option | 2604 |
| Yes - user drags controller down | 2605 |
| Dimiss controller | 2606 |
| User taps on controller "x" | 2607 |
| Dismiss controller | 2608 |
| User taps on filter types | 2609 |
| Is filter open? | 2610 |
| Yes - close scrollable list | 2611 |
| No - scrollable list of that filter type should appear | 2612 |
| User taps on filter | 2613 |
| Is filter selected? | 2614 |
| Yes - remove filter from search | 2615 |
| Dismiss controller and show new results | 2616 |
| No - add filter and perform search | 2617 |
| Dismiss controller and show new results | 2618 |
| User taps "x" on selected filter | 2619 |
| Remove filter from search | 2620 |
| Dismiss controller and show new results | 2621 |
| User taps on trashcan | 2622 |
| Remove all filters from search | 2623 |
| Dismiss controller and show new results | 2624 |
| User taps on "free delivery" | 2625 |
| Is selected? | 2626 |
| No - toggle switch to "on" | 2627 |
| Add free delivery to filters and perform search | 2628 |
| Update filter button and display new results | 2629 |
| Yes - toggle switch to "off" | 2630 |
| Remove free delivery from filters and perform search | 2631 |
| Update filter button and display new results | 2632 |
| Does Organizer have an account? | 2901 |
| Create Account | 2902 |
| Log in | 2903 |
| Start new registry or Continue with existing? | 2904 |
| Select existing registry | 2905 |
| Start new registry | 2906 |
| Registry page opens | 2907 |
| Search | 3001 |
| Browse by Retailer | 3002 |
| Browse by Brand | 3003 |
| Browse by Product | 3004 |
| Browse by Category | 3005 |
| Fillable search bar | 3006 |
| Filter options | 3007 |
| View items | 3008 |
| Product details | 3009 |
| Select items | 3010 |
| Add to registry? | 3011 |
| Yes - Item added to registry | 3012 |
| No - Back to search | 3013 |
| Click "Add Selected Item to Registry" | 3101 |
| Link for item created and added | 3102 |
| Repeat search to add additional items | 3103 |
| Click on spot on registry to place location of item | 3104 |
| Select "Add Another Item" button | 3105 |
| Repeat adding items and arrange as desired | 3106 |
| Start registry page | 3201 |
| Share | 3202 |
| Share Item | 3203 |
| Share Entire Registry | 3204 |
| Share options open | 3205 |
| Retailer's page | 3301 |
| Start with registry tab | 3302 |
| Start with desired item | 3303 |
| Does Organizer have an account? | 3304 |
| No - create account | 3305 |
| Yes - Log in | 3306 |
| Add to Splitcart registry | 3307 |
| Add to cart | 3308 |
| Checkout | 3309 |
| Start new registry or Continue with existing? | 3310 |
| New | 3311 |

-continued

| Element Description | Element Number |
| --- | --- |
| Fill in Fields | 3312 |
| Existing | 3313 |
| Select registry | 3314 |
| Continue | 3315 |
| Registry page opens | 3316 |
| Search | 3401 |
| Browse by Brand | 3402 |
| Browse by Category | 3403 |
| Browse by Product | 3404 |
| Fillable search bar | 3405 |
| Filter options | 3406 |
| View items | 3407 |
| Product details | 3408 |
| Select items | 3409 |
| Add to registry? | 3410 |
| Yes - Item added to registry | 3411 |
| No - Back to search | 3412 |

Detailed Description of Invention

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the figures and their previous and following description.

Before the various embodiments of the present invention are explained in detail, it is to be understood that the invention is not limited in its application to the details of construction and the arrangements of components set forth in the following description. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

The following detailed description is of the best currently contemplated modes of carrying out illustrative embodiments of the invention. The description is not to be taken in a limiting sense but is made merely for the purpose of illustrating the general principles of the invention, since the scope of the invention is best defined by the appending claims. Various inventive features are described below herein that can each be used independently of one another or in combination with other features.

Illustrative Embodiments and Advantages

Generally, the illustrative embodiment of a co-purchasing system & method disclosed herein may enable multiple people to jointly purchase an item or items in a single transaction and to provide the system and methodology by which the purchase transaction can take place. Further, the illustrative embodiment of a co-purchasing system & method may allow and provide for allocating a specific portion of the purchase price of a given item among a plurality of credit cards and/or debit cards at the card processing point in time as described in further detail below, and without limitation unless otherwise indicated in the following claims.

Figure 1:
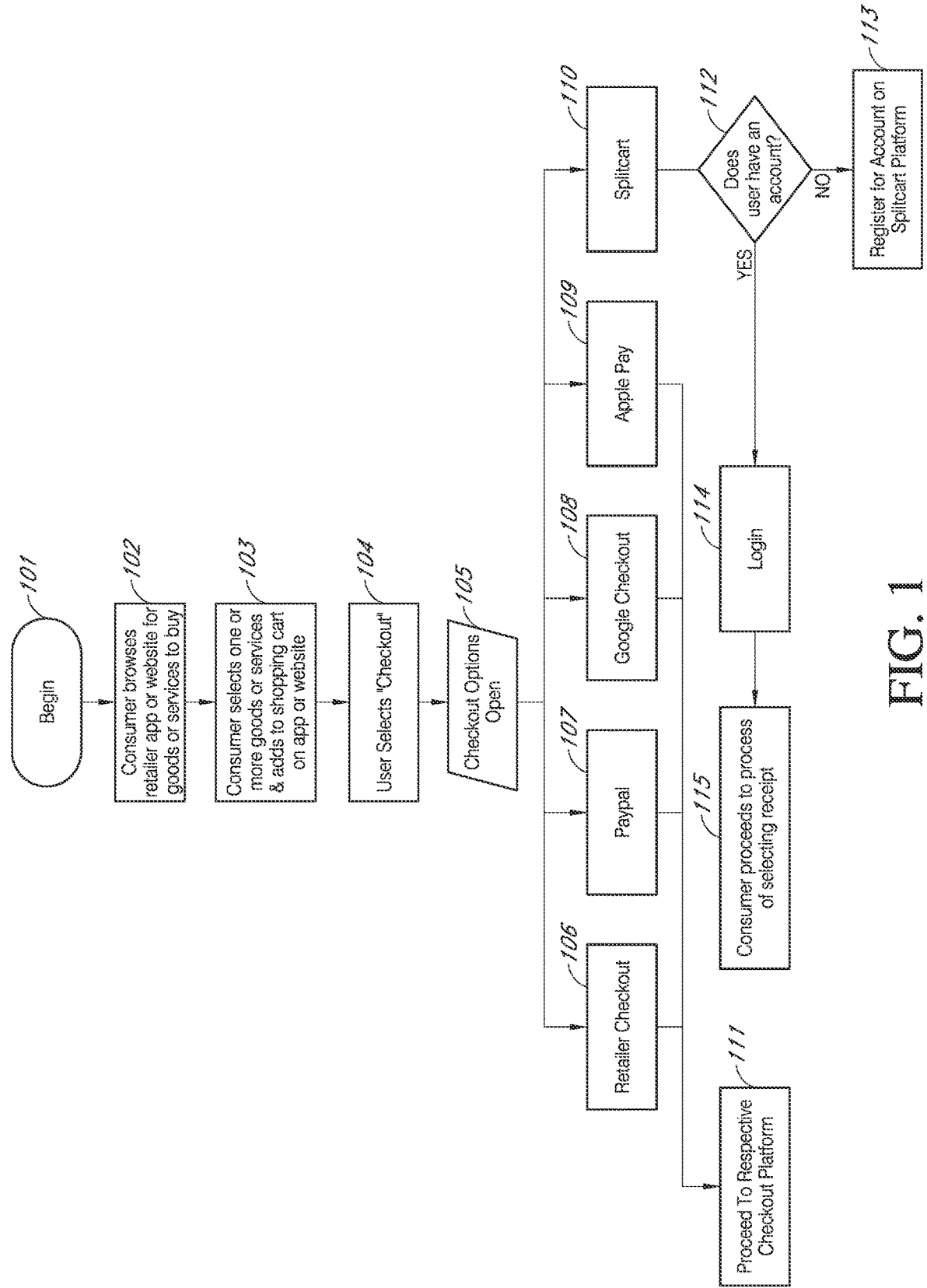
FIG. 1 is a schematic representation of a portion of an illustrative embodiment of a co-purchasing system & method showing a process by which a user can elect to utilize the illustrative embodiment of a co-purchasing system at checkout on an e-commerce retailer's mobile application or website.

Referring now specifically to FIG. 1, which provides a schematic representation of an illustrative embodiment of a co-purchasing system & method, the co-purchasing system & method may be integrated into an e-commerce merchant's website such that it may be presented as a method for completing the purchase of an item in a manner similar to PayPal, Visa Checkout, Google Checkout, and/or other online payment service without limitation unless otherwise indicated in the following claims.

In a preferred embodiment of the Organizer's interaction with the illustrative embodiment of a co-purchasing system and method, which may be an integrated Splitcart checkout and technology platform (sometimes referred to herein as the "Splitcart Platform" or "Splitcart system"), as with many other e-commerce shopping experiences, the Consumer may browse for goods 102 and ultimately select one or more goods to add to the retailer's e-commerce shopping cart 103. Once the Consumer is done shopping, he or she may then select the "Checkout" option 104. At this stage, all the retailer's checkout options may open 105, (with the most common examples including a retailer checkout transaction utilizing the retailer's primary e-commerce processing platform 106, PayPal 107, Google Checkout 108, Apple Pay 109) which may include the Splitcart Platform 110 according to the present disclosure.

If the Consumer selects any checkout option other than the Splitcart Platform, he or she will proceed to the respective third-party checkout and payment platform 111. If the Consumer selects the Splitcart Platform option 110, he or she will enter the Splitcart Platform. At this point, the Consumer may become an Organizer. The Organizer may then be prompted to login or register for a Splitcart account 112. If the Organizer does not have an existing Splitcart account, then the Organizer will be directed to register for an account 113 and then login 114. If the Organizer has a Splitcart account, he or she may immediately proceed to login 114. The Login process is illustrated in detail in FIG. 14 and may be configured in a manner similar to various other secure web portals and may require multi-factor authentication without limitation unless otherwise indicated in the following claims.

After the Organizer is logged in to his or her Splitcart account, he or she will proceed into the process of selecting a recipient 115 as further illustrated schematically in FIG. 2 and described in further detail below. In an alternate version of the co-purchasing system & method, the selection can include a multitude of recipients, such as a group traveling together, a team, or any other plurality of people without limitation unless otherwise indicated in the following claims.

Figure 2:
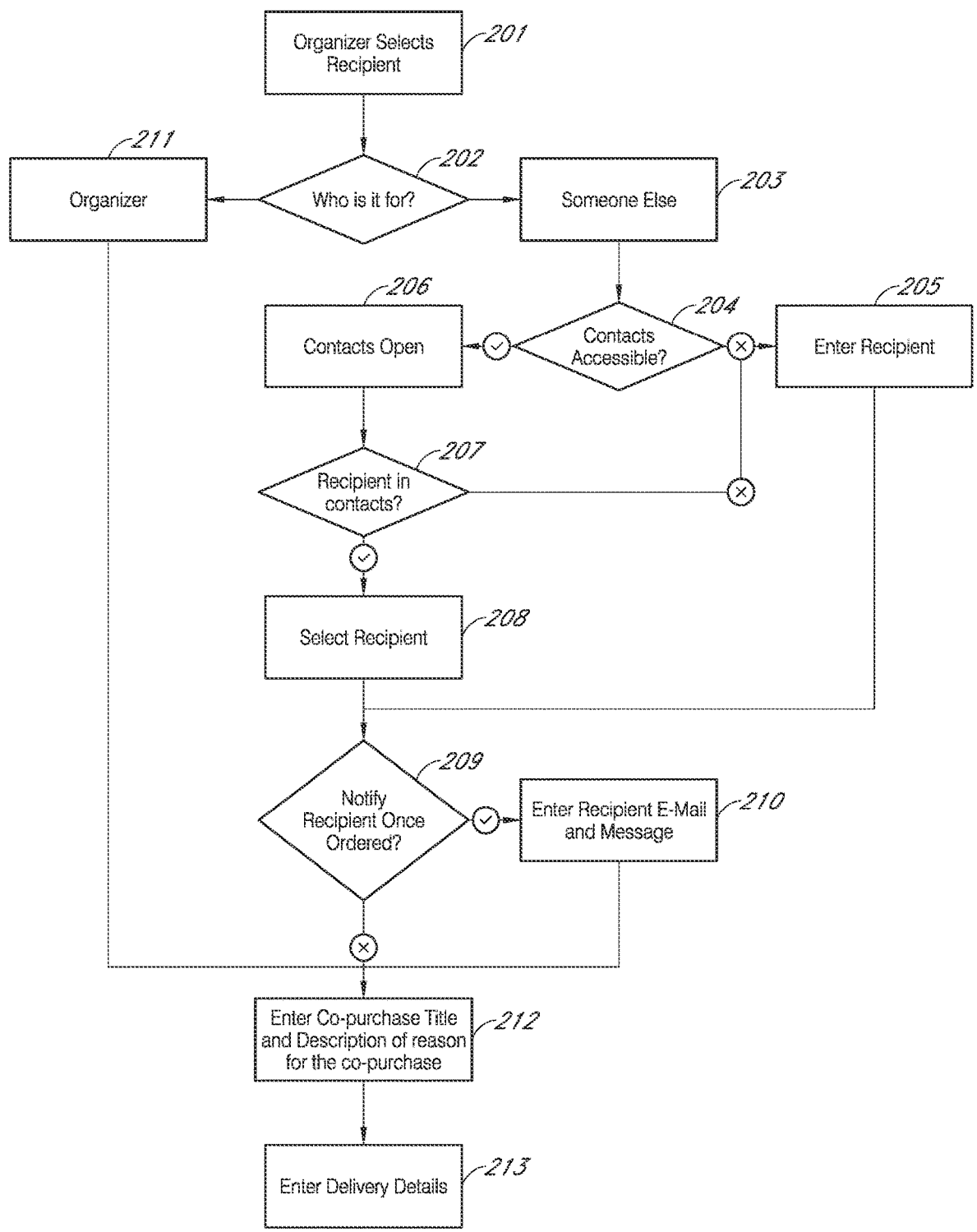
FIG. 2 is a schematic representation of a portion of the illustrative embodiment of a co-purchasing system & method showing how the Organizer of a co-purchase campaign may select a recipient for the purchase when utilizing the illustrative embodiment of a co-purchase system as integrated into a retailer's e-commerce platform.

Still referring generally to FIG. 2, once the Organizer elects to utilize the Splitcart Platform to create a co-purchasing campaign and is logged into his or her Splitcart account, the Organizer may transition to select a Recipient 201. At this step, the Organizer may be prompted to select whether the good/service (or set of services and/or goods) being purchased is for the Organizer or someone else 202.

If the Organizer selects someone else 203, the Splitcart Platform then internally may verify whether the Organizer's contacts are accessible 204. If the Organizer's contacts are accessible, then the Organizer may be directed to his or her contacts 206 which may open, and the Splitcart Platform may prompt the Organizer to select a Recipient if such individual is in the Organizer's contacts 207. If the Recipient is not in the Organizer's contacts, then the Organizer may be prompted to enter the Recipient's information, including but not limited to name and delivery address 205 unless otherwise indicated in the following claims. If the Recipient is in the Organizer's contacts, the Organizer may be prompted to select the Recipient from the Organizer's Contacts list 208. Once the Recipient is selected or entered, the Organizer may be prompted to select whether the Splitcart Platform should notify the Recipient once Ordered 209. If the Organizer selects "yes", then the Organizer may enter the Recipient's e-mail address and a customized massage for the Recipient 210. If the Organizer selects not to notify the Recipient once ordered, then the Organizer may immediately proceed to Enter the Title and Description of the reason for the Splitcart purchase 212 and may proceed to and enter other delivery details 213.

If after proceeding to the select Recipient stage 201 and being prompted to select whether the good/service (or set of services and/or goods) being purchased is for the Organizer or Someone Else 202, and the Organizer specifies that the Organizer is also the Recipient 211, then the Organizer may proceed to Enter the Title and Description of the reason for the co-purchase campaign 212, and subsequently may proceed to and enter other delivery details 213.

Referring now generally to FIGS. 3 & 9, both of which provide schematic representations illustrating an illustrative process by which a link to the co-purchase campaign may be created, and how an invitation to participate in a co-purchase campaign may be shared by the Organizer, the Organizer may generate one or more invitations to participate in the co-purchase campaign. Once the stage of selecting the Recipient and designating the shipping address is complete, the Splitcart Platform may generate a universal invitation and payment link 301 (which may be referred to herein as the "Link"). Once the Link is generated, the Splitcart Platform may provide the Organizer with the option to be the first to contribute 302 to the co-purchase campaign. If the Organizer chooses to contribute toward the purchase price amount at this stage, he or she may proceed to the contribution process 303, as further illustrated in FIG. 5 and as described in further detail below. Once the Organizer has contributed, he or she may be directed to the Share Screen 304. If the Organizer chooses not to contribute toward the purchase price amount at this stage, then the system may proceed to the screen and function under which the Organizer will share the Link under the Share Screen 304.

The Organizer can share the Link via multiple mediums, which in part may depend upon what type of device and device operating system the Organizer is using to create the co-purchasing campaign and/or to share the Link. The Splitcart Platform may automatically detect what Link sharing methods are available to the Organizer based upon the Organizer's device type and/or operating system 305. For example, if the Organizer is using an iOS device, the share options may include without limitation, the iOS share sheet available through any iOS device (e.g. an Apple iPhone if the Organizer is using an iPhone), iMessage, SMS message (text message), email, via any option available on the "share sheet" for an Apple device and/or an Android, Microsoft, or other OS corollary, and by sharing and/or posting the Link on or through various social media platforms (including without limitation Facebook and Instagram), among other sharing mediums 306, as further detailed in FIG. 4 and without limitation unless otherwise indicated in the following claims.

If the Organizer is using a non-iOS device, the share options may include without limitation, SMS message (text message), email, and by sharing and/or posting the Link on or through various social media platforms (including without limitation Facebook and Instagram), among other sharing mediums 307, as further detailed in FIG. 4 and without limitation unless otherwise indicated in the following claims.

The Organizer may share and/or post the Link by any combination of the available sharing mediums (for example, the Organizer may decide to share by text message, email, and post on Facebook, but elect not to post or share the Link on Instagram) without limitation unless otherwise indicated in the following claims. There may be a limited lifespan for a co-purchasing campaign, in which case an illustrative embodiment of the co-purchasing system & method may allow the retailer and/or the Organizer to specify the duration of the co-purchasing campaign, and/or to adjust the duration thereof without limitation unless otherwise indicated in the following claims. The Organizer can access this Link at any time on the Splitcart Platform (whether on the corresponding website or mobile application Home Screen) 308, and further share the Link by any available transmission or posting medium, so long as the purchase campaign has not yet expired or otherwise been cancelled by the Organizer. If the duration of time set by the retailer and/or Organizer has elapsed, the Link generated by the Splitcart Platform may become inactive and/or otherwise become inaccessible without limitation unless otherwise indicated in the following claims.

Referring now specifically to FIG. 4, which provides a schematic representation of a portion of the illustrative embodiment of a co-purchasing system & method showing various illustrative link sharing options that may be available to the Organizer when sharing the Link for the co-purchase campaign and the corresponding process, once the Organizer has either elected to be the first to contribute or declined this option 302, 303, and 304, respectively, and the Link has been generated 400, the Organizer may be prompted to invite others to contribute to the co-purchasing campaign via the corresponding unique Link 401. The illustrative embodiment of a co-purchasing system & method may provide several sharing options by which the Organizer can send or share the Link with others, including without limitation, SMS text message 402, email 404, Apple Air Drop 406, Facebook 409*a*, Twitter 409*b*, Instagram 409*c*, and various other social medial platforms 409*d* without limitation unless otherwise indicated in the following claims.

The Organizer may not be limited to a single sharing option for the Link, nor may the Organizer be limited to sharing the Link any given number of times. The Organizer can use one or any number of sharing options and may only be limited by which sharing options are available on the Organizer's given electronic device and operating system. If the Organizer shares the Link by text message 402, the Splitcart Platform may open the Organizer's mobile text messaging application and start a new message including the Link 403 and the messages/communication/Link may be sent to all invitees 411. If the Organizer shares the Link by email 404, the Splitcart Platform may open the Organizer's email system and pre-fill the Link into a new email message for the Organizer to send out 405, and the messages/communication/Link may be sent to all invitees 411. If the Organizer has an iOS device and shares the Link by Apple Air Drop 406, the Splitcart Platform may open Air Drop and show nearby people with their Air Drop enabled (407), and the messages/communication/Link may be sent to all invitees selected by the Organizer for Air Drop 411. Finally, if the Organizer shares the Link by Facebook 408*a*, Twitter 409*b*, or Instagram 409*c*, the Splitcart Platform may open the Organizer's respective platform (Facebook 408*a*, Twitter 408*b*, Instagram 408*c*, or by other social medial platforms 408*d*, respectively), the Splitcart Platform may open the selected social media platform and may allow the Organizer to post the Link, create and event, and/or otherwise share the Link 409 and the messages/communication/Link may be sent to all invitees 410. Other systems and/or methods for sharing the Link may be used with various illustrative embodiments of a co-purchasing system and method without limitation unless otherwise indicated in the following claims.

The Organizer may not need to pre-select other potential contributors, and there may be no limit on the number of people with whom the Organizer can share the Link. The Organizer can share the Link again at any time under the Organizer's Home Screen and further share the Link by any available transmission or posting medium, so long as the co-purchase campaign has not yet expired or otherwise been cancelled by the Organizer 411 and/or retailer. Likewise, any person who receives a Link can also share the Link via the above methods without limitation unless otherwise indicated in the following claims.

Referring now generally to FIGS. 5 & 11, both of which provide schematic representations an illustrative embodiment of the functions and options that may be displayed to anyone who opens the Link, as well as the process for the user to contribute to the e-commerce co-purchase campaign, the Link may be shared an unlimited number of times with anyone the Organizer wishes so long as the purchase has not already been funded in full, the Link has not expired, and the Link has not been cancelled by the Organizer and/or retailer. Additionally, anyone who receives or views the Link can further elect to contribute and/or re-share or re-post the Link 501, 502, 503*a* and 503*b*. When a party opens or otherwise views the Link (whether the Organizer, an invitee, or any other third-party that opens the Link 504), the Contribution Screen may display 505, and several functions may appear (whether as buttons or sub-links), some of which include those described in detail below without limitation unless otherwise indicated in the following claims.

One function, Display Time Remaining 506, may be configured to display the time remaining before expiration of the Link. A second function, Display Cost 507, may be configured to display the total cost of the co-purchasing campaign, including but not limited to the cost of the purchased item or items (or service), plus any shipping and sales taxes. A third function, Display Amount Funded 508, may be configured to display the amount of the total price that has been funded. The Display Amount Funded function may automatically update via the Splitcart system's coding protocol as contributions are made toward the purchase 509. A fourth function, View Item Details 510, may be configured to allow the user to view all product specs and details via the Product Details page 511. A fifth function, Send Invite 512, may allow the user viewing the Link to send out, post, or otherwise share the Link invitation 513 (see also FIG. 3 and FIG. 4). A sixth function, Message 514, may open the Splitcart in-application messaging platform 515. The in-application messaging system and process is further detailed in FIG. 12 and further described herein below.

A seventh function, Contribute 516, may allow the user to proceed in the process of making a financial contribution toward the purchase price. If the user selects the Contribute function (by clicking or tapping on the corresponding button or tab as applicable), the user may proceed to a sub-screen from which the user may enter the contribution dollar amount 517 and may have the option to add a message 518. Additionally, the user may either select a payment method if the user's payment information is saved 519 or select Add Payment and add the user's payment information (including all information traditionally required in order to make a credit card purchase, such as the user's name, address (or zip code), card number, card type, expiration date, and/or security code 520 without limitation unless otherwise indicated in the following claims). Once the user either selects a pre-saved payment method or adds a new payment method, the user may then proceed to complete the payment 521 as shown in FIG. 6. For certain illustrative embodiments, multiple payment sources may be stored and/or used for a single user (e.g., organizer, splitter, etc.) and applied for a single contribution and/or co-purchasing campaign without limitation unless otherwise indicated in the following claims. That is, any participant in a co-purchasing campaign may use a plurality of payment sources for a single contribution or for multiple contributions without limitation unless otherwise indicated in the following claims.

Referring now generally to FIG. 6, which is a schematic representation of a portion of the illustrative embodiment of a co-purchasing system & method showing a payment splitting methodology and system for conducting the co-purchased by a single transaction, an illustrative method for processing the transaction may include storing credit card data in a vault. FIG. 6 further illustrates one embodiment of a transaction processing methodology by which the credit and debit card payments may be verified, authorized, approved, and captured using the Splitcart Platform in combination with and as integrated into an e-commerce retailer's website and/or mobile application. When a contributor (an individual who elects to act as a co-purchaser in the given transaction) seeks to provide their contribution to the co-purchasing campaign, the Splitcart Platform may verify whether the contributor's card information exists. 601. If the card information (debit or credit card) does not exist, the contributor may enter his or her payment card information. 602.

At this point the credit or debit card may be verified by the e-commerce retailer's gateway through the retailer's payment processor and the issuing bank. 603. Once the card is verified, the card data may be stored in a secure data vault. 604, at which time the contributor may submit the amount he or she will contribute to the co-purchasing campaign. 605. In the alternative, if the card information already exists and has been verified previously, 601, then the contributor can proceed to submit the chosen contribution amount. 605. At this point, the data may be transmitted to the gateway via the Splitcart Platform, and the card may be authorized through the processing network. 606.

Once authorized, the payment amount from the contributor may remain uncaptured (this amount is pending and unsettled on the processing system) 607. As the amount remains unsettled at this stage, the contributor is not yet charged for the agreed upon contribution amount. Instead, the authorization data may be stored 608. Additionally, this pending contribution amount may be added to the co-purchase transaction total 609 and reflected in the information regarding the total amount contributed to the co-purchase campaign to date. Further, this new contribution information may be reflected on and through the dynamic Link 610.

At this point, any individual who clicks on or otherwise views the Link may see the real-time information for the co-purchase campaign. Information reflected on this Link ma include without limitation, the total amount of purchase, the amount funded, the open balance, the number of current contributors, the time left on the campaign, and all other relevant information as partially further disclosed in FIG. 13 without limitation unless otherwise indicated in the following claims. At this stage, the Splitcart Platform may also determine whether the total funds contributed to date is enough to cover the co-purchase campaign 611.

If the amount is insufficient and there is time remaining on the co-purchasing campaign, the co-purchasing campaign will remain open until the expiration of the co-purchasing campaign. If the insufficient funds to cover the co-purchasing campaign, and the expiration date and time for the co-purchase campaign has lapsed, the Splitcart Platform may release the soft hold through the gateway and payment processor, and the contributors will not be charged 612. Alternatively, if total funds are sufficient to cover the co-purchase campaign, the total amount of the purchase may be funded 613.

At this point, the transaction may be processed through the gateway payment processor and corresponding bank 614. The uncaptured charges for each contributor which were previously pending and unsettled on the processing system 607 may be changed to captured and each co-purchaser may be charged for his or her respective amounts 615. The status of the co-purchase campaign may be automatically updated via Splitcart Platform to show the status as funded 616. A receipt may be sent to each contributor by email or other chosen means of preferred electronic communication 617 without limitation unless otherwise indicated in the following claims. The Splitcart Platform may also initiate an API call to the merchant signaling the payment has been fulfilled 618. The merchant may then fulfill the order as it would for any other e-commerce purchase conducted on the merchant's website or mobile application.

In an illustrative embodiment of a co-purchasing system & method configured according to at least FIG. 6, the system & method deviates from a traditional transaction model having a single SKU for the purchase and may fragment (or split) the e-commerce purchase of a good, set of goods, service, or set of services, into a plurality of smaller, individual transactions, wherein each individual transaction may correspond to an individual participating in a co-purchasing campaign. The splitting of a single purchase transaction into a plurality of smaller transactions may be accomplished through a soft authorization to sit and be pooled without running up the corresponding risk threshold, any such transaction is completed only upon full funding and effectuated as a group purchase. This illustrative embodiment may be independent of any specific checkout system, e-commerce platform, outside shopping cart functions, etc. without limitation unless otherwise indicated in the following claims.

Referring now generally to FIG. 7, which is a schematic representation of a portion of the illustrative embodiment of a co-purchasing system & method showing an illustrative embodiment of the product selection process, a potential consumer shopping on an e-commerce retailer's mobile application or retail website may have multiple options throughout the shopping experience to begin the process of initiating a co-purchased gift. In this alternate configuration of the user's navigation through this process, system, and methodology, the user may start by selecting a button or tab included on the retailer's (i) website (oftentimes the home page but which may also be included on any other page or sub-page without limitation unless otherwise indicated in the following claims); or (ii) mobile application, to begin a co-purchasing campaign 701. In this scenario, the Organizer may be given the option to search for one or more items to select for purchase under the co-purchasing campaign 702. A search can be performed by selecting from pre-selected items on a list generated by the retailer 705, by Category 706, or more generally based on a search query entered by the Organizer 707. Other lists for items to purchase may be generated based on other criteria without limitation unless otherwise indicated in the following claims.

In an alternative embodiment of the co-purchasing system and method, the retailer may source products from a variety of third-party retailers 704*a*, 704*b*, and 704*c*, with such product information being sourced from each respective plurality of third-party retailers/suppliers and in some embodiments of the co-purchasing system and method, with the given source of the good/service for purchase acting as the fulfilling and shipping party. In an alternative embodiment of the co-purchasing system & method, upon closing of the transaction, the transaction may be simultaneously executed by the end retailer and the supplying retailer via a computer software (API) call and execution of the order and purchase trigger 703. In this embodiment, the end retailer may pass on the shipping information to the third-party order fulfillment/supplying retailer, and the end retailer (the retailer utilizing the Splitcart Platform) may collect the required sales tax on the purchased good/item for purchase, whether through the retailer's gateway service provider or otherwise directly collected by the retailer (generally based upon the shipping destination or otherwise as required per the relevant law). Alternatively, the third-party retailer featuring the Splitcart Platform may act as its own supplier. Regardless of the source of the goods and/or services for purchase, in this alternative embodiment shown in FIG. 7, the Organizer may search for a good or plurality of goods or services (presumably as a gift) using one of the above and below discussed search functions or other suitable search function without limitation unless otherwise indicated in the following claims.

If the Organizer is using the Search by product category function 706, the Organizer may be given a variety of categorical search options based on the categories of merchandise being offered for sale by the given retailer. Common examples include but are not limited to: apparel, outdoor, sporting goods, furniture, Outdoor and Travel, Office, Automotive, and various other categories that are common to numerous retailers who sell goods without limitation unless otherwise indicated in the following claims.

Alternatively, the Organizer can search using the search bar by typing in a general product description (such as "HD TV") or a specific product by feature and/or brand (for example, "4K Samsung HDTV"), as is a common search function on virtually all e-commerce sites 707. Upon initiating a search by either of the above methods, available corresponding items may be filtered (by API call) and displayed 708. The Organizer can filter the search results of a search by a variety of variables as available on these retailers' sites, some of which most commonly include but are not limited to: free shipping, brand, price range, age of recipient, and gender 710 without limitation unless otherwise indicated in the following claims. The displayed available goods, once selected, may further identify product features, product details, images, specifications, etc. at which point the Organizer can select the desired item to be included in a co-purchasing campaign 709. At this point the Organizer may select an item 711. The illustrative embodiment of a co-purchasing system & method disclosed herein is not limited to a single item for a purchase and can include a plurality of goods/services being selected for a co-purchase campaign in a single transaction. Additionally, this Splitcart Platform can, by the same system and methodology, be utilized for the purchase of a service or set of services (e.g., travel and/or rental accommodations, repair services, etc.) whether purchased for an individual or a group without limitation unless otherwise indicated in the following claims. In one illustrative embodiment, a co-purchasing campaign may be configured for users/contributors to contribute to a vacation and/or other travel expenses, wherein the total amount contributed does not fund the entire cost. In such an embodiment, the amount contributed may still be applied to the co-purchasing campaign upon full funding of the co-purchasing campaign.

Referring now to FIG. 8, which provides a schematic representation of a portion of the illustrative embodiment of a co-purchasing system & method illustrating how a co-purchase campaign Organizer may select a recipient for the purchased good, once the Organizer has selected the good and/or service (presumably for a gift), the Organizer may select a Recipient 801. In selecting the Recipient, the Organizer may be prompted to identify 802 whether the item (or plurality of items) being purchased under the co-purchasing campaign is for the Organizer 803 or another person or party 804.

If the purchase is for someone else (whether an individual or group) other than the Organizer, the Organizer's Contacts may open 805. The Organizer may then be given the option to select a Recipient from the Organizer's contacts or to select a Recipient that is not in the Organizer's contacts 806. If the Recipient of the purchased item or items is not in the Organizer's contacts, the Organizer may be prompted to "Add Contact" 807, at which time the Organizer may enter the contact details, including but not limited to the name, address, and shipping information for the Recipient. Once the Recipient is added to the Organizer's Contacts or the Recipient's name and shipping information is otherwise entered 808), the Contact and/or shipping information may be added to contacts 809. In the alternative, if the Recipient of the purchased item or items is in the Organizer's Contacts, then the Organizer may immediately proceed to the selection of the Recipient in Contacts, and at least the Recipient's name and address may be populated for the delivery of the item or items for purchase under the transaction 810. Generally, the step of specifying at least the name and address of the Recipient may be performed prior to the Organizer selecting SplitCart as the checkout method (which checkout method may be presented among a variety of checkout options as described above). However, if a given retailer's website does not collect such information prior to checking out, the Splitcart Platform may require this information after SplitCart is chosen as the desired checkout option.

Once at least the Recipient's name and address are designated, then the Organizer may be prompted with the option to notify the Recipient once sent 811. If the Organizer selects to have the Recipient notified 812, then the Organizer may enter the e-mail address for the Recipient and may include a personalized message to the Recipient. If the Organizer selects to not have the Recipient notified, the prior step 812 may be bypassed, and the Organizer may be prompted to enter the title of the co-purchasing campaign and/or description of the reason for the co-purchasing campaign 813. At this step, the Organizer may then enter any other delivery information and details 814 if not previously provided.

As previously described above with respect to FIGS. 3 & 9, once the steps of selecting the Recipient and designating the shipping address have been completed, the Splitcart Platform may generate a universal invitation and payment link 901 (the "Link" as previously referenced above). Once the Link is generated, the Splitcart Platform may provide the Organizer with the option to be the first to contribute 902. If the Organizer chooses to contribute toward the purchase price amount at this stage, he or she may proceed to the contribution process 903, as further illustrated in FIG. 5 and as described above. Once the Organizer has contributed, he or she may be directed to the Share Screen 904. If the Organizer chooses not to contribute toward the purchase price amount at this stage, then the Splitcart Platform may proceed to the screen and function under which the Organizer may share the Link under the Share Screen 904.

As previously described in detail above with respect to FIGS. 3 & 9 (wherein FIG. 9 provides another schematic representation of a portion of the illustrative embodiment of a co-purchasing system & method showing an illustrative embodiment of the process by which a link to the co-purchase campaign may be created, and how an invitation to participate in a co-purchase campaign may be shared by the Organizer in a manner similar to that shown in FIG. 3, and without limitation unless otherwise indicated in the following claims), the Organizer can share the Link via multiple mediums, which in part may depend upon what type of device and device operating system the Organizer is using during to share the Link. The Splitcart Platform may automatically detect what Link sharing methods are available to the Organizer based at least upon the Organizer's device type and operating system 905 in the manner as previously described above with respect to FIGS. 3 & 9 without limitation unless otherwise indicated in the following claims. For purposes of brevity, the overlapping features and/or functionality in the schematic representations shown in FIGS. 3 & 9 and their relation to FIG. 4 will not be described further herein.

Referring now to FIG. 10, which provides a schematic representation of a portion of the illustrative embodiment of a co-purchasing system & method illustrating how the platform may handle a link based upon the user's type of device and operating system, in an alternative embodiment of a co-purchasing system & method and specifically a link handling module thereof, once a user clicks the Link for the given co-purchasing campaign 1001, the Splitcart Platform may automatically determine whether the user is using a device on a mobile Operating System 1002 (an "OS," with the current most popular mobile operating systems being iOS or Android, but without limitation and which may include future operating systems unless otherwise indicated in the following claims). If the device upon which the Link is received or viewed is not on a supported mobile OS, the Link may open as a web-application 1003.

If the device upon which the Link is received or viewed is on a supported Mobile OS, the Splitcart Platform may proceed to verify whether the mobile device has the Splitcart app installed 1004. If the app is not installed, the user will be directed to the applicable application store (whether Apple or Android) 1005 where the user can proceed to download and install the Splitcart app. If the app is installed, the application will open and direct the user to the appropriate Link notification for the invitation 1006.

Referring now specifically to FIG. 11, which provides a schematic representation of a portion of the illustrative embodiment of a co-purchasing system & method showing the functions and options that may be displayed to anyone who opens the Link, as well as the process for the user to contribute to the e-commerce co-purchase campaign, the contribution process in this alternative embodiment of a contribution portion of a co-purchasing system & method may be configured in a manner similar to that as previously described above with reference to FIG. 5. The Link may be shared an unlimited number of times with anyone the Organizer wishes so long as the purchase has not already been funded in full, the Link has not expired, and the Link has not been cancelled by the Organizer. Additionally, anyone who receives or views the Link can further elect to contribute and/or re-share or re-post the Link (1101, 1102, 1103a, and 1103b). When a party opens or otherwise views the Link (whether the Organizer, an invitee, or any other third-party that opens the Link) 1104, the Contribution Screen may display 1105 and several functions may appear (whether as buttons or sub-links), some of which include those described in further detail below.

One function, Display Time Remaining 1106, may display the time remaining before expiration of the Link and/or a co-purchasing campaign. A second function, Display Cost 1107, may display the total cost of the co-purchasing campaign, including the cost of the purchased item or items (or service), plus any shipping/handling charges and sales taxes. A third function, Display Amount Funded 1108, may display the amount of the total price that has been funded. The Display Amount Funded function may automatically update via the Splitcart Platform's coding protocol as contributions are made toward the purchase 1109. Another function, View Item Details 1110, may allow the user to view all product specs and details via the Product Details page 1111. Another function, Send Invite 1112, may allow the user viewing the Link to send out, post, or otherwise share the Link invitation 1113 (see also FIGS. 3, 4, & 9 along with accompanying description). Another function, Message 1114, may open the Splitcart in-application messaging platform 1115, which is shown at least in FIG. 12 and described in further detail below.

Another function, Contribute 1116, may allow the user to proceed in the process of making a financial contribution toward the purchase price. If the user selects the Contribute function (by clicking or tapping on the corresponding button or tab as applicable), the user may proceed to a sub-screen from which the user may enter the contribution dollar amount 1117 and may have the option to add a message 1118. Additionally, the user may either select a payment method if the user's payment information is saved 1119, or may select Add Payment and add the user's payment information (including all information traditionally required in order to make a credit card purchase, such as the user's name, address (or zip code), card number, card type, expiration date, and security code 1120 without limitation unless otherwise indicated in the following claims). Once the user either selects a pre-saved payment method or adds a new payment method, the user may then proceed to complete the payment 1121. See FIG. 6 for further details.

Referring now to FIG. 12, an illustrative embodiment of a co-purchasing system & method may be configured to include a messaging system that (as a Splitcart feature) may enable potential and actual co-purchasers using the Splitcart Platform (whether mobile-application based or web-based) to message one another regarding the contemplated or completed group purchase.

If the Organizer opts-in to the group messaging feature which is incorporated into the Splitcart Platform, the Organizer may automatically become a part of this group. Any contributor who opts-in to join the group may also become a part of the group. No contributor is required to join the group or utilize the messaging feature. Any member of the group message may enter his or her phone number and/or E-mail and this information may be stored and utilized through the Splitcart Platform. Upon occurrence of any of the notification triggers, including without limitation any notification that the additional contribution has been made, that the co-purchase campaign has been fully funded, that the co-purchase campaign has expired, that the co-purchase campaign has been terminated by the Organizer, or any other event triggering a notification via the in-app messaging system, the notice may be sent to all group messaging participants via the messaging API within the Splitcart Platform. Further, any text messaging between any of the group messaging participants may be sent to all group members via the messaging API with the Splitcart Platform. This illustration shall not be deemed to limit any of the methodologies or systems through by which in-app messaging can take place via the Splitcart Platform unless otherwise indicated in the following claims.

Referring now to FIG. 13, an illustrative embodiment of a co-purchasing system & method may include a dynamic link messaging feature. Such a feature may provide real-time updates regarding a co-purchasing campaign rather than a single, stagnant notice and/or message. This feature may allow a user to set various notification preferences, and the dynamic messaging feature may provide updates in real time (progressive) to reflect the portion of the required total contribution amount (purchase price) that has been met, along with other information, including without limitation, the remaining unfunded portion of the purchase and the time before expiration of the purchase campaign. In an illustrative embodiment of a co-purchasing system & method, any individual with access to the Link may see and receive in real-time the amount contributed to a specific campaign without the need to refresh and/or reload the application, text message link, and/or webpage without limitation unless otherwise indicated in the following claims. It is contemplated that such a feature may enable a contributor to add more money toward the purchase amount at any time until fully funded, prevent confusion as to whether an individual should contribute, the amount an individual should contribute, and/or other aspects of a co-purchasing campaign, such as group purchasing without limitation unless otherwise indicated in the following claims. Additionally, and without limitation unless otherwise indicated in the following claims, an illustrative embodiment of a co-purchasing system and method may be configured to prevent a co-purchasing campaign to become overfunded by correcting the user's contribution amount if the original amount that user sought to contribute would result in overfunding, prompting the user to contribute a different amount (e.g., a lower amount to prevent overfunding), or any other suitable method/alert without limitation unless otherwise indicated in the following claims.

When the URL is generated by the Splitcart Platform following any update to the co-purchase campaign status, the URL may feed into the image generation API on the Splitcart Platform. This image may be generated and stored in the content delivery network and the URL preview may show the image which is incorporated into the dynamic Link. This feature may utilize a proprietary URL, as opposed to the generic cached graphic, image, or link currently utilized by iOS or otherwise. Unlike other messaging systems with images associated with a link, the Splitcart Platform may recirculate the URL on a constant (regular) basis with each dynamic update and as a result the dynamic Link may always feature the most current image regarding the co-purchase campaign, including without limitation, the total amount of purchase, the amount funded, the open balance, the number of current contributors, the time left on the campaign, and all other relevant information unless otherwise indicated in the following claims.

Generally, the schematic depictions of various features and/or functionality of a co-purchasing system and method shown in FIGS. 14-26 may be similar to those correlating features and/or functionality in similar applications (either native or web-based, mobile, desktop, etc. without limitation unless otherwise indicated in the following claims). Accordingly, such features and/or functionality will be described only generally, with reference to the corresponding figure.

As shown in FIG. 14, which provides a schematic representation of a portion of the illustrative embodiment of a co-purchasing system & method showing an illustrative embodiment of a user login process, the login functionality may be configured similar to those typically used for similar applications without limitation unless otherwise indicated in the following claims. A multi-factor authentication may be used with various embodiments of the co-purchasing system & method without limitation unless otherwise indicated in the following claims.

As shown in FIG. 15, which provides a schematic representation of a portion of the illustrative embodiment of a co-purchasing system & method showing the display process of a user's purchase history, a user's purchase history may be configured similar to those typically used for similar applications without limitation unless otherwise indicated in the following claims.

As shown in FIG. 16, which provides a schematic representation of a portion of the illustrative embodiment of a co-purchasing system & method showing the detailed process flow for the user's purchase history display based on the user's role, this feature and/or functionality may be configured similar to those typically used for similar applications without limitation unless otherwise indicated in the following claims.

As shown in FIG. 17, which provides a schematic representation of a portion of the illustrative embodiment of a co-purchasing system & method showing how products and corresponding product information may be loaded using the co-purchasing mobile application and/or web-based platform, this feature and/or functionality may be configured similar to those typically used for similar applications without limitation unless otherwise indicated in the following claims.

As shown in FIG. 18, which provides a schematic representation of a portion of the illustrative embodiment of a co-purchasing system & method showing how a product, related product information, and/or availability may be displayed to the co-purchasing platform users, this feature and/or functionality may be configured similar to those typically used for similar applications without limitation unless otherwise indicated in the following claims.

As shown in FIG. 19, which provides a schematic representation of a portion of the illustrative embodiment of a co-purchasing system & method showing how users can search the user's existing electronic contacts and/or add additional contact information for a potential recipient while in the co-purchasing mobile application and/or web-based platform, this feature and/or functionality may be configured similar to those typically used for similar applications without limitation unless otherwise indicated in the following claims.

As shown in FIG. 20, which provides a schematic representation of a portion of the illustrative embodiment of a co-purchasing system & method showing how users can add contacts within the co-purchasing mobile application and/or web-based platform, this feature and/or functionality may be configured similar to those typically used for similar applications without limitation unless otherwise indicated in the following claims.

As shown in FIG. 21, which provides a schematic representation of a portion of the illustrative embodiment of a co-purchasing system & method showing how a user can select and/or add a shipping address in the co-purchasing mobile application and/or web-based platform, this feature and/or functionality may be configured similar to those typically used for similar applications without limitation unless otherwise indicated in the following claims. In an illustrative embodiment of the co-purchasing system & method, if a user is using the website to access the co-purchasing campaign, the information available for the user to populate this information may be limited to such information in an autofill file on the browser, mobile device, etc. without limitation unless otherwise indicated in the following claims.

As shown in in FIG. 22, which provides a schematic representation of a portion of the illustrative embodiment of a co-purchasing system & method showing an illustrative embodiment of one of the systems and methodologies by which a recipient can initiate and complete returns using the co-purchasing mobile application and/or web-based platform, this feature and/or functionality may be configured similar to those typically used for similar applications without limitation unless otherwise indicated in the following claims.

In an illustrative embodiment of a co-purchasing system & method, this portion may be configured such that returns may be initiated through the Splitcart Platform application, such that the Splitcart Platform may provide the needed return information to the appropriate retailer. Alternatively, a return may be initiated through the retailer's website or in-store in accordance with the retailer's returns system and/or policies without limitation unless otherwise indicated in the following claims. Generally, the illustrative embodiment of a co-purchasing system & method may be configured to provide each Contributor with an order confirmation acknowledging that Contributor's paid portion, and purchases that originate through a Splitcart application (as opposed to those that originate on a retailer's website) may receive a Splitcart receipt, whereas purchases that are initiated through a retailer's website may receive a receipt from that retailer without limitation unless otherwise indicated in the following claims.

As shown in FIG. 23, which provides a schematic representation of a portion of the illustrative embodiment of a co-purchasing system & method showing an illustrative embodiment of a process for adding a credit card or debit card in the co-purchasing mobile application and/or web-based platform, this feature and/or functionality may be configured similar to those typically used for similar applications without limitation unless otherwise indicated in the following claims.

As shown in FIG. 24, which provides a schematic representation of a portion of the illustrative embodiment of a co-purchasing system & method showing an illustrative embodiment of the user notification settings in the co-purchasing mobile application and/or web-based platform, this feature and/or functionality may be configured similar to those typically used for similar applications. Such notifications may be provided via email, text message, SMS, social media notification, and/or any other suitable notification system without limitation unless otherwise indicated in the following claims.

As shown in FIG. 25, which provides a schematic representation of a portion of the illustrative embodiment of a co-purchasing system & method showing how users can search by product category, whether within the mobile application and/or web-based platform and/or on an e-commerce retailer's web site, this feature and/or functionality may be configured similar to those typically used for similar applications without limitation unless otherwise indicated in the following claims.

As shown in FIG. 26, which provides a schematic representation of a portion of the illustrative embodiment of a co-purchasing system & method showing certain product filter options, whether within the mobile application and/or web-based platform and/or on an e-commerce retailer's website, this feature and/or functionality may be configured similar to those typically used for similar applications without limitation unless otherwise indicated in the following claims.

Referring now to FIG. 27, which provides a schematic representation of a portion of the illustrative embodiment of a co-purchasing system & method, the system and process by which an e-commerce merchant that has integrated an illustrative embodiment of a co-purchasing platform and system can access all information concerning consumer use of the system and sales. It is contemplated that a user having proper credentials (e.g., administrative credentials) may be authenticated so that the user may access various reports, metrics, and/or other data regarding sales, transactions, etc. for items sold through the co-purchasing system & method. Such information/data may include but is not limited to various types of information useful for business purposes unless otherwise indicated in the following claims.

An e-commerce retailer using the Splitcart Platform may also have access to a dashboard. Once the retailer authenticates the account and logs in to the administrative dashboard, the user can select from a variety of options and metrics and can compile reporting data. Metrics may include without limitation, the number of open co-purchase campaigns, the number of completed co-purchase campaigns, the number of expired co-purchase campaigns, the number of cancelled co-purchase campaigns, information on the products and/or services for which campaigns have been created, and the pricing or ticket sizes for each campaign, among other information unless otherwise indicated in the following claims.

Generally, any illustrative embodiment of a co-purchasing system & method configured to provide a gift registry functionality described herein below may serve as either a single retailer registry or a multi-retailer registry, either of which may utilize the Splitcart Platform as disclosed herein along with the Link generation/creation, sharing of same, and/or facilitation and/or execution of the co-purchasing transaction(s) without limitation unless otherwise indicated in the following claims. Furthermore, while the description of illustrative embodiment may be generally presented herein as a registry tool for the co-purchase of goods, the functions are not limited to goods alone, and can also be used to register for and co-purchase services, amenities, and other gifts such as hotel accommodations, travel, events, and the like without limitation unless otherwise indicated in the following claims. A co-purchasing system & method utilizing a registry need not be applied across multiple retailers and may also be configured for a registry at a single retailer without limitation unless otherwise indicated in the following claims. Generally, in any case an illustrative embodiment of a co-purchasing system and method utilizing a registry facilitates co-purchasing of an item on a gift registry not possible previously.

In an alternate illustrative embodiment of a co-purchasing system & method, the Splitcart Platform can operate within a gift registry under which the party setting up a gift registry can also utilize the Splitcart Platform to facilitate co-purchase transactions for items on a user's gift or event registry.

The integration of a co-purchasing system & method into a gift registry provides various advantages not found in the prior art. Unlike a traditional registry that is set up on a single storefront or e-commerce website and only allows a single buyer to contribute the entire sum of the item being purchased off the registry, an illustrative embodiment of a co-purchasing system & method incorporating a registry may include the option to set up registry spanning multiple retailers (a multi-registry function) consisting of any retailer that utilizes the Splitcart Platform and enable Link sharing, dynamic, real-time updates, messaging, and the co-purchase transactions as previously described herein above. The process of setting up and creating the registry may begin on either a participating retailer's website/app or via the website/app for the Splitcart Platform (i.e., a stand-alone embodiment of a co-purchasing system & method that is independent of any specific checkout system, e-commerce platform, outside shopping cart function, etc.).

In another illustrative embodiment of a co-purchasing system & method (or as an additional component/capability/feature that may be added to various illustrative embodiments thereof as described herein), the Splitcart Platform can further include the ability to allow a merchant to create its own Link for a purchase (e.g., a piece of jewelry) and send that Link out to the Organizer. This function can operate either as a virtual storefront or operate as a contribution Link without the need for a virtual storefront. Upon receipt of the pre-generated Link, the Organizer has the ability to contribute using the Link, share the Link through the same options otherwise discussed herein, and the Link and payment collection for contributions of participants in a co-purchasing campaign may operates the same as discussed herein previously and below.

Referring now to FIG. 29, therein is shown a schematic representation of an illustrative embodiment of a co-purchasing system & method showing how a gift registry may be created within an independent co-purchasing system & method platform (i.e., a stand-alone embodiment of a co-purchasing system & method that is independent of any specific checkout system, e-commerce platform, outside shopping cart function, etc., and which stand-alone embodiment may be configured as a web-based application, mobile app, etc. without limitation unless otherwise indicated in the following claims).

As shown in FIG. 29, if the registry Organizer wants to start the registry process or access the user's registry on the website/app for the Splitcart Platform, he or she would visit the applicable Splitcart Platform website page or app button 2901. Upon doing so the user may then either create an account 2902 or Login to the user's existing account 2903. Once the user has either logged in or created a new account, the user may then have the option to choose 2904 from either starting a new registry or continuing under an existing registry already created by the user. If the user chooses to proceed to an existing registry 2905, then the registry page may open and he or she may proceed to the user's registry page 2907 where items can be added, removed, and/or organized. If the user chooses to proceed to create a new registry 2906, then the user may be prompted to fill in certain required fields, which may include without limitation unless otherwise indicated in the following claims, the title of the event, the reason for the registry (e.g., baby shower, bridal shower, housewarming event, etc.), the date of the event, the date the registry may expire, the identity of the Organizer, and other relevant information. Following this step, the user may proceed to the user's registry page 2907 where items can be added, removed, and organized.

Referring now to FIG. 33, therein is shown a schematic representation of an illustrative embodiment of a co-purchasing system & method showing how a gift registry may be created within a retailer's website into which the co-purchasing system & method platform has been integrated. In such an embodiment, the starting point for the user may be a participating retailer's webpage (as opposed to starting the registry process on the website/app for the Splitcart Platform as illustrated in FIG. 29). As shows in FIG. 33, the Organizer of the registry can also start on the website or app of a retailer who utilizes the Splitcart Platform 3301. From the retailer's website or app, the user can have at least two alternative starting routes, either starting on a registry tab (subpage) or starting with a desired item for which the user wishes to register. If the user starts by going directly to the retailer's registry tab 3302, and does not have an existing registry account, the user may need to first create an account 3305. If the user starts with a desired item, he or she can either elect to add the item to a registry 3307 or add the item to his or her cart 3308 and checkout 3309. If the user has chosen to add an item to a registry, regardless of whether the user starts at the retailer's registry tab 3302 or starts with a given chosen item 3303, once the user has an account and has logged in 3306, the user may proceed to either start a new registry 3311 or continue with an existing registry that the user had previously started 3313. If the user elects to start a new registry 3311, then the user may be prompted to fill in certain required fields, which may include without limitation unless otherwise indicated in the following claims, the title of the event, the reason for the registry (e.g., baby shower, bridal shower, housewarming event, etc.), the date of the event, the date the registry may expire, the identity of the Organizer, and other relevant information. Following this step, the user may proceed to the user's registry page 3316 where items can be added, removed, and organized. If the user has previously started more than one open registry, he or she can select the desired registry 3314 and continue 3315 in the process.

As shown in FIG. 30, once the user has navigated to his or her registry page, he or she can search for items to add to the registry 3001 (also in line with item selection under FIG. 7, category search detail of FIG. 25, and filters detail of FIG. 26 as previously described herein above). These items may be pooled and sourced from retailers that utilize the Splitcart Platform and may be searched by groupings or categories such as by retailer 3002, by brand 3003, by product type 3004, category of goods 3005, and filtered by the user 3007 without limitation unless otherwise indicated in the following claims. The user may also search by manual entry into a fillable search bar 3006. The user may then view items 3008, can review the product details (whether pulled directly into the Splitcart Platform app or webpage or redirected to the retailer's site) 3009. The user may then select each item for addition to the registry 3010, and if the user elects to add the item to Registry 3011, the item may be added to the user's registry page (as further detailed in FIG. 31 described herein below). If not, then the user would instead continue to search 3013, or may finalize and publish the registry (as further detailed in FIG. 32 described herein below).

Similar to the search process if the user starts directly on the website or application for the Splitcart Platform registry described immediately above with respect to FIG. 30, as shown in FIG. 34, if the user is searching for items on the website or app of a retailer that has the Splitcart Platform with the registry functions 3401 integrated with the retailer's website, he or she can search the retailer's website or app for potential items to add to his or her registry (also in line with item selection under FIG. 7, category search detail of FIG. 25, and filters detail of FIG. 26 as previously described herein above) with search functions broken up by groupings or categories such as by brand 3402, category of goods 3403, by product type 3404, and filtered by the user 3406 without limitation unless otherwise indicated in the following claims.

The user may also search by manual entry into a fillable search bar 3405. The user may then view items 3407 and can review the product details 3408. The user may then select each item for addition to the registry 3410, and if the user elects to add the item to Registry 3411, the item may be added to the user's registry page (as further detailed in FIG. 31 described herein below). If not, then the user may instead continue to search 3412, or may finalize and publish the registry (as further detailed in FIG. 32 herein below).

As shown in FIG. 31, once the user has selected (clicked) to add at least one item to his or her registry 3101, a dynamic shareable purchase Link (which may be a corollary to and have at least the features/functionality/attributes of any Link previously described herein) may be created for the item and the item may appear on the user's registry page 3102. As presented in FIG. 13 and other figures herein, the Link for each registry item may provide real-time updates regarding a co-purchasing campaign rather than a single, stagnant notice and/or message. This feature may allow a user to set various notification preferences, and the dynamic messaging feature may provide updates in real-time (progressive) to reflect the portion of the required total contribution amount (purchase price) that has been met, along with other information, including without limitation unless otherwise indicated in the following claims, the remaining unfunded portion of the purchase and the time before expiration of the purchase campaign. Once the Link for the item is created and included on the user's registry page, the user may repeat searching for additional items to add 3103. The search can take place on the website or app for the Splitcart Platform and/or the website/app for any retailer that utilizes the Splitcart Platform. The user can also configure the location and placement of each item 3104, either by dragging and dropping the icon or link for each item, or otherwise configuring the placement of each item on the user's registry page. This process for adding items 3105 and arranging the items may be repeated 3106 until the user has added all desired items to his or her registry page.

Referring now specifically to FIG. 32, a schematic representation of an illustrative embodiment of a co-purchasing system & method for publishing and sharing the co-purchasing registry or subset of items from the registry is shown therein. As shown in FIG. 32, once the user has selected all desired items, added the items to the user's registry page, and organized the items if desired, the user may then proceed to publish the registry and share the registry or a subset of items therefrom 3201. From the registry page the user may select "share" 3202, at which time the user may have the option to share a link for either the entire registry 3204 and/or to share the Link for any selected individual item 3203 by a dynamic Link as already discussed in detail regarding FIG. 13 and elsewhere herein. The remaining steps involved may be encompassed within the systems and methods previously discussed and illustrated, including without limitation FIGS. 3 and 9 for Link generation, invitation, and sharing, FIG. 4 for the Link sharing detail, FIG. 5 for co-purchaser contribution, FIG. 6 for the payment splitting methodology and system for transaction processing, FIG. 10 for Link handling, FIG. 11 for contribution (including further that in the context of the registry, the party with the Link can either open a link for the entire registry or the Link for an individual good for co-purchase from the registry), FIG. 12 for in-application platform messaging, FIG. 13 for dynamic Link with self-updating functionality, FIG. 14 for login detail, FIG. 17 or product retrieval, FIG. 18 for displaying the product to the user, FIG. 19 for the search process for contacts, FIG. 20 for the process of adding contacts, FIG. 21 for address initialization and input stages, FIG. 22 for return details, FIG. 23 for initializing and adding payment, and FIG. 24 for notifications detail without limitation unless otherwise indicated in the following claims.

Nothing herein is intended to set a minimum number of purchasers/contributors to a specific co-purchasing campaign or require that there is more than one purchaser for any or every gift on an embodiment of a co-purchasing system and method configured to support a registry, only that with an illustrative embodiment of a co-purchasing system and method so configured any number of purchasers/contributors are made possible (which may also be in varying amounts).

In another illustrative embodiment of the co-purchasing system and method, the Splitcart platform can be used by multiple individuals to pay their portion or share of bills, costs, or expenses, or to contribute funds toward the balance due on someone else's bills, costs, or expenses. In such an embodiment/application thereof, the total amount due would not need to be fully funded as a condition to processing the partial payment. Instead, upon the termination (expiration) date for the campaign, the payment may be processed and logged as a credit to the beneficiary of the payment (e.g., a hospital bill, utility bill, etc.).

In an illustrative embodiment of a co-purchasing system & method, a Splitcart Platform may be configured to allow a user to access the Splitcart Platform through a local software application and/or a web-based application. In such an embodiment the user may have access to a directory of retailers for which the Splitcart Platform may be available and/or a directory of products and/or services for which the Splitcart Platform may be available without limitation unless otherwise indicated in the following claims. It is contemplated that retailers and/or merchants may purchase sponsored listings and/or placement to provide an additional revenue stream to the operator without limitation unless otherwise indicated in the following claims. Such a directory may be searchable and/or filtered via any suitable field and/or characteristic, such as retailer, brand, product category, price, availability, brand, etc. without limitation unless otherwise indicated in the following claims. The data delivered to an end user (in either a local software application, a web-based application, and/or a combination thereof) may be provided via a cloud infrastructure, which may comprise a component of an illustrative embodiment of a co-purchasing system & method, regardless of how a user accesses that data.

In light of the preceding description and figures, those of ordinary skill in the art will recognize that the illustrative embodiment of a co-purchasing system & method may enable multiple users to collaborate and share the cost for purchasing a good, set of goods, service, and/or set of services in a single e-commerce transaction.

It is contemplated that at least one illustrative embodiment of a co-purchasing system & method may be primarily configured for use in a business-to-business context. For such an embodiment the co-purchasing system & method may be configured to allow a consumer to share the cost of an e-commerce retail purchase with others using a dynamic, adaptive e-commerce solution in conjunction with a third-party e-commerce website and/or mobile application utilizing the Splitcart Platform.

An illustrative embodiment of a co-purchasing system & method so configured may provide an e-commerce solution so that a consumer (the Organizer) shopping on a retailer's e-commerce website, web-application, and/or mobile application, may have an option at checkout that: (i) enables the Organizer to electronically invite others to share the cost of a purchase with other co-purchasers; and (ii) runs the transaction utilizing the retailer's existing gateway and payment processor, contingent on the funding of the total purchase price plus any applicable tax and shipping charges before a deadline. Upon electing to split/share the cost of the purchase, a Link may be generated (as described in detail above) and any party with access to the Link (whether via text message, email, viewing on a website, received or accessed via any social medial platform and/or other communication method without limitation unless otherwise indicated in the following claims) can use the link to contribute any dollar amount to the purchase before a deadline is reached. It is contemplated that any person with access to invitation/Link for a co-purchasing campaign can contribute any dollar amount toward the purchase. Further, the co-purchasing system & method may be configured such that it may be available as a checkout option for completing a purchase on virtually any e-commerce website, such as Air BNB, Vrbo, Expedia, eBay, Amazon, etc. without limitation unless otherwise indicated in the following claims.

In an illustrative embodiment of a co-purchasing system & method configured for use primarily integrated into a third party e-commerce retailer's payment processing or checkout system, one or more third-party retailers can integrate with the co-purchasing system & method to provide additional visual presence and/or advertising for events that may have a high likelihood of individuals desiring to split/share the cost of a purchase (e.g., add a banner: "Mother's day is coming, start splitting a gift now" on the retailer's website, etc.). In such an illustrative embodiment, individuals participating in a co-purchasing campaign may review the status of any given purchase in which they are participating either through the retailer or through an application for the co-purchasing campaign (sometimes referred to herein as a "Splitcart application" or "Splitcart app") without limitation unless otherwise indicated in the following claims. Accordingly, in such an embodiment this may provide a platform and methodology for enabling multiple consumers to co-purchase a product through a retailer's existing website and or mobile application while still utilizing retailer's existing gateway and payment processor (credit and debit card processor). In such an embodiment it is contemplated that the purchase may be fulfilled by the retailer into which the Splitcart Platform (i.e., the co-purchasing system & method) is integrated.

Another illustrative embodiment of a co-purchasing system & method may be configured for use primarily in a brick-and-mortar context, wherein a consumer visiting a brick-and-mortar location may be provided with an option to split/share the cost of a particular item (good(s) and/or service(s) with other individuals. Such an embodiment may be facilitated via NFC checkout technology without limitation unless otherwise indicated in the following claims. Another illustrative embodiment in the brick-and-mortar context, the transaction can be effectuated directly through the retailer or service provider's mobile application and/or web-based system into which Splitcart Platform is integrated.

In another illustrative embodiment of a co-purchasing system & method, the co-purchasing system may be configured to include an additional option which, at the time the purchase campaign is initiated, allows the Organizer of a group purchase to assume primary or initial responsibility for the total purchase price, less contributions by others. Such an illustrative embodiment may include all common elements of the other Splitcart payment link sharing and contribution as previously discussed in detail above. For example, the Organizer may still retain the ability to share a payment link with the other potential co-purchasers, the payment information may still be updated in real time, reminders may still be sent, etc. without limitation unless otherwise indicated in the following claims.

In such an illustrative embodiment (i.e., that configured with this type of auto-fund option) the Organizer's selected payment method may be pre-authorized for the total purchase amount, and then as other co-purchasers contribute money towards the purchase using the payment link, the Organizer's payment commitment may be commensurately reduced, and at completion of the purchase the remaining amount may be settled as a final charge to the Organizer.

For example, using the auto-fund methodology of such an illustrative embodiment, if four individuals are purchasing four baseball tickets for $100 per ticket, the Organizer may initiate the auto-fund purchase and commit to the $400 purchase (i.e., the total cost of all four tickets), regardless of whether or not the other co-purchasers also contribute before the contribution cutoff time (i.e., the expiration of when they can contribute using the Splitcart system). That $400 amount would be pre-authorized on the Organizer's credit card or debit card up front. The Organizer may then share the payment invitation link with the three intended co-purchasers (using the same payment invitation options already available under the other illustrative embodiments of Splitcart/a co-purchasing system & method as previously described in detail above, such as text, email, social media, etc.). Assume two of the other co-purchasers then each commit to their $100 ticket price before the expiration period but a third does not, then the system would reduce the Organizer's total commitment amount by the $200 the two co-purchasers contributed. The Organizer may then be charged a total of $200 through the Splitcart system (for the Organizer's and non-contributing but invited individual), and the transaction for the total $400 purchase may still occur.

In an alternative scenario with auto-fund enabled as an option, the participants could allow one individual (e.g., the Organizer) to pay in full up front and complete the purchase transaction entirely, and then allow others to repay their portion in full, at which time the system may refund the corresponding amount to the Organizer who initially paid in full. This is an alternative to having to use a third-party service to reimburse the payor after the fact and may function as a post-pay option of sorts without limitation unless otherwise indicated in the following claims.

Depending upon the nature of what is being purchased, an illustrative embodiment of a co-purchasing system & method may be configured with options to enable the merchant to specify whether each contributor's and/or co-purchaser's portion should be either: (1) a fixed amount per person (e.g. $100 per person, or XX % of the total purchase amount per person) such as for events (e.g., sports tickets, concert tickets, etc.) or travel (e.g., airline tickets, a given person's share of a hotel room rental, vacation rental, etc.); or (2) a flexible amount for any number of contributors and/or co-purchasers (the way already discussed herein in detail for various illustrative embodiments of a co-purchasing system & method).

In another illustrative embodiment of a co-purchasing system & method, the system may be configured to capture and store other related information necessary to complete the purchase, which information may be specific to the given type of purchase occurring. For example, in the situation in which the person is purchasing an airline ticket, the system may also prompt the Organizer and each contributor and/or co-purchaser for his or her required information necessary to book the flight (e.g., each passenger's legal name on his/her Driver's License, DOB, address, TSA number, etc.) without limitation unless otherwise indicated in the following claims. When the payment transaction processes, the Splitcart system could also submit this other required information to the airline via electronic means (which may be automated and integrated into the airline's system). The Splitcart system could securely store this necessary passenger information under each contributor's and/or co-purchaser's Splitcart account as well for future use if desired.

In still another illustrative embodiment of a co-purchasing system & method, the system may enable a merchant to post a unique QR code for a product or service, which a user could then scan on their phone (or using the Splitcart app), and then organize, initiate, and commence the group purchasing process and/or campaign (e.g., the Splitcart transaction flow as previously described in detail herein). This could also be used without the need for the purchase to be configured as a group purchase. The Organizer could also simply use this feature to make a purchase alone using one or more credit and debit cards.

For example, this may be helpful for companies that sell on TV, such as the home shopping channel (QVC), as users could just scan a QR code on the TV for a given product and use Splitcart to make an individual or group purchase, rather than having to call the home shopping network and pay using a card over the phone. It also may help increase sales for such companies as it may provide the option of a group purchase, which is not an option when a purchaser calls the merchant to pay over the phone.

The illustrative embodiments, components, features, and/or functionality of various co-purchasing systems & methods disclosed herein may provide a checkout and technology platform that includes the various components features and/or functionalities in any combination for the compatibility of the same without limitation unless otherwise indicated in the following claims, and may be a part of a total scope of a co-purchasing system & method that includes the technological ability for multiple individuals to co-purchase an item(s) (good(s) and/or service(s)) in a single e-commerce transaction.

Various illustrative embodiments of the co-purchasing system & method may be configured such that a participating retailer is not required to use any specific merchant services gateway, front-end processor, or back-end processor or acquirer/bank/financial institution without limitation unless otherwise indicated in the following claims. That is, in various illustrative embodiments the co-purchasing system & method may be configured such that the Splitcart Platform can be integrated into an e-commerce's credit and debit card processing system (its gateway and processor) without the need for the retailer to switch the gateway or processor without limitation unless otherwise indicated in the following claims. The invention, among other features, functions, and attributes, represents a key new piece of technology that fills a gap in e-commerce payment processing namely the ability to effectuate a co-purchase transaction as a checkout system, and in multiple embodiments of the system and methodology, doing so without displacing the existing gateway and processing platform and systems utilized by the retailer.

Additional Illustrative Embodiments of a Co-Purchasing System & Method

Detailed Description—Listing of Elements (FIGS. 35-53)

| Element Description | Element Number |
|---|---|
| Cost Sharing Platform and System (aka SplitCart) | 100 |
| Order produced via SplitCart | 100a |
| Intro Screen | 101 |
| Coach mark's | 102 |
| Home screen | 103 |
| Choose receiver option | 104 |
| Receiver | 104a |
| Choose Splitter option | 105 |
| Splitter (contributor) | 105a |
| Shop for product | 106 |
| Table view of products | 107 |
| Select Item screen | 108 |
| Review Screen | 109 |
| Payment Screen | 110 |
| Thank You Screen | 111 |
| Ask for permission for contacts | 112 |
| User contacts | 112a |
| User | 113 |
| First time user create an account | 113a |
| Manual search bar (not shown) | 114 |
| SplitCart cost calculator | 115 |
| User contacts | 116 |
| Selected Product | 117 |
| Menu action icon (Hamburger menu) | 118 |
| Search button (feature) | 119 |
| Unique Splitcart ID creation | 200 |
| Organizer process | 201 |
| Notification (to the three Splitter/Contributors) | 202 |
| Receiving information | 203 |
| Accepted offer | 204 |
| Rejected offer | 205 |
| Ignored offer | 206 |
| Confirmed text/email | 207 |
| Detailed message | 208 |
| Decision (accept/deny/reject) | 209 |
| "Denied" pathway | 210 |
| "END" | 211 |
| Organizer | 212 |
| "Ignore" pathway | 213 |
| Reminder (to the Splitter/Contributor) | 214 |
| Original request sent (Splitcart initiated) (Mark) | 301 |
| Accepted offer (Kris) | 302 |
| Accepted offer (Eian) | 303 |
| Accepted offer (Sid) | 304 |
| Fund confirmation | 305 |
| Funds pulled via Application Program Interface (Fund API) | 306 |
| Other | 307 |
| Order pushes to cloud | 308 |
| Order executed | 309 |
| Retailer ships product | 310 |
| Retailer website | 310a |
| Delivered to client | 311 |
| All CC's stored with gateway | 312 |
| Invitation to Splitters | 313 |
| 24-hour process (before deadline) | 401 |
| 24-hour window | 401 |
| Partial funds collected | 402 |
| Cover the difference option offered | 403 |
| First trigger ("Have all funds been collected?") | 404 |
| "Yes" | 405 |
| Ordered Item | 406 |
| Confirmed text/email | 407 |
| "No" | 408 |

37
-continued

| Element Description | Element Number |
|---|---|
| Reminder notification (text/email) | 409 |
| Deadline (for collecting fund) | 410 |
| Second trigger | 411 |
| ("Have all funds been collected?") | |
| "Yes" | 412 |
| (for second trigger) | |
| "No" | 413 |
| (for second trigger) | |
| Conversion to gift card option | 414 |
| "Yes" | 415 |
| (for gift card) | |
| Order of gift card | 416 |
| "No" | 417 |
| (for gift card) | |
| Third trigger | 418 |
| ("Cover the remaining balance due?") | |
| "Yes" | 419 |
| (for third trigger) | |
| "No" | 420 |
| (for third trigger) | |
| Cancellation | 421 |
| Logged in Splitcart's application | 500 |
| Motion Graphics 1 | 501 |
| Motion Graphics 2 | 502 |
| SplitCart App (user interface) | 510 |
| Coach marks | 601 |
| Manual Search | 701 |
| Categories search | 702 |
| Home view controller | 703 |
| Carousel of items | 704 |
| Splitcart Cost Calculator | 705 (aka 115) |
| Outer ring | 706 |
| Inner ring | 707 |
| Rest | 708 |
| Contributor cost | 709 |
| Contributor percentage | 710 |
| 4 buttons | 711 |
| Receiver button | 712 |
| Splitters button | 713 |
| Product button | 714 |
| Review button | 715 |
| Manual add of receiver | 801 |
| User card | 802 |
| Splitcart identifier | 803 |
| Manual add of Splitters | 901 |
| User card | 902 |
| Splitter counter | 903 |
| User confirmed | 904 |
| Splitcart identifier | 905 |
| Manual search bar | 1001 |
| Category selection | 1002 |
| 4 buttons | 1003 |
| Manual search bar | 1101 |
| Autofill Apple Framework | 1102 |
| Search button | 1103 |
| Manual search bar | 1201 |
| Filter | 1202 |
| Favorites "Star" | 1203 |
| Back | 1204 |
| Loading indicator | 1205 |
| Item images | 1301 |
| More images | 1302 |
| Item title | 1303 |
| Item price | 1304 |
| Image description | 1305 |
| Similar products | 1306 |
| Select item | 1307 |
| Per Splitter cost | 1401 |
| Organizers percentage | 1402 |
| 4 buttons "complete" | 1403 |
| Select receiver | 1501 |
| Choose Participants | 1502 |
| Go Shopping | 1503 |
| Splitcart Cost Calculator representation | 1504 |
| Numbers breakdown | 1505 |
| Finalize button | 1506 |
| Product main image | 1601 |

38
-continued

| Element Description | Element Number |
|---|---|
| Product description | 1602 |
| Date to collect funds | 1603 |
| Delivery date | 1604 |
| Shipping address | 1605 |
| Payment | 1701 |
| CC info | 1702 |
| Cost breakdown | 1703 |
| Place order | 1704 |
| Terms & Conditions | 1705 |
| User data | 1801 |
| Active Splitcarts | 1802 |
| Notifications | 1803 |
| Favorite Products | 1804 |
| Splitcart history | 1805 |
| Change password | 1806 |
| Update Payments | 1807 |
| Settings | 1808 |
| Address | 1809 |
| Logout | 1810 |
| Creation of Splitcart | 1901 |
| Splitter receives | 1902 |
| Account created | 1903 |
| CC info Stored | 1904 |
| Issue with CC | 1905 |
| Splitcart agreed to execute by all | 1906 |
| CC money pulled | 1907 |
| Order placed | 1908 |
| Issue with CC | 1909 |
| Message to all | 1910 |
| Issue rectified | 1911 |
| Issue not rectified | 1912 |

FIG. 35 illustrates an overview of the System as disclosed herein implemented via an application or a website. Although not shown in detail, one of ordinary skill will appreciate the Splitcart uses a backend computer system for collecting user data, storing user data and executing user data. Each user may be assigned a unique Splitcart ID that may be used for the purposes of everything related to Splitcarts, that are organized, invited to, or participated in. (See FIG. 36 and discussion regarding same.) All systems for money tracking, executing orders, processing return requests, connecting together all Splitcart data, monitoring Splitcarts in progress, email distribution, follow-up processes and every other aspect that requires communication between Splitcart IDs may be done through the back-end computer system which may be configured to allow multiple people to contribute to the same item purchased via the Splitcart 100. Further, it should be understood that internal notifications support the Splitcart system 100 as disclosed herein. Internal notifications may be used for communicating status steps of each Splitcart 100 and may be an integral part of the process. Internal notifications can be turned on or off through the settings menu. Internal notifications also act as triggers for specific events and actions to ensure a Splitcart is on task for completion, as further disclosed and discussed herein.

Still referring to FIG. 35, show therein is an overview of a gift splitting process for use of an application or a website as disclosed herein. As shown in FIG. 35, upon downloading and opening the Splitcart 100 implemented as an application on a computer or smart phone for the first time the user 113 will experience an intro screen 101 then a series of coach mark's 102 highlighting unique areas of the Splitcart 100 implemented via the app including an option to "x" out of the coach mark's 102 may be accessible on every coach mark's 102. Upon the completion of the coach mark's 102 the user 113 may be shown the home screen 103. The home screen 103 may have the manual search bar 114 on the top of the screen, the top portion of categories shown as well as the cost calculator 115 shown. The cost calculator 115 may be the primary focus of the screen and may show a rotation of top selling items with different scenarios laid out. The user 113 may be able to select one of the rotational items for purchase and, upon selection (selected product 117), may direct them to the select item screen 108. The user 113 may also be able to take manual control of the Splitcart cost calculator 115 and enter their own scenario. Upon this action the carousel display of top selling items may continue to rotate but the new item may not impact the cost calculator 115 of the Splitcart. Once the consumer selects a product from the select item screen the carousel may no longer be active, and the consumer's product may be represented in the section. The user may be allowed to explore the home screen 103, shopping categories screen 106 as well as the manual search bar 114. The user may also access the menu action icon 118 (sometimes referred to as the hamburger menu) to open the app and access the applicable features relative to a new account. (See also written description for FIG. 40 herein and accompanying illustrations) The user may also shop for items and place them onto the home screen 103 to review and modify a Splitcart 100 generated via the app. The user 113 may use either the search bar 114 or the categories section to find an item. When these areas are used the API 306 may scrape the retailer's websites 310a and display the products in a table view 107.

When a user 113 chooses a specific item, it may be placed in the select item screen 108 which will house the product title, description, price, variants, and similar products. All of these things can be done without any demand of information from the app. Upon pressing the receiver or splitters buttons on the bottom of the home screen the app may ask for permission to access the user's contacts 116. As defined herein, a receiver 104a is someone that may receive the product or item selected for purchase by the user 113 using the SplitCart 100. As defined herein, a contributor (splitter) 105a is someone that may contribute to the purchase of the product or item selected for purchase by the user 113. If the user 113 does not allow permissions into the user's contacts 116 the manual entry form may still be available to be utilized. Upon entering the review screen 109 (for the first time and until an account is created) 113 a pop-up demanding login information may appear. Behind the pop up may be a slide up view controller with the registration form. User 113 acknowledges the pop-up and can cancel or sign-up or slide down the view controller. The user 113 cannot move forward without logging in or creating an account. A username and password may be required for logging in, but they can use the Facebook, Apple, or other third-part framework instead without limitation unless otherwise indicated in the following claims. Although not shown, one of ordinary skill will appreciate that the Splitcart contact system may be adapted to incorporate or work with the users' social media contacts 116a through such social media platforms as Linked-In, Facebook, and Instagram without limitation or restriction unless so indicated in the following claims. For example, the present Splitcart 100 could incorporate the user's connections from social media allowing the contact menu to be further expanded so that the user may have the ability to reach into their social networks using popular social media platforms. The organizer may interact with and through social media platforms improve access to users and their contact data. The organizer could also create a Splitcart for public participation which could interface with the users in the social media platform on separately.

Once a user 113 has created an account and logged in, selected a product 117 and added a receiver 104a of said selected product and splitters 105a (if applicable) of said Splitcart 100, the payment screen 110 may show final pertinent information related to the Splitcart 100. The first time the user 113 creates a Splitcart 100 the review screens shipping area may be blank. The user 113 may fill this in and be prompted to add this to their account profile. An API 306 may validate this address before allowing the user 113 to execute an order 100a generated using Splitcart 100. If the user 113 denies the addition of the address to their profile, the next time they use the app they may receive a new coach mark 102 suggesting the addition of an address to make their experience better. When a user 113 creates an order 100a using Splitcart 100 the application may demand that a receiver 104a, splitter(s) 105a and a product 106a be selected as on the Shop for Product screen 106 in FIG. 35. The first time a user 113 accesses the choose receiver screen 104 or the choose splitters screen 105 the application may ask for permission to access the user's contacts 112. Upon the successful selection of these 3 categories the user 113 may ensure the correct shipping address and payment method may be loaded into the review screen 109. Once the user 113 presses "finalize" or "order now" or any other embodiment of the action to move forward the application may load the Apple framework for SMS with a predefined message and the splitters phone numbers that were selected during the "splitters" process or on the "splitters" screen 105. One of ordinary skill will appreciate that other operating system frameworks may be substituted for the Apple system to allow for messaging capability without departure from the spirit and intent of the present disclosure. This framework may be modifiable to add a personal note and may also consist of a weblink for the Splitcart order 100a in question. The backend system may also send an email invite to all of those who's emails (in the user contacts 112a) were included and may send an in-app notification for all of those who have already made an account, have the app, and have notifications turned on. This link may direct the party receiving the invite (the splitter 105a) to the SplitCart 100 through the app (if downloaded), to the app store or to a web application that acts as the app for people who do not have the app installed nor wish to install the app. Upon a successful invite send the application may show the user 113 a thank you screen 111 where they may have the option to return to the home menu 103.

Referring now to FIG. 36, therein is show an overview of one embodiment of the Splitcart process as disclosed herein. In FIG. 36 we see a single organizer (Mark) and three (3) Splitters or Contributors (Kris, Eian and Sid). The organizer initiates the process 201. Splitcart may create unique user IDs for all parties involved 200. Through the process defined in FIG. 35 but may vary from this process as iterations and development of the application may dictate certain paths and or parameters, the organizer 212 sends an SMS message using Apple frameworks, and if applicable, the Splitcart system 100 sends a notification 202, which may be an email or other electronic message, to the three (3) splitters 105(*a*) who may contribute to the purchase of the gift selected by the organizer 212. All parties may receive the same information 203. Upon receiving the invitation there may be at least three (3) conceived outcomes (204, 205 and 206), without limitation or restriction unless otherwise indicated in the following claims. The offer may be accepted 204, the offer may be rejected 205, and the offer may be ignored 206. Each conceived outcome may have a particular path which may be followed. All paths may have automated responses produced by the application or website which may assist the organizer 212 in the ultimate goal of collecting all the funds for the item selected and placed in the Splitcart 100.

When a person (as potential contributor or "splitter 105a) receives an invite for a Splitcart 100, and if the splitter 105a has the application on their phone the invite link (see above) may open up to the Splitcart details page and present the detailed photos and description of the selected product 117 being ordered. If the person does not have the application on their phone and they may have an iOS device the link may direct them to the app store. If the person does not have an iOS device the link may open to a web application which may offer the same user experience. The amount they owe, the person who invited them (along with a telephone number and/or email of this person) as well as a total number (or could be the list of names) of those also contributing to the item. The user may have the opportunity to either accept or decline the Splitcart. Upon acceptance 204 the user may simply go to the payment screen and acknowledge their portion. Upon declining 205 the Splitcart the app may thank them and display an exit message. Either accepting or declining a Splitcart 100 invitation may send a notification to the organizer 212 of the Splitcart 207. If accepted, the splitter 105a may be moved to the participated column in the specific Splitcart's history, if declined the splitter 105a may be moved to declined. If declined, the organizer 212 can simply select the person's name and the Apple framework for SMS may appear with that person's number loaded as well as a predetermined message 208 which can be manipulated and may have another link to the Splitcart in question.

If the outcome of the invitation is ignored 206 the app or website may automatically send a reminder to the Splitter/Contributor 105a every 24 hours. This may only happen if an email is provided during the invite OR if the invited splitter 105a has a previously created Splitcart account then in app notifications may be sent 214. The organizer 212 may receive a status update every 24 hours in the form of a notification which may lead back to the Splitcart in progress. From here the organizer 212 can choose to send another invite via texting as mentioned above 208. Upon receiving final requests from the organizer 212 both the rejected party and the ignored party may have a final chance to accept, reject or ignore the offer 209. If accepted, then they follow the same path previously defined in 204. If a final request is denied 210 then 'END' 211 may happen for the Splitter/Contributor 105a and a message goes to the Organizer 212. If ignored during the final process 213 then 'END' may be followed 211 and a message may go to the organizer 212. For 211 END then the process follows the path laid out in FIG. 38 from 413 through 421.

An illustrative embodiment of a process flow map is provided in FIG. 37 showing the flow of money and order processing as it relates to the Splitcart process illustrating the organizers 212 initial request 301. The transaction 304 may be conducted with a third-party payment gateway. The organizer 212, Mark in this example, may generate a request 301 to initiate the process of Splitcart 100 and send out invitations 313 to the Splitters/Contributors 105a. In this example all three (3) Splitters/Contributors 105a may be giving an equal amount via accepted offers 302, 303, and 304, respectively. Upon fund confirmation 305, the backend system may trigger the final pull of the funds through a third-party gateway service (Fund API) 306. Upon the successful collection of funds for any given Splitcart 100, after the application gatekeeper (such as firebase for Google) has received acknowledgement from the third-party credit card security system (such as NMI) that the funds have been verified, the gatekeeper application initiates the process of order automation 308 and execution 309 across the network/internet. The retailer from which the selected product 117 is ordered may ship the product 310 and the item may be delivered 311 to the consumer which could through a number of shipping options. All things related to shipping, delivery charge and tax may be done through a marriage of technologies driven by the app, third-party sources and the retailers 307.

Based on the diagrams and flowcharts provided, one of ordinary skill will understand that when a Splitcart is successfully executed, and the product has arrived at its destination (verified by tracking) the organizer may receive an internal notification asking if the receiver has received the product. If the user says "no" then the app may log the response and ask again in 24 hours. The user may have the option to change the notification from 24 hours to 48 hours or 72 hours. Once the user says "yes" that the receiver has received the product the app may give a pop up requesting the receivers email. If the email is not readily available, the user can come back to the Splitcart details and bring this pop up manually or it may ask again in the predefined timeframe. Once the email is provided and the user hits "send" the back-office system may send an email to the receiver with all the splitters names, verbiage about Splitcart, and a link to follow for returns. A notification may go to the database which may enact a crawler to spin up the return process through the company account. Once the return is validated by the retailer a shipping label may be generated and emailed to the receiver's email. It may also be available in the iOS app and the web app.

The receiver may be responsible for ensuring all requirements of the return may be true as well as affixing the return label and executing the shipping process. Once the item is returned successfully and the company has received confirmation of the funds returned to the account, the company may execute the Splitcart credit or digital gift card.

Upon selecting the link, it may either take them to the iOS application (if installed), the app store if not installed or a web app if they do not have an iOS device. All processes may work the same whether on a web app or the iOS app. The user may be presented with the guidelines of the return and an option to execute the return. The receiver may decide whether they wat to receive a Splitcart credit for the cost of the item or a digital gift card to a particular retailor. When the user chooses to execute the return they may fill in the pertinent information and hit send.

Referring now to FIG. 38, therein is provided an overview via flowchart of the process when the funds are not collected for the item selected to be purchased. As previously stated, the organizer 212 may get notifications every 24 hours about the status of the Splitcart 100. At any time, the organizer 212 can go into the Splitcart history and resend an invite to anyone who has not committed. This process uses, but is not limited to or governed by, a 24-hour 401 window. 402 shows only a portion of the funds have been secured. Upon the arrival of the twenty-four (24) hour deadline the organizer 212 may be given an option to cover the difference in the specific Splitcart details section 403. This may allow the organizer 212 to pay for any uncollected funds keeping the Splitcart in progress for completion. The system may notify the organizer 212 of this change via an internal app notification. The first trigger 404 may be "have all the funds been collected?" If the answer is yes 405, and for whatever reason the order process was not executed, then the item may be ordered 406 and a message may be sent to the Organizer and the Splitters/Contributors 407. If the answer is no 408, assuming the 24-hour rule is implemented but it does not have to adhere to that exact time, the system may send out an automated 409 reminder to all parties involved via an in-app notification. First a notification may be sent to the organizer 212 who can then send a (predefined) SMS messages to those who have yet to participate and if the user has an email on file the backend system may send that or if they have the application installed, they too may receive an in-app notification. At the deadline time for collecting funds 410 the system may ask the question again "have all funds been collected?" 411. If the answer is yes 412 then the path may execute back to 405. If the answer is no 413 then the system may check to see if the Organizer chose 414 to convert funds to a retailer gift card, which option always may be available to the organizer 212. If the answer is yes 415 then the gift card order is executed 416 and the system follows the path of any completed order. Upon this action an email may go out notifying all verified splitters of this action. If the answer is no 417 the system may ask, "did the Organizer choose to cover the remaining balance due?" 418. If the answer is yes 420 the system may move to 405 to execute the order. If the answer is no 419 the system may cancel all requests 421.

It should be understood that in another embodiment of the SplitCart 100 disclosed herein, when a new Splitcart is generated via the app a Splitcart details screen may be created in the Splitcart history. The organizer can review all information and participants in this screen. At all times the organizer can choose to convert the funds collected to a gift card. Upon selection of this the system may generate and send a message to all of the selected receivers who have either committed or been unresponsive pre-loaded which states the intent of the organizer 212. At the end of the Splitcart collection time the application may pull all the funds of those who participated and may order the gift card and ship it to the applicable location. When the timer gets down to 24 hours until the end of a Splitcart, the organizer 212 may get an in-app notification which may link them back to the details screen. An option may be provided allowing an organizer to "cover the difference." The Splitcart system may show what the organizer 212 must contribute (above and beyond what has already been committed) in order to complete the order process. If the organizer 212 agrees to this amount, at the end of a Splitcart, whatever funds may be needed to satisfy the Splitcart order 100a may be charged to the organizers credit card. In the event someone else contributes in the last 24 hours, the app may perform the appropriate calculations accordingly and may always display correct information. This may be a private event that may not trigger a notification to other participants. The action may be logged in the data base as well as with the credit card processor.

A screen shot of an illustrative embodiment of the forward-facing experience the user 113 is shown in FIG. 39 once the user launches the Splitcart app—similar experiences may and could be represented in a web-based experience. The screen may have a motion graphic loading the Splitcart "cart" aspect of the logo 501. The screen may have a counter 502 that showed the ever growing number of products in the Splitcart inventory. This screen may automatically close after a pre-determined time.

An opening coach mark 102 is shown in FIG. 40. This may be one of many coach marks 102 the user 113 may see to help guide them through the Splitcart process 100. Behind the screen, for each coach mark 102, may be relative information to the coach mark 102. There may always be an exit "X" in the upper right corner of the coach mark 102. These may only be offered the first two (2) times the app launches. There may be a way to access this path again through the settings menu.

An example of what a home screen (103 in FIG. 35) may look like after the coach marks 102 are completed is shown in FIG. 41. This may provide an overview of the heart of the app, the forward-facing screen which offers multiple points of access to the entirety of the app as disclosed herein. As shown, this screen shows the user 113 a search bar 701 on the top of the page which allows a user 113 to manually type in products available for selection and purchase. Below this may be where the predetermined categories 702 can be found. Categories can be used when the item being purchased is unknown or undecided. Overtop of this screen may be a view model controller 703 which houses a carousel 704 of rotating best-selling items and the Splitcart cost calculator 705 (see 115 on FIG. 35). Upon launching the app, the carousel may offer a user the ability to "see" what and how Splitcart 100 works through a series of examples in the Splitcart cost calculator 705. Below the carousel of items may be the Splitcart Cost Calculator 705. There may be two rings associated with the Splitcart Cost calculator, the outer ring 706 and the inner ring 707. The outer ring 706 may give the organizer 212 the ability to set his or her static amount they wish to contribute to the selected product 117 to be purchased. If the organizer 212 does not choose a static amount the outer ring 706 may move in equal accordance with the inner ring's 707 selection. Such as: for everyone splitter 105a added the total cost of the item may be divided by the organizer 212 and "x" splitters 105a to keep an equal proportion for all parties involved.

The calculator may financially reward the organizer 212 for every splitter 105a added with a maximum reward of a $0.00 contribution amount for the organizer 212. This ring, if actuated by the organizer, may control the process throughout the rest of the payment structure of the process unless the organizer 212 presses the reset 708 button. The organizer's dollar amount for the contribution (709) and percentage (710). The inner ring 707 may be where the organizer 212 can see what the cost may be for all parties involved by "adding" splitters to the equation. As the organizer spins this ring, fictitious splitters may be added to the Splitcart 100. This ring may be nothing more than a cost calculator and may have no bearing on final numbers. Below the cost calculator 115 may be shortcut keys 711 for executing the process of a Splitcart. These shortcut keys or shortcut buttons may be designed to be used in any order and each may have a different impact on the app. Each key or button may load a new view controller with the pertinent information in it. These may be designed to offer the user 113 control over the experience which allows for greater freedom throughout the app. Some of these actions, when completed, may have a direct impact on other screens, numbers, totals, and calculations throughout the app.

Upon selecting the Receiver 712 button, the app may bring up a contacts view controller which may have the user's contacts (if permission has been given) loaded into it (see FIG. 42). The user may choose from the list of names the person in who is selected to receive the item selected for the Splitcart. There may be a manual add button 801 for someone not in the user's contacts. There may be a slide 802 which may have the user's contact data loaded at the top in the event that the person organizing the SplitCart 100 is the person receiving the item.

Upon selecting the Splitter 713 button, the app may bring up a contacts view controller which may have the user's contacts (if permission has been given) loaded into it (see FIG. 43). The user can choose anywhere from one (1) person to their entire contact book as Splitters. There may be a manual add button for someone not in the user's contacts 901. There may be a slide 902 which may have the user's contact data loaded at the top in the event that the person organizing the SplitCart 100 is the person receiving the item. As splitters are selected there may be a counter 903 at the top of the screen to maintain a selected count. When one person is selected the organizer may be automatically selected 904. Upon selecting the appropriate number of splitters, the user exits the screen with the "done" button. Upon this action the SplitCart 100 calculator may be updated with the correct number of splitters. The user can still take manual control of the SplitCart 100 cost calculator to see what different scenarios may look like but the number of Splitters that have been manually selected ultimately dictate what the preview screen represents for cost.

Upon selecting the Product button 714, the app may lower the home view controller (home screen) and may expose the category view controller (see FIG. 44) This may also give access to the search bar for manual searching. Upon selecting the Review button 715, the app may bring up the preview view controller (see FIG. 49) where the SplitCart 100 process is laid out in very simplistic fashion.

Referring to FIG. 42, and illustrative embodiment of a basic contacts manager displaying potential Recipients of the gift effort is shown therein. The user's contacts, once permission is given, may be displayed here. There may be a manual add button 801 for someone not in the user's contacts. There may be a slide 802 which may have the user's contact data loaded at the top in the event that the person organizing the SplitCart 100 is the person receiving the item. The application may recognize people in the user's contacts who have the SplitCart 100 app installed and display a colored SplitCart 100 logo next to their names 803.

An illustrative embodiment of a basic contacts manager displaying potential Splitters is shown in FIG. 43. The user's contacts, once permission is given, may be displayed here. There may be a manual add button 901 for someone not in the user's contacts. There may be a slide 902 which may have the user's contact data loaded at the top in the event that the person organizing the SplitCart 100 is the person receiving the item. As splitters are selected there may be a counter 903 at the top of the screen to maintain a selected count. When one person is selected the organizer may be automatically selected 904. The application may recognize people in the user's contacts which have the SplitCart 100 app installed and display a colored SplitCart 100 logo next to their names 905.

An illustrative embodiment of a product search screen is shown in FIG. 44. This screen may hold multiple view controllers and may be the starting point for a user's shopping experience. A manual search bar 1001 may give the user the ability to perform a scrape for any key word typed in. The categories area 1002 may be a preloaded selection of items determined by the scrape of the retailers' categories. The user can choose these categories to help decide or to help choose the best gift for the SplitCart 100. At the bottom of the page may be the home view controller and the 4 short cut keys 1003 which may take the user to the marked areas of the application.

A representation of a user typing in an item in the manual search bar 1101 is shown in FIG. 45. By using the Apple framework for auto complete 1102 the users' experience may be enhanced. The user may then press the search 1103 button to initiate a scrape of the retailers' websites.

Referring now to FIG. 46, therein is shown an illustrative embodiment of a search table view controller and may be found after the consumer does a search from either a manual search or using the categories feature. The manual search bar 1201 stays at the top of the screen and a filter button 1202 may be added to the left. The filter allows a user to sort the items in the table view by a myriad of different ways, not exclusive to but an example would be pricing, size, color, etc. Each product may have the title and price displayed. The user can press the star 1203 to save the item to their favorites menu (which can later be accessed in the settings). The back tab 1204 allows the user to slide the view controller to the left and gain access to the previously visited screen. In the event a product image fails to load or is slow loading an indicator may be offered 1204. To move forward the user simply may choose an item by pressing anywhere in the items window.

An illustrative embodiment of a select item screen is shown in FIG. 47. This function of this screen may be to display the product chosen after the table view screen. In this screen the user may be able to view all applicable images and videos (if available) 1302 of the product. A detailed description 1303 and pricing 1304 may be disclosed. Furthermore, if the scraper finds that the chosen product may have variables, these variables may be displayed. Variables can range in type, size and volume and the area to display such variables may be dynamic. The user may be provided a complete product description 1305 for review. The user may also be provided with a list of similar products 1306 to choose from. The similar products search may be theoretically infinite as every time a product may be chosen and new scrape of the web goes out to find other similar products to the new selected. This may be very beneficial as it may allow the user to find products that they were unaware of and perhaps even products in different categories than the main product. The user would then select the button labeled "choose" or "select item" 1307 which may take them back to the home screen.

Referring now to FIG. 48, therein is shown an illustrative embodiment of a home screen with the item from the select item screen placed into the view model controller. The action of selecting a specific item may cease the carousel from rotating through items (see FIG. 41). In this example we see the organizer has chosen two (2) splitters 1401 for calculating cost. The organizers participation level goes to 33% 1402 which may match an even portion of two splitters and one organizer; totaling 3 people splitting the cost. At the bottom of the page may be the home view controller and the 4 short cut keys 1403 which may take the user to the marked areas of the application. Upon completion of each section these buttons may turn green indicating they are completed.

An illustrative embodiment of a preview view controller screen is shown in FIG. 49. The user may be shown an option to select receiver 1501, choose participants 1502 or go shopping 1503. Each button represents the button from the bottom of the home screen and actuates the same process (see FIG. 41). As these areas may be filled out the app may appropriate the correct information in each field. When a receiver is selected that person's information may appear in the select receiver section 1501. As splitters are chosen, they may be represented in the choose participants section 1502. This section can grow dynamically and may have a view controller for easy scrolling. Once a product is selected it may appear under the go shopping section 1503. The Go Shopping section may also, when the other fields are satisfied, have an image of the SplitCart 100 cost calculator 1504, the number of splitters chosen 1504 and a representation of est. per person costs 1505. As each section is satisfied, they may turn from a blue to a green indicating fulfillment. Once all areas are satisfied the bottom Finalize 1506 button may turn green indicating moving forward is possible.

An illustrative embodiment of a first portion or top portion or the payment view controller screen is shown in FIG. 50. Here the user may be shown the main product image 1601 for the SplitCart 100 100 as well as the products title and description 1602. The user may be shown a date to collect funds which may be predetermined at three calendar days 1603. The user may also see an estimated date of delivery 1604 for the item selected for purchase. This date may be pushed back 4 days after the final date to collect funds. This date may be merely an estimate. The user may have the ability to choose a shipping address 1605 by pressing the edit button. The user may be given the option to add this address as a default shipping address. This may not need to replace the user's inputted home address but may instead act as a secondary shipping address. The user's profile data may be used as the default shipping address. The address provided here may be the zip code used to calculate both shipping cost and sales tax. The user's profile zip code may used as the base zip code for all scrapping and sales tax calculation up to this point.

An illustrative embodiment of a second portion or bottom portion of the payment view controller screen is shown in FIG. 51. Here the user may be shown a payment section 1701. The first time through this section may be blank and the user may need to add a credit card. Upon selecting this area, a pop-up may appear asking for the credit card number, expiration date and CVV code. This data may be saved via a third-party payment gateway. They may then see what type of card is being used and the last our digits of the card 1702. Multiple cards may be stored with the system. Only once card may be used to execute a SplitCart 100. Below is a breakdown of the numbers. The user's portion due of the item cost, shipping & handling, sales tax and order total 1703. When the user presses place order 1704 the Apple framework for SMS messaging loads in a new view controller with a predetermined message and the list of phone numbers provided via the contacts screen for choosing Splitters. Once the message is sent the action may be done and a thank you screen appears. At the bottom of the page the terms and conditions may be clearly labeled 1705.

An illustrative representation of the hamburger or user menu screen is shown in FIG. 52. The user can change their profile by clicking anywhere on their information 1801. Anything relative to active SplitCart 100s can be found by clicking 1802. Notifications can be found in 1803. Favorite products from the table view or select item screen can be found in 1804. Splitcarts that have been successful or failed can be found in Splitcart history 1805. Changing password can be done in 1806. Updating credit card payments or deleting credit cards can be done in 1807. Settings may be where all personal settings can be modified 1808. Address may be the user's default shipping address and can be adjusted here 1809. Logout may be as it says 1810.

An illustrative representation of creating a Splitcart as it relates to the credit card (reference FIGS. 37 & 38 throughout this description) is shown in FIG. 53. The organizer creates a Splitcart 1901 and the splitter receives and accepts the invite 1902. Both actions require an account to be created 1903 and then a credit card to be entered which may be then stored using REST 1904. If the consumer enters the wrong data or there may be an issue with their card a pop-up may notify them in live time 1905. Once all parties have agreed to a Splitcart 1906 there may be a pull from REST 1907 to finalize all the credit card commitments. If there are no issues the order may be finalized 1908. If there is an issue finalizing the consumer's credit card 1909 a message 1910 (different to each) may go to the organizer and the splitter who has the issue with the card (only if an email was provided or they have the Splitcart app installed. If the issue is rectified before the deadline the order may be processed 1911. If the issue is not rectified the organizer may have the option to pay the difference, cancel the Splitcart, or create another one 1912.

Generally, it is contemplated that for most situations it may be advantageous for Organizers, Splitters, co-purchasers, and/or those otherwise participating in a co-purchasing campaign to create an account when using various illustrative embodiments of a co-purchasing system & method. However, the scope of the present disclosure is not so limited and those individuals may participate as a guest (i.e., there is no requirement to create an account) without limitation unless otherwise indicated in the following claims.

Although the methods described and disclosed herein may be configured to facilitate a co-purchasing system in an electronic environment, the scope of the present disclosure, any discrete process step and/or parameters therefor, and/or any apparatus for use therewith is not so limited and extends to any beneficial and/or advantageous use thereof without limitation unless so indicated in the following claims.

Any of the various methods and/or systems disclosed herein may be configured as a non-transitory computer-readable medium for storing instructions that, when executed by one or more processors (which processors may be configured in a network computing system) cause the network computing system to carry out the method(s) and/or facilitate the desired functionality of the system without limitation unless otherwise indicated in the following claims. Additionally, any of the various methods disclosed herein and/or systems configured to carry out a specific method may be implemented via a computer and/or computer network without limitation unless otherwise indicated in the following claims.

Having described preferred aspects of the various processes, apparatuses, and products made thereby, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all processes, apparatuses, and/or structures for providing the various benefits and/or features of the present disclosure unless so indicated in the following claims.

While the process, process steps, components thereof, apparatuses therefor and results produced according to the present disclosure have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the processes and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the processes, software and methods disclosed are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, process steps etc. of a computerized transaction, a process step, and/or an application, may be used alone or in combination with one another depending on the compatibility of the features, components, functionalities, advantages, aspects, configurations, process steps, process parameters, etc. Accordingly, an infinite number of variations of the present disclosure exist. Modifications and/or substitutions of one feature, component, functionality, aspect, configuration, process step, process parameter, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A non-transitory computer-readable medium for storing instructions that, when executed by one or more processors of a network computing system, cause the network computing system to:
    a) display a plurality of items for purchase from an e-commerce retailer's website via a graphical user interface on an organizer's computing device connected to said network computing system;
    b) provide a plurality of checkout options to said organizer via said graphical user interface upon said organizer's selection of an item from said plurality of items, wherein a co-purchasing method is a checkout option in said plurality of checkout options;
    c) prompt said organizer, upon said organizer's selection of said co-purchasing method, to either login to said co-purchasing method via an existing user's account or create a user's account for access to said co-purchasing method to create a co-purchasing campaign for said item;
    d) prompt said organizer to select a recipient for said item from a list of said organizer's contacts accessible through said organizer's computing device;
    e) providing, using a dynamic link associated with said co-purchase campaign a first image presenting real time information from said co-purchase campaign, said real-time information including at least a total cost of said item, a total amount currently contributed to said co-purchasing campaign, and an expiration date for said co-purchasing campaign, said first image presented to said organizer's computing device and one or more devices of one or more invitees;
    f) prompt said organizer to contribute a monetary amount to said co-purchase campaign;
    g) share said dynamic link, upon selection by said organizer, via at least one sharing medium with said one or more invitees;
    h) prompt an invitee of said one or more of invitees to contribute a second monetary amount to said co-purchase campaign;
    i) in response to receiving a contribution from the prompted invitee using the shared dynamic link:
        i. storing an updated image of the first image presenting real-time information, the updated image reflecting a current status of the co-purchasing campaign based on the received contribution from said first invitee;
        ii. providing, using the dynamic link, the updated image in a URL preview to said organizer's computing device or to one or more devices of one or more invitees other than the prompted invitee;
    j) provide a vault for storing at least a first set of data associated with a payment method of a first contributor and a first contributor's amount, and a second set of data associated with a second payment method of said one or more invitees;
    k) verify said payment method of said first contributor and said payment method of said invitee through a gateway of said e-commerce retailer via a payment processor of said e-commerce retailer and a first issuing bank for said payment method of said first contributor and a second issuing bank for said second payment method of said one or more invitees;
    l) store authorization data for a first contributor's monetary amount from said payment method of said first contributor and said second monetary amount from said second payment method of said one or more invitees such that both said monetary amount and said second monetary amount remain unsettled;
    m) process said first contributor's monetary amount and said second monetary amount through said payment processor of said e-commerce retailer, said first issuing bank, and said second issuing bank if said total amount currently contributed meets a threshold amount; and,
    n) release, upon expiration of said co-purchasing campaign, said authorization data for said first contributor's monetary amount and said second monetary amount such that said first contributor and said invitee are not charged.

2. The non-transitory computer-readable medium of claim 1, wherein the instructions cause the network computing system to allow said invitee to share said dynamic link with a second plurality of invitees.

3. The non-transitory computer-readable medium of claim 1 wherein said first contributor's monetary amount and said second monetary amount are further defined as being equal.

4. The non-transitory computer-readable medium of claim 1 wherein said organizer is said first contributor.

5. The non-transitory computer-readable medium of claim 1, wherein the instructions cause the network computing system to:
   a) prompt a second invitee of said plurality of invitees to contribute a third monetary amount to said co-purchase campaign;
   b) store a third set of data associated with a third payment method of said second invitee;
   c) verify said third payment method of said second invitee through said gateway of said e-commerce retailer via said payment processor of said e-commerce retailer and third issuing bank for said third payment method of said second invitee;
   d) store authorization data for said third monetary amount from said third payment method of said second invitee such that both said third monetary amount remains unsettled; and,
   e) update said total amount currently contributed to said co-purchasing campaign via said dynamic link according to said third monetary amount.

6. A computer-implemented method for facilitating a co-purchasing campaign for an item, wherein a set of instructions for executing said computer implemented method are stored on a non-transitory computer-readable medium, said method comprising:
   a) displaying a plurality of items for sale from a retailer's website on a mobile application or web browser;
   b) receiving, from an individual, a selection of an item from said plurality of items for purchase, wherein a specific cost is associated with said item;
   c) providing a co-purchase checkout option for purchasing said item;
   d) prompting said individual, upon said individual's selection of said co-purchase checkout option, to login to an account or create an account for said co-purchase checkout option to grant said individual access to said co-purchase checkout option;
   e) converting said individual to an organizer upon said individual's access to said co-purchase checkout option;
   f) prompting said organizer to select a recipient for said item;
   g) assigning said organizer, said recipient, and said item to a co-purchasing campaign for said item;
   h) generating an expiration date or time for said co-purchasing campaign;
   i) providing, using a dynamic link associated with said co-purchase campaign a first image presenting real time information from said co-purchase campaign, said real-time information including at least a total cost of said item, a total amount currently contributed to said co-purchasing campaign, and an expiration date for said co-purchasing campaign, said first image presented to said organizer's computing device and one or more devices of one or more invitees;
   j) prompting said organizer to contribute an organizer's monetary amount to said co-purchase campaign;
   k) prompting said organizer to share said dynamic link via at least one sharing medium with said one or more of invitees;
   l) Prompting a first invitee of said one or more plurality of invitees to contribute a first invitee's monetary amount to said co-purchase campaign;
   m) in response to receiving a contribution from the first invitee using the shared dynamic link:
      i. storing an updated image of the first image presenting real-time information, the updated image reflecting a current status of the co-purchasing campaign based on the received contribution from said first invitee;
      ii. providing, using the dynamic link, the updated image in a URL preview to said organizer's computing device or to one or more devices of one or more invitees other than the first invitee;
   n) providing a vault for storing at least a first set of data associated with a payment method of a first contributor and a first contributor's monetary amount and a second set of data associated with a second payment method of said first invitee;
   o) verifying said payment method of said first contributor and said second payment method of said first invitee through a gateway of said retailer's website via a payment processor of said retailer, a first issuing bank for said payment method of said first contributor, and a second issuing bank for said payment method of said first invitee;
   p) storing authorization data for said first contributor's monetary amount from said payment method of said first contributor and said first invitee's monetary amount from said second payment method of said first invitee such that both said first contributor's monetary amount and said first invitee's monetary amount remain unsettled;
   q) processing said first contributor's monetary amount and said first invitee's monetary amount through said payment processor of said first issuing bank, and said second issuing bank if said total amount currently contributed meets a threshold amount; and,
   r) releasing, upon expiration of said co-purchasing campaign, said authorization data for said first contributor's monetary amount and said first invitee's monetary amount such that said first contributor and said first invitee are not charged.

7. The method of claim 6 wherein said organizer's monetary amount and said first invitee's monetary amount are further defined as being equal.

8. The method of claim 6 wherein said organizer is said first contributor.

9. The method of claim 6 wherein said item is further defined as a good.

10. The method of claim 6 wherein said item is further defined as a service.

11. The method of claim 6 wherein said recipient is further defined as being selected from a contact list of said organizer.

12. The method of claim 6 further comprising the steps of:
   a) prompting a second invitee of said plurality of invitees to contribute a second invitee's monetary amount to said co-purchase campaign;
   b) storing a third set of data associated with a third payment method of said second invitee;
   c) verifying said third payment method of said second invitee through said gateway of said e-commerce retailer via said payment processor of said e-commerce retailer and a third issuing bank for said third payment method of said second invitee;
   d) storing authorization data for said second invitee's monetary amount from said third payment method of said second invitee such that said second invitee's monetary amount remains unsettled; and, e) updating said total amount currently contributed to said co-purchasing campaign for said link according to said second invitee's monetary amount.

13. The method of claim 12 wherein said first invitee's monetary amount and said second invitee's monetary amount are further defined as being equal.

14. The method of claim 12 wherein said organizer's monetary amount, said first invitee's monetary amount, and said second invitee's monetary amount are further defined as being equal.

15. The method of claim 12 wherein said first contributor's monetary amount and said second invitee's monetary amount are further defined as being unequal.

16. The method of claim 12 wherein said organizer's monetary amount is further defined as zero.

17. The method of claim 12 further comprising the steps of:
  a) prompting a third invitee of said plurality of invitees to contribute a third invitee's monetary amount to said co-purchase campaign;
  b) storing a fourth set of data associated with a fourth payment method of said third invitee;
  c) verifying said fourth payment method of said third invitee through said gateway of said e-commerce retailer via said payment processor of said e-commerce retailer and a fourth issuing bank for said fourth payment method of said third invitee;
  d) storing authorization data for said third invitee's monetary amount from said fourth payment method of said third invitee such that said third invitee's monetary amount remains unsettled; and,
  e) updating said total amount currently contributed to said co-purchasing campaign for said link according to said third invitee's monetary amount.

18. The non-transitory computer-readable medium of claim 1, wherein the instructions cause the network to display a visual indicator of said at least said expiration date or time, said at least a total cost of said item and said at least a total amount currently contributed to said co-purchasing campaign via said dynamic link.

19. The method of claim 6 wherein said dynamic link associated with said co-purchasing campaign displays a visual indicator of at least the time remaining before the expiration date or time of said co-purchasing campaign.

20. A non-transitory computer-readable medium for storing instructions that, when executed by one or more processors of a network computing system, cause the network computing system to:
  a) display a plurality of items for purchase from an e-commerce retailer's website via a graphical user interface on an organizer's computing device connected to said network computing system;
  b) provide a plurality of checkout options to said organizer via said graphical user interface after said organizer selects said item to add to a shopping cart from said e-commerce retailer's website,
  c) generate a co-purchasing method as at least one checkout option for said item;
  d) prompt said organizer, upon said organizer's selection of said co-purchasing method, to either login to said co-purchasing method via an existing user's account or create a user's account for access to said co-purchasing method to create a co-purchasing campaign for said item, wherein said co-purchasing campaign has an expiration date and time;
  e) providing, using a dynamic link associated with said co-purchase campaign a first image presenting real time information from said co-purchase campaign, said real-time information including at least a total cost of said item, a total amount currently contributed to said co-purchasing campaign, and an expiration date for said co-purchasing campaign, said first image presented to said organizer's computing device and one or more devices of one or more invitees;
  f) prompt said organizer to contribute a monetary amount to said co-purchase campaign;
  g) share said dynamic link, upon selection by said organizer, via at least one sharing medium with said one or more invitees;
  h) prompt a first invitee of said one or more invitees to contribute a second monetary amount to said co-purchase campaign;
  i) in response to receiving a contribution from said first invitee using the shared dynamic link:
    i. storing an updated image of the first image presenting real-time information, the updated image reflecting a current status of the co-purchasing campaign based on the received contribution from said first invitee;
    ii. providing, using the dynamic link, the updated image in a URL preview to said organizer's computing device or to one or more devices of one or more invitees other than the first invitee;
  j) provide a vault for storing at least a first set of data associated with a payment method of a first contributor and a first contributor's amount, and a second set of data associated with a second payment method of said invitee;
  k) verify said payment method of said first contributor and said payment method of said invitee through a gateway of said e-commerce retailer via a payment processor of said e-commerce retailer and a first issuing bank for said payment method of said first contributor and a second issuing bank for said second payment method of said invitee;
  l) store authorization data for a first contributor's monetary amount from said payment method of said first contributor and said second monetary amount from said second payment method of said invitee such that both said monetary amount and said second monetary amount remain unsettled;
  m) process said first contributor's monetary amount and said second monetary amount through said payment processor of said e-commerce retailer, said first issuing bank, and said second issuing bank if said total amount currently contributed meets a threshold amount; and,
  n) release, upon expiration of said co-purchasing campaign, said authorization data for said first contributor's monetary amount and said second monetary amount such that said first contributor and said invitee are not charged;
  o) process said first contributor's monetary amount and said second monetary amount through said payment processor of said e-commerce retailer, said first issuing bank, and said second issuing bank if said total amount currently contributed meets a threshold amount or process, at any time before expiration of said co-purchasing campaign, said authorization data for any contributor to solely fund the threshold amount; and, p) release, upon expiration of said co-purchasing campaign, said authorization data for said first contributor's monetary amount and said second monetary amount such that said first contributor and said invitee are not charged.

* * * * *